United States Patent
Chae et al.

(10) Patent No.: US 11,632,693 B2
(45) Date of Patent: *Apr. 18, 2023

(54) SIDELINK CONGESTION CONTROL

(71) Applicant: Comcast Cable Communications, LLC, Philadelphia, PA (US)

(72) Inventors: Hyukjin Chae, Fairfax, VA (US); Esmael Hejazi Dinan, McLean, VA (US); Kyungmin Park, Vienna, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/858,784

(22) Filed: Jul. 6, 2022

(65) Prior Publication Data

US 2022/0417790 A1    Dec. 29, 2022

Related U.S. Application Data

(63) Continuation of application No. 16/864,835, filed on May 1, 2020, now Pat. No. 11,425,597.

(60) Provisional application No. 62/842,508, filed on May 2, 2019.

(51) Int. Cl.
*H04W 28/02*    (2009.01)
*H04B 17/318*    (2015.01)
*H04L 5/00*    (2006.01)
*H04W 72/52*    (2023.01)

(52) U.S. Cl.
CPC ...... *H04W 28/0289* (2013.01); *H04B 17/318* (2015.01); *H04L 5/0048* (2013.01); *H04W 72/52* (2023.01)

(58) Field of Classification Search
None
See application file for complete search history.

(56) References Cited

U.S. PATENT DOCUMENTS

| | | |
|---|---|---|
| 2019/0239112 A1 | 8/2019 | Rao et al. |
| 2019/0313279 A1 | 10/2019 | Li et al. |
| 2020/0015298 A1 | 1/2020 | Chae et al. |
| 2020/0045674 A1 | 2/2020 | Tseng et al. |
| 2020/0053702 A1 | 2/2020 | Cheng et al. |
| 2020/0260386 A1 | 8/2020 | Ryu et al. |
| 2020/0305169 A1 | 9/2020 | Loehr et al. |
| 2020/0314803 A1 | 10/2020 | Zhang et al. |
| 2020/0382992 A1 | 12/2020 | Shilov et al. |
| 2021/0029688 A1 | 1/2021 | Zhang et al. |
| 2021/0051510 A1 | 2/2021 | Chae et al. |

(Continued)

FOREIGN PATENT DOCUMENTS

WO    2018182262 A1    10/2018

OTHER PUBLICATIONS

R1-1903944 3GPP TSG RAN WG1 Meeting #96bis, Xi'an, China, Apr. 8-12, 2019, Source: Huawei, HiSilicon, Title: Sidelink physical layer procedures for NR V2X.

(Continued)

*Primary Examiner* — Otis L Thompson, Jr.
(74) *Attorney, Agent, or Firm* — Banner & Witcoff, Ltd.

(57) ABSTRACT

Wireless communications are described for sidelink congestion control. Sidelink congestion control may be performed based on a processing capability of a wireless device and/or sidelink subcarrier spacing.

44 Claims, 26 Drawing Sheets

(56) References Cited

U.S. PATENT DOCUMENTS

2021/0160890 A1  5/2021  Selvanesan et al.
2021/0337485 A1  10/2021  Ryu et al.
2022/0132603 A1* 4/2022  Adjakple .............. H04W 8/005

OTHER PUBLICATIONS

R1-1904077 3GPP TSG RAN WG1 Meeting #96bis, Xi'an, China, Apr. 8-12, 2019, Source: Vivo, Title: Physical layer procedure for NR sidelink.
R1-1904078 3GPP TSG RAN WG1 Meeting #96bis, Xi'an, China, Apr. 8-12, 2019, Source: Vivo, Title: QoS management for sidelink.
R1-1904257 3GPP TSG RAN WG1 Meeting #96bis, Xi'an, China, Apr. 8-12, 2019, Source: Sony, Title: Discussion on HARQ feedback for NR V2X communication.
R1-1904299 3GPP TSG RAN WG1 Meeting #96bis, Xi'an, China, Apr. 8-12, 2019, Source: Intel Corporation, Title: Design of physical layer procedures for NR V2X sidelink communication.
R1-1904300 3GPP TSG RAN WG1 Meeting #96bis, Xi'an, China, Apr. 8-12, 2019, Source: Intel Corporation, Title: QoS aware congestion control for NR V2X sidelink communication.
R1-1904331 3GPP TSG RAN WG1 Meeting #96bis, Xi'an, China, Apr. 8-12, 2019, Source: Fraunhofer HHI, Fraunhofer IIS, Title: Physical Layer Procedures for NR V2X.
R1-1904426 3GPP TSG RAN WG1 Meeting #96bis, Xi'an, China, Apr. 8-12, 2019, Source: Samsung, Title: On Physical Layer Procedures for NR V2X.
R1-1904427 3GPP TSG RAN WG1 Meeting #96bis, Xi'an, China, Apr. 8-12, 2019, Source: Samsung, Title: On QoS management for NR V2X.
R1-1904656 3GPP TSG RAN WG1 Meeting #96bis, Xi'an, China, Apr. 8-12, 2019, Source: NEC, Title: Physical layer procedures for NR sidelink.
R1-1904730 3GPP TSG RAN WG1 Meeting #96bis, Xi'an, China, Apr. 8-12, 2019, Source: CMCC, Title: Discussion on HARQ feedback for NR V2X.
R1-1904791 3GPP TSG RAN WG1 Meeting #96bis, Xi'an, China, Apr. 8-12, 2019, Source: Spreadtrum Communications, Title: Considerations on sidelink QoS management.
R1-1904809 3GPP TSG RAN WG1 Meeting #96bis, Xi'an, China, Apr. 8-12, 2019, Source: TCL Communication, Title: Physical Layer Procedures for Sidelink.
R1-1904817 3GPP TSG RAN WG1 Meeting #96bis, Xi'an, China, Apr. 8-12, 2019, Source: ZTE, Sanechips, Title: Discussion on QoS management.
R1-1904977 3GPP TSG RAN WG1 Meeting #96bis, Xi'an, China, Apr. 8-12, 2019, Source: Apple, Title: Considerations on NR V2X physical layer procedure.
R1-1905013 3GPP TSG RAN WG1 Meeting #96bis, Xi'an, China, Apr. 8-12, 2019, Source: Qualcomm Incorporated, Title: QoS management and congestion control for sidelink.
R1-1905337 3GPP TSG RAN WG1 Meeting #96bis, Xi'an, China, Apr. 8-12, 2019, Source: Nokia, Nokia Shanghai Bell, Title: Discussion on sidelink physical layer procedures.
R1-1905338 3GPP TSG RAN WG1 Meeting #96bis, Xi'an, China, Apr. 8-12, 2019, Source: Nokia, Nokia Shanghai Bell, Title: Discussion of QoS management for sidelink.
R1-1905357 3GPP TSG RAN WG1 Meeting #96bis, Xi'an, China, Apr. 8-12, 2019, Source: CATT, Title: Discussion on QoS management for sidelink in NR V2X.
R1-1905388 3GPP TSG RAN WG1 Meeting #96bis, Xi'an, China, Apr. 8-12, 2019, Source: Sequans Communications, Title: On HARQ procedure for NR sidelink.
R1-1905406 3GPP TSG RAN WG1 Meeting #96bis, Xi'an, China, Apr. 8-12, 2019, Source: InterDigital, Inc., Title: Congestion control and QoS Management for NR-V2X.
R1-1905415 3GPP TSG RAN WG1 Meeting #96bis, Xi'an, China, Apr. 8-12, 2019, Source: Xiaomi Communications, Title: On HARQ operation for 5G V2x communications.
R1-1905425 3GPP TSG RAN WG1 Meeting #96bis, Xi'an, China, Apr. 8-12, 2019, Source: NTT DOCOMO, Inc., Title: NR Sidelink Physical Layer Procedure.
R1-1905426 3GPP TSG RAN WG1 Meeting #96bis, Xi'an, China, Apr. 8-12, 2019, Source: NTT DOCOMO, Inc., Title: Congestion Control for NR Sidelink.
R1-1905444 3GPP TSG RAN WG1 Meeting #96bis, Xi'an, China, Apr. 8-12, 2019, Source: LG Electronics, Title: Discussion on QoS management for NR sidelink.
R1-1905480 3GPP TSG RAN WG1 Meeting #96bis, Xi'an, China, Apr. 8-12, 2019, Source: Ericsson, Title: Physical layer procedures for sidelink.
R1-1905481 3GPP TSG RAN WG1 Meeting #96bis, Xi'an, China, Apr. 8-12, 2019, Source: Ericsson, Title: On congestion control for NR SL.
R1-1905622 3GPP TSG RAN WG1 Meeting #96bis, Xi'an, China, Apr. 8-12, 2019, Source: Nokia, Nokia Shanghai Bell, Title: Summary of AI 7.2.4.6, QoS Management.
3GPP TS 36.213 V15.5.0 (Mar. 2019), 14 UE procedures related to Sidelink (Release 15).
3GPP TS 36.214 V15.3.0 (Sep. 2018), Technical Specification, 3rd Generation Partnership Project; Technical Specification Group Radio Access Network; Evolved Universal Terrestrial Radio Access (E-UTRA); Physical layer; Measurements (Release 15).
Naik, Gaurang, et al., "IEEE 802.11bd & 5G NR V2X: Evolution of Radio Access Technologies for V2X Communications." Published Mar. 26, 2019.
Liu, Xiaofeng, et al., "Congestion Control in V2V Safety Communication: Problem, Analysis, Approaches." Electronics 8, No. 540 (2019); Published May 13, 2019. doi:10.3390/electronics8050540.
Sep. 29, 2020, Extended European Search Report, EP 20172597.5.
R1-1906137, 3GPP TSG RAN WG1 #97 Meeting, "Physical layer structure for NR sidelink" Reno, USA, May 13-17, 2019.
R1-1906140, 3GPP TSG RAN WG1 #97, "Sidelink synchronization mechanism" Reno, US, May 13-17, 2019.
3GPP TS 38.300 v15.5.0, "3rd Generation Partnership Project; Technical Specification Group Radio Access Network; NR; NR and ng-RAN Overall Description; Stage 2 (Release 15)", Mar. 2019.
R1-1812407, 3GPP TSG RAN WG1 Meeting #95, "Considerations on sidelink physical layer structures" Spokane, USA, Nov. 12-16, 2018.
Feb. 4, 2022—European Office Action—EP 20172597.5.

\* cited by examiner

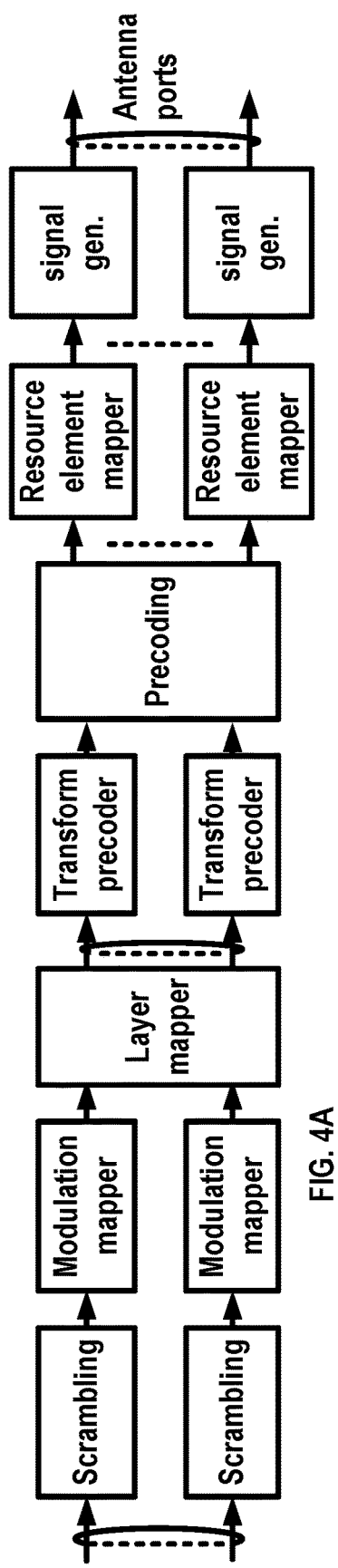
FIG. 4A
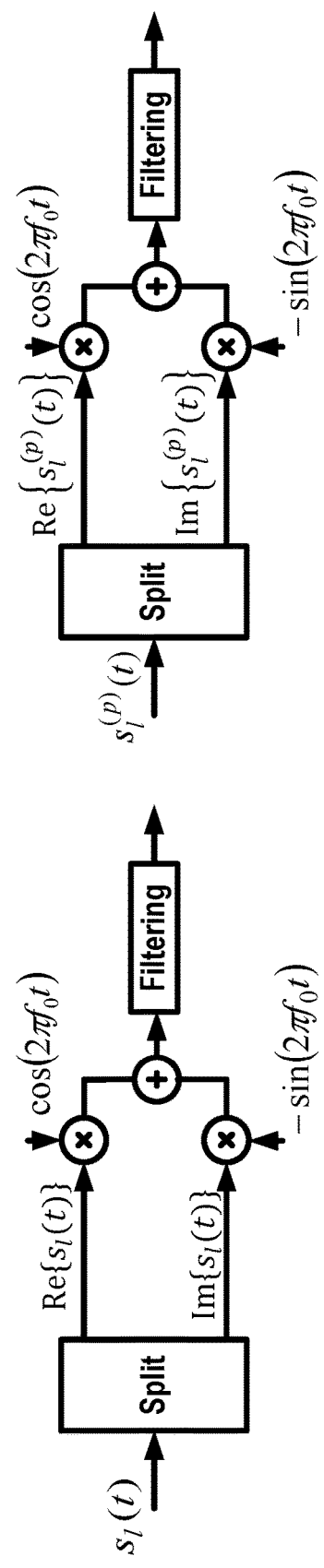
FIG. 4B
FIG. 4D
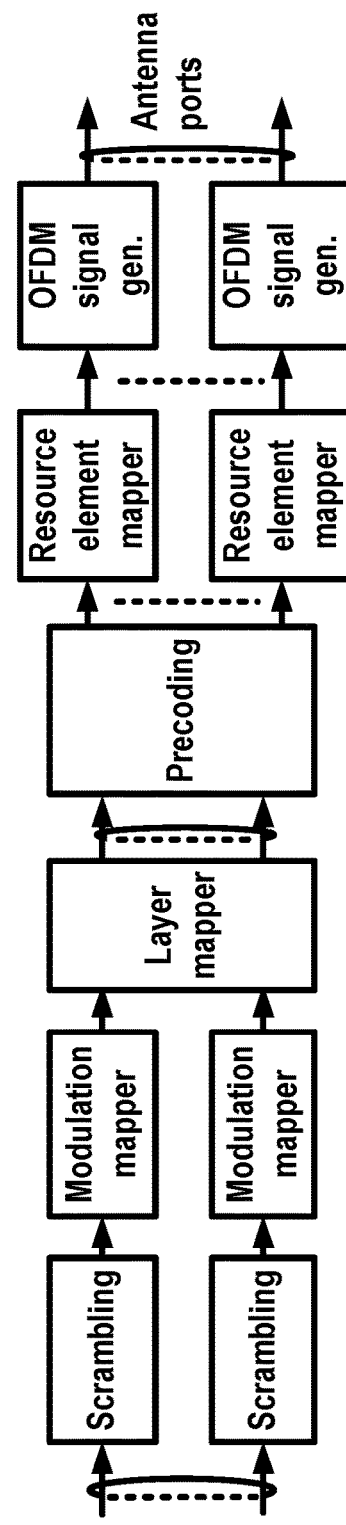
FIG. 4C

SIDELINK CONGESTION CONTROL

CROSS-REFERENCE TO RELATED APPLICATIONS

This application claims priority to and is a continuation of U.S. application Ser. No. 16/864,835, filed May 1, 2020, which claims the benefit of U.S. Provisional Application No. 62/842,508 filed on May 2, 2019, each of which is hereby incorporated by reference in its entirety.

BACKGROUND

A wireless device may communicate with one or more base stations and/or other wireless devices in a wireless communications network. The wireless device may communicate directly with one or more other wireless devices via a sidelink.

SUMMARY

The following summary presents a simplified summary of certain features. The summary is not an extensive overview and is not intended to identify key or critical elements.

Wireless communications are described including, but not limited to, device-to-device communications, vehicle-to-everything communications, vehicle-to-vehicle communications, vehicle-to-network communications, vehicle-to-roadside infrastructure communications, vehicle-to-pedestrian communications, and/or direct communications, such as via a sidelink. Congestion and/or other characteristics of a communications channel (e.g., for a sidelink) may be determined using a channel busy ratio (CBR). The CBR may be based on, for example, measurements of the communications channel and/or radio resources used. The CBR may indicate a quantity and/or percentage of the communication channel's radio resources that have a measurement (e.g., noise level) and/or a radio resource usage above a threshold value. A sidelink may use a subcarrier spacing that may differ from other communication channels, and/or a wireless device may have different capabilities to perform measurements relative to other wireless devices. In view of such differences (e.g., in sidelink subcarrier spacing and/or wireless device capability), determining a CBR based on measurements over a fixed duration, for all sidelink subcarrier spacing and/or for all wireless devices, may lead to increased communication delay and/or decreased throughput. Performance may be improved, however, by determining congestion control (e.g., using a congestion control parameter such as CBR) that is based on sidelink subcarrier spacing and/or a wireless device capability. Dynamically varying a period of time during which a wireless device performs measurement(s) for a CBR, for example, based on the sidelink subcarrier spacing and/or wireless device capability, may provide advantages such as improved communications throughput, performance, reliability, and power consumption characteristics of a wireless device.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 4A, FIG. 4B, FIG. 4C, and FIG. 4D show examples of uplink and downlink signal transmission.

DETAILED DESCRIPTION

Figure 1:
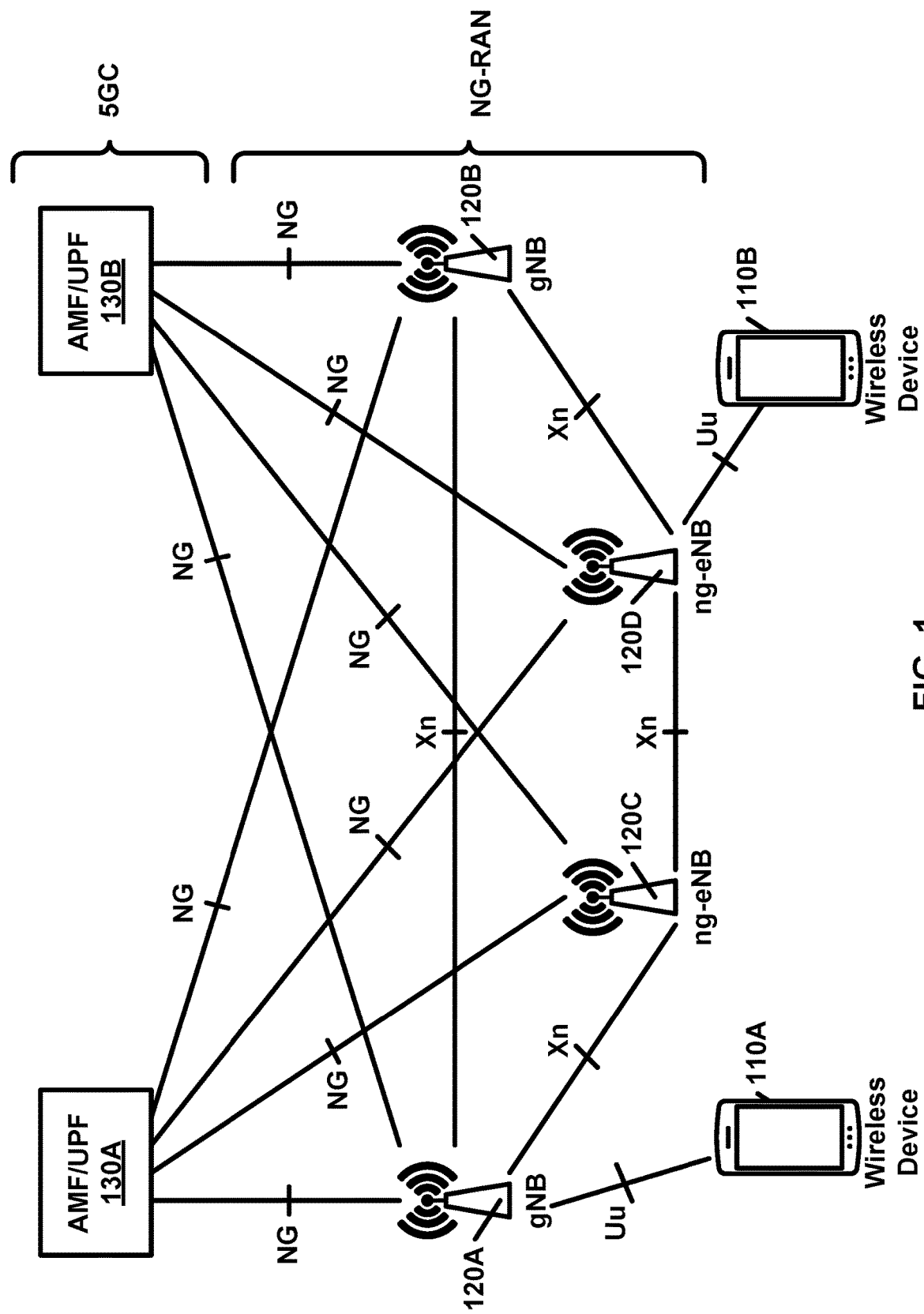
FIG. 1 shows an example radio access network (RAN) architecture.

The accompanying drawings and descriptions provide examples. It is to be understood that the examples shown in the drawings and/or described are non-exclusive and that there are other examples of how features shown and described may be practiced.

The accompanying drawings and descriptions provide examples. It is to be understood that the examples shown in the drawings and/or described are non-exclusive and that there are other examples of how features shown and described may be practiced. Examples are provided for operation of wireless communication systems which may be used in the technical field of multicarrier communication systems. More particularly, the technology described herein may relate to sidelink communications for wireless devices.

3GPP 3$^{rd}$ Generation Partnership Project
5G 5$^{th}$ generation mobile networks
5GC 5G Core Network
ACK Acknowledgement
AMF Access and Mobility Management Function
ARQ Automatic Repeat Request
AS Access Stratum
ASIC Application-Specific Integrated Circuit
BA Bandwidth Adaptation
BCCH Broadcast Control Channel
BCH Broadcast Channel
BPSK Binary Phase Shift Keying
BWP Bandwidth Part
CA Carrier Aggregation
CBR Channel Busy Ratio
CC Component Carrier
CCCH Common Control Channel
CDMA Code Division Multiple Access
CE Control Element
CN Core Network
CORESET Control Resource Set
CP Cyclic Prefix
CP-OFDM Cyclic Prefix—Orthogonal Frequency Division Multiplex
C-RNTI Cell-Radio Network Temporary Identifier
CR Channel Occupancy Ratio
CS Configured Scheduling
CSI Channel State Information
CSI-RS Channel State Information-Reference Signal
CQI Channel Quality Indicator
CRI CSI-RS resource indicator
CSS Common Search Space
CU Central Unit
D2D device to device
DC Dual Connectivity
DCCH Dedicated Control Channel
DCI Downlink Control Information
DL Downlink
DL-SCH Downlink Shared Channel
DM-RS DeModulation Reference Signal
DRB Data Radio Bearer
DRX Discontinuous Reception
DTCH Dedicated Traffic Channel
DU Distributed Unit
eNB Evolved Node B
EPC Evolved Packet Core
E-UTRA Evolved UMTS Terrestrial Radio Access
E-UTRAN Evolved-Universal Terrestrial Radio Access Network
FDD Frequency Division Duplex
FPGA Field Programmable Gate Arrays
F1-C F1-Control plane
F1-U F1-User plane
GNSS Global Navigation Satellite System
GPS Global Positioning System
gNB next generation Node B
HARQ Hybrid Automatic Repeat reQuest
HDL Hardware Description Languages
IE Information Element
IBE In-Band Emission
IP Internet Protocol
LCID Logical Channel Identifier
LI Layer Indicator
LTE Long Term Evolution
MAC Medium Access Control
MCG Master Cell Group
MCS Modulation and Coding Scheme
MeNB Master evolved Node B
MIB Master Information Block
MIMO Multiple-Input/Multiple-Output
MME Mobility Management Entity
MN Master Node j
MU-MIMO multi-user-MIMO
NACK Negative Acknowledgement
NAS Non-Access Stratum
NDI New Data Indicator
NG CP Next Generation Control Plane
NGC Next Generation Core
NG-C NG-Control plane
ng-eNB next generation evolved Node B
NG-U NG-User plane
NR New Radio
NR MAC New Radio MAC
NR PDCP New Radio PDCP
NR PHY New Radio PHYsical
NR RLC New Radio RLC
NR RRC New Radio RRC
NR UE New Radio UE
NSSAI Network Slice Selection Assistance Information
O&M Operation and Maintenance
OGDM Orthogonal Frequency Division Multiplexing
PBCH Physical Broadcast Channel
PCC Primary Component Carrier
PCCH Paging Control Channel
Pcell Primary Cell
PCH Paging Channel
PDCCH Physical Downlink Control Channel
PDCP Packet Data Convergence Protocol
PDSCH Physical Downlink Shared Channel
PDU Protocol Data Unit
PHICH Physical HARQ Indicator Channel
PHY PHYsical
PLMN Public Land Mobile Network
PMI Precoding Matrix Indicator
PRACH Physical Random Access Channel
PRB Physical Resource Block
PSBCH Physical Sidelink Broadcast Channel
PSCCH Physical Sidelink Control Channel
PSCell Primary Secondary Cell
PSDCH Physical Sidelink Discovery Channel
PSS Primary Synchronization Signal
PSSCH Physical Sidelink Shared Channel
pTAG primary Timing Advance Group
PT-RS Phase Tracking Reference Signal
PUCCH Physical Uplink Control Channel
PUSCH Physical Uplink Shared Channel
QAM Quadrature Amplitude Modulation
QCLed Quasi-Co-Located
QCL Quasi-Co-Location
QFI Quality of Service Indicator
QoS Quality of Service
QPSK Quadrature Phase Shift Keying RA Random Access
RACH Random Access Channel
RAN Radio Access Network
RAT Radio Access Technology
RA-RNTI Random Access-Radio Network Temporary Identifier
RB Resource Blocks
RBG Resource Block Groups
RE Resource Element
RI Rank indicator
RLC Radio Link Control
RLM Radio Link Monitoring
RNTI Radio Network Temporary Identifier
RRC Radio Resource Control
RRM Radio Resource Management
RS Reference Signal
RSSI Received Signal Strength Indicator
RSU Roadside Unit
RV Redundancy Version
RSRP Reference Signal Received Power
S-PSS Sidelink Primary Synchronization Signal
S-SSB Sidelink Synchronization Signal Block
S-SSS Sidelink Secondary Synchronization Signal
SCC Secondary Component Carrier
Scell Secondary Cell
SCG Secondary Cell Group
SCS Subcarrier Spacing
SC-FDMA Single Carrier-Frequency Division Multiple Access
SDAP Service Data Adaptation Protocol
SDU Service Data Unit
SeNB Secondary evolved Node B
SFN System Frame Number
S-GW Serving GateWay
SI System Information
SIB System Information Block
SINR Signal-to-Interference-plus-Noise Ratio
SLSS Sidelink Synchronization Signal
SMF Session Management Function
SN Secondary Node
SpCell Special Cell
SRB Signaling Radio Bearer
SRS Sounding Reference Signal
SS Synchronization Signal
SSB Synchronization Signal Block
SSBRI Synchronization Signal Block Resource Indicator
SSS Secondary Synchronization Signal
sTAG secondary Timing Advance Group
TA Timing Advance
TAG Timing Advance Group
TAI Tracking Area Identifier
TAT Time Alignment Timer
TB Transport Block
TC-RNTI Temporary Cell-Radio Network Temporary Identifier
TCI Transmission Configuration Indication
TDD Time Division Duplex
TDMA Time Division Multiple Access
TRP Transmission Reception Point
TTI Transmission Time Interval
UCI Uplink Control Information
UE User Equipment
UL Uplink
UL-SCH Uplink Shared Channel
UPF User Plane Function
UPGW User Plane Gateway
URLLC Ultra-Reliable Low-Latency Communication
V2X Vehicle-to-everything
V2P Vehicle-to-pedestrian
V2V Vehicle-to-vehicle
V2I Vehicle-to-infrastructure
V2N Vehicle-to-network
V2I/N Vehicle-to-infrastructure/network
VHDL VHSIC Hardware Description Language
VHSIC Very High Speed Integrated Circuit
Xn-C Xn-Control plane
Xn-U Xn-User plane Examples described herein may be implemented using various physical layer modulation and transmission mechanisms. Example transmission mechanisms may include, but are not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and/or OFDM/CDMA may be used. Various modulation schemes may be used for signal transmission in the physical layer. Examples of modulation schemes include, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, 1024-QAM and/or the like. Physical radio transmission may be enhanced by dynamically or semi-dynamically changing the modulation and coding scheme, for example, depending on transmission requirements and/or radio conditions.

FIG. 1 shows an example Radio Access Network (RAN) architecture. A RAN node may comprise a next generation Node B (gNB) (e.g., 120A, 120B) providing New Radio (NR) user plane and control plane protocol terminations towards a first wireless device (e.g., 110A). A RAN node may comprise a base station such as a next generation evolved Node B (ng-eNB) (e.g., 120C, 120D), providing Evolved UMTS Terrestrial Radio Access (E-UTRA) user plane and control plane protocol terminations towards a second wireless device (e.g., 110B). A first wireless device 110A may communicate with a base station, such as a gNB 120A, over a Uu interface. A second wireless device 110B may communicate with a base station, such as an ng-eNB 120D, over a Uu interface. The wireless devices 110A and/or 110B may be structurally similar to wireless devices shown in and/or described in connection with other drawing figures. The Node B 120A, the Node B 120B, the Node B 120C, and/or the Node B 120D may be structurally similar to Nodes B and/or base stations shown in and/or described in connection with other drawing figures.

A base station, such as a gNB (e.g., 120A, 120B, etc.) and/or an ng-eNB (e.g., 120C, 120D, etc.) may host functions such as radio resource management and scheduling, IP header compression, encryption and integrity protection of data, selection of Access and Mobility Management Function (AMF) at wireless device (e.g., User Equipment (UE)) attachment, routing of user plane and control plane data, connection setup and release, scheduling and transmission of paging messages (e.g., originated from the AMF), scheduling and transmission of system broadcast information (e.g., originated from the AMF or Operation and Maintenance (O&M)), measurement and measurement reporting configuration, transport level packet marking in the uplink, session management, support of network slicing, Quality of Service (QoS) flow management and mapping to data radio bearers, support of wireless devices in an inactive state (e.g., RRC_INACTIVE state), distribution function for Non-Access Stratum (NAS) messages, RAN sharing, dual connectivity, and/or tight interworking between NR and E-UTRA.

One or more first base stations (e.g., gNBs 120A and 120B) and/or one or more second base stations (e.g., ng-eNBs 120C and 120D) may be interconnected with each other via Xn interface. A first base station (e.g., gNB 120A, 120B, etc.) or a second base station (e.g., ng-eNB 120C, 120D, etc.) may be connected via NG interfaces to a network, such as a 5G Core Network (5GC). A 5GC may comprise one or more AMF/User Plan Function (UPF) functions (e.g., 130A and/or 130B). A base station (e.g., a gNB and/or an ng-eNB) may be connected to a UPF via an NG-User plane (NG-U) interface. The NG-U interface may provide delivery (e.g., non-guaranteed delivery) of user plane Protocol Data Units (PDUs) between a RAN node and the UPF. A base station (e.g., a gNB and/or an ng-eNB) may be connected to an AMF via an NG-Control plane (NG-C) interface. The NG-C interface may provide functions such as NG interface management, wireless device (e.g., UE) context management, wireless device (e.g., UE) mobility management, transport of NAS messages, paging, PDU session management, configuration transfer, and/or warning message transmission.

A UPF may host functions such as anchor point for intra-/inter-Radio Access Technology (RAT) mobility (e.g., if applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, quality of service (QoS) handling for user plane, packet filtering, gating, Uplink (UL)/Downlink (DL) rate enforcement, uplink traffic verification (e.g., Service Data Flow (SDF) to QoS flow mapping), downlink packet buffering, and/or downlink data notification triggering.

An AMF may host functions such as NAS signaling termination, NAS signaling security, Access Stratum (AS) security control, inter Core Network (CN) node signaling (e.g., for mobility between $3^{rd}$ Generation Partnership Project (3GPP) access networks), idle mode wireless device reachability (e.g., control and execution of paging retransmission), registration area management, support of intra-system and inter-system mobility, access authentication, access authorization including check of roaming rights, mobility management control (e.g., subscription and/or policies), support of network slicing, and/or Session Management Function (SMF) selection.

Figure 2A:
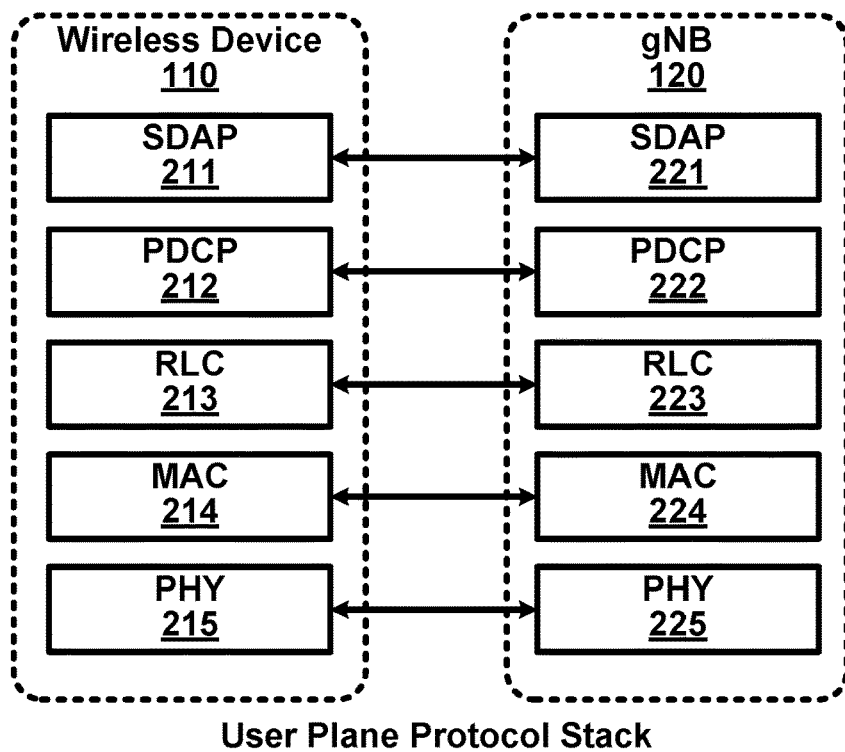
FIG. 2A shows an example user plane protocol stack.

FIG. 2A shows an example user plane protocol stack. A Service Data Adaptation Protocol (SDAP) (e.g., 211 and 221), Packet Data Convergence Protocol (PDCP) (e.g., 212 and 222), Radio Link Control (RLC) (e.g., 213 and 223), and Medium Access Control (MAC) (e.g., 214 and 224) sublayers, and a Physical (PHY) (e.g., 215 and 225) layer, may be terminated in a wireless device (e.g., 110) and in a base station (e.g., 120) on a network side. A PHY layer may provide transport services to higher layers (e.g., MAC, RRC, etc.). Services and/or functions of a MAC sublayer may comprise mapping between logical channels and transport channels, multiplexing and/or demultiplexing of MAC Service Data Units (SDUs) belonging to the same or different logical channels into and/or from Transport Blocks (TBs) delivered to and/or from the PHY layer, scheduling information reporting, error correction through Hybrid Automatic Repeat request (HARQ) (e.g., one HARQ entity per carrier for Carrier Aggregation (CA)), priority handling between wireless devices such as by using dynamic scheduling, priority handling between logical channels of a wireless device such as by using logical channel prioritization, and/or padding. A MAC entity may support one or multiple numerologies and/or transmission timings. Mapping restrictions in a logical channel prioritization may control which numerology and/or transmission timing a logical channel may use. An RLC sublayer may support transparent mode (TM), unacknowledged mode (UM), and/or acknowledged mode (AM) transmission modes. The RLC configuration may be per logical channel with no dependency on numerologies and/or Transmission Time Interval (TTI) durations. Automatic Repeat Request (ARQ) may operate on any of the numerologies and/or TTI durations with which the logical channel is configured. Services and functions of the PDCP layer for the user plane may comprise, for example, sequence numbering, header compression and decompression, transfer of user data, reordering and duplicate detection, PDCP PDU routing (e.g., such as for split bearers), retransmission of PDCP SDUs, ciphering, deciphering and integrity protection, PDCP SDU discard, PDCP re-establishment and data recovery for RLC AM, and/or duplication of PDCP PDUs. Services and/or functions of SDAP may comprise, for example, mapping between a QoS flow and a data radio bearer. Services and/or functions of SDAP may comprise mapping a Quality of Service Indicator (QFI) in DL and UL packets. A protocol entity of SDAP may be configured for an individual PDU session.

Figure 2B:
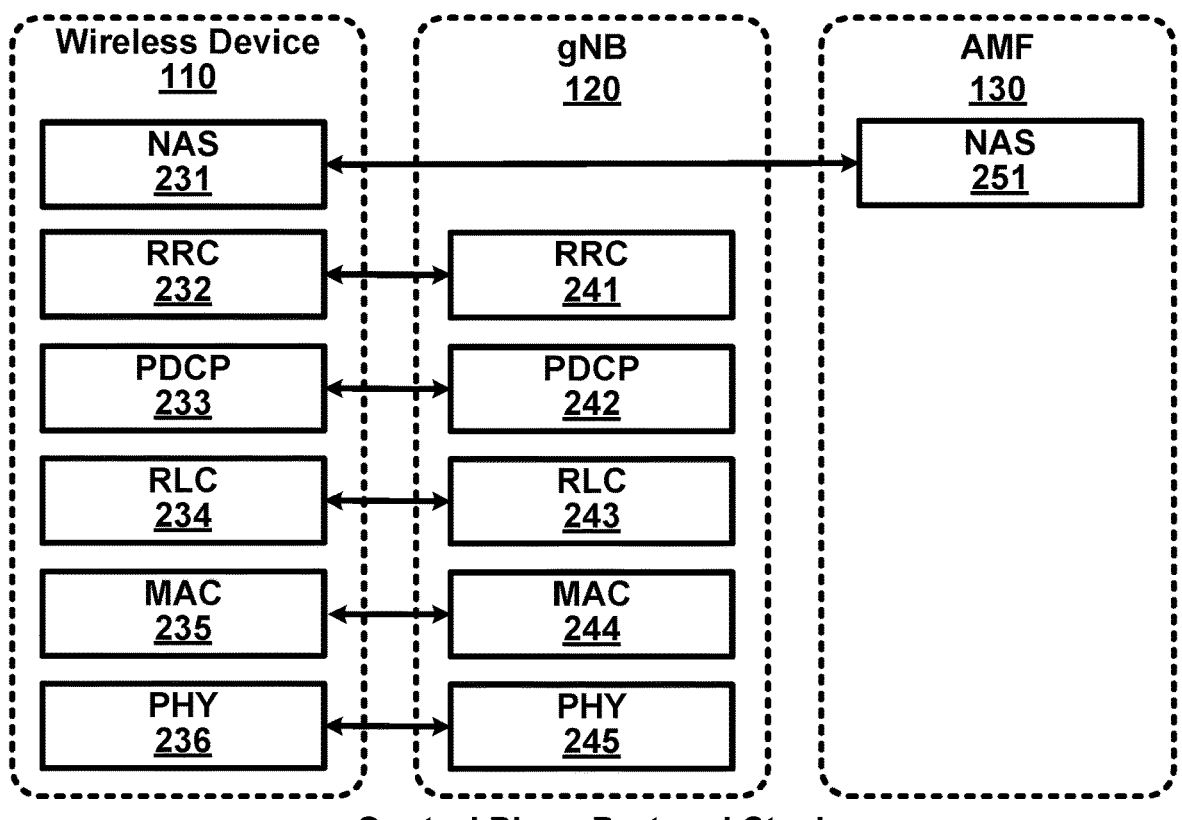
FIG. 2B shows an example control plane protocol stack.

FIG. 2B shows an example control plane protocol stack. A PDCP (e.g., 233 and 242), RLC (e.g., 234 and 243), and MAC (e.g., 235 and 244) sublayers, and a PHY (e.g., 236 and 245) layer, may be terminated in a wireless device (e.g., 110), and in a base station (e.g., 120) on a network side, and perform service and/or functions described above. RRC (e.g., 232 and 241) may be terminated in a wireless device and a base station on a network side. Services and/or functions of RRC may comprise broadcast of system information related to AS and/or NAS; paging (e.g., initiated by a 5GC or a RAN); establishment, maintenance, and/or release of an RRC connection between the wireless device and RAN; security functions such as key management, establishment, configuration, maintenance, and/or release of Signaling Radio Bearers (SRBs) and Data Radio Bearers (DRBs); mobility functions; QoS management functions; wireless device measurement reporting and control of the reporting; detection of and recovery from radio link failure; and/or NAS message transfer to/from NAS from/to a wireless device. NAS control protocol (e.g., 231 and 251) may be terminated in the wireless device and AMF (e.g., 130) on a network side. NAS control protocol may perform functions such as authentication, mobility management between a wireless device and an AMF (e.g., for 3GPP access and non-3GPP access), and/or session management between a wireless device and an SMF (e.g., for 3GPP access and non-3GPP access).

A base station may configure a plurality of logical channels for a wireless device. A logical channel of the plurality of logical channels may correspond to a radio bearer. The radio bearer may be associated with a QoS requirement. A base station may configure a logical channel to be mapped to one or more TTIs and/or numerologies in a plurality of TTIs and/or numerologies. The wireless device may receive Downlink Control Information (DCI) via a Physical Downlink Control CHannel (PDCCH) indicating an uplink grant. The uplink grant may be for a first TTI and/or a first numerology and may indicate uplink resources for transmission of a transport block. The base station may configure each logical channel in the plurality of logical channels with one or more parameters to be used by a logical channel prioritization procedure at the MAC layer of the wireless device. The one or more parameters may comprise, for example, priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or to one or more MAC Control Elements (Ces). The one or more first logical channels may be mapped to the first TTI and/or the first numerology. The MAC layer at the wireless device may multiplex one or more MaC Ces and/or one or more MAC SDUs (e.g., logical channel) in a MAC PDU (e.g., transport block). The MAC PDU may comprise a MAC header comprising a plurality of MAC sub-headers. A MAC sub-header in the plurality of MAC sub-headers may correspond to a MAC CE or a MAC SUD (e.g., logical channel) in the one or more MaC Ces and/or in the one or more MAC SDUs. A MAC CE and/or a logical channel may be configured with a Logical Channel Identifier (LCID). An LCID for a logical channel and/or a MAC CE may be fixed and/or pre-configured. An LCID for a logical channel and/or MAC CE may be configured for the wireless device by the base station. The MAC sub-header corresponding to a MAC CE and/or a MAC SDU may comprise an LCID associated with the MAC CE and/or the MAC SDU.

A base station may activate, deactivate, and/or impact one or more processes (e.g., set values of one or more parameters of the one or more processes or start and/or stop one or more timers of the one or more processes) at the wireless device, for example, by using one or more MAC commands. The one or more MAC commands may comprise one or more MAC control elements. The one or more processes may comprise activation and/or deactivation of PDCP packet duplication for one or more radio bearers. The base station may send (e.g., transmit) a MAC CE comprising one or more fields. The values of the fields may indicate activation and/or deactivation of PDCP duplication for the one or more radio bearers. The one or more processes may comprise Channel State Information (CSI) transmission of on one or more cells. The base station may send (e.g., transmit) one or more MaC Ces indicating activation and/or deactivation of the CSI transmission on the one or more cells. The one or more processes may comprise activation and/or deactivation of one or more secondary cells. The base station may send (e.g., transmit) a MAC CE indicating activation and/or deactivation of one or more secondary cells. The base station may send (e.g., transmit) one or more MaC Ces indicating starting and/or stopping of one or more Discontinuous Reception (DRX) timers at the wireless device. The base station may send (e.g., transmit) one or more MaC Ces indicating one or more timing advance values for one or more Timing Advance Groups (TAGs).

Figure 3:
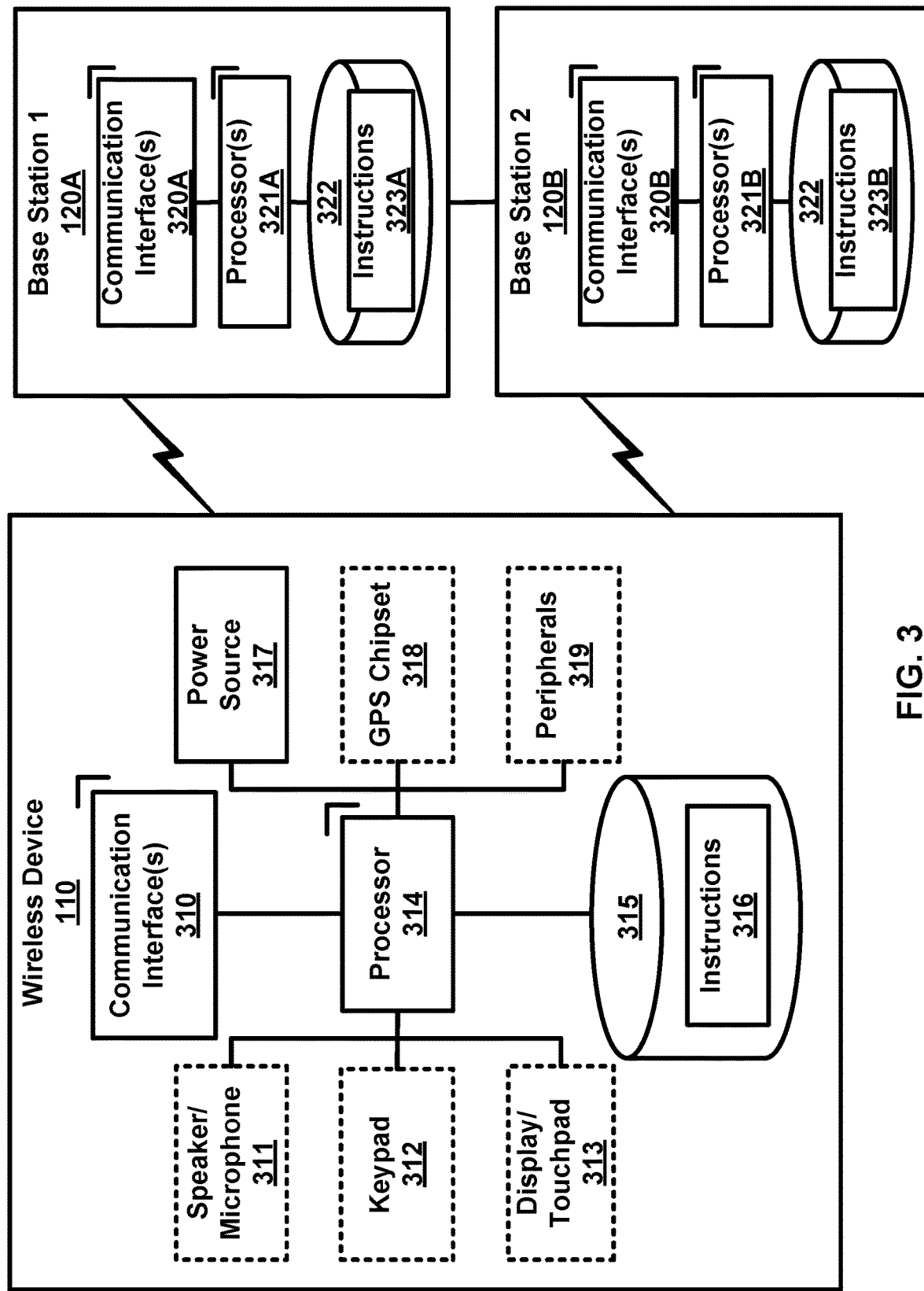
FIG. 3 shows an example wireless device and two base stations.

FIG. 3 shows an example of base stations (base station 1, 120A, and base station 2, 120B) and a wireless device 110. The wireless device 110 may comprise a UE or any other wireless device. The base station (e.g., 120A, 120B) may comprise a Node B, eNB, gNB, ng-eNB, one or more transmission and reception points, or any other base station. A wireless device and/or a base station may perform one or more functions of a relay node. The base station 1, 120A, may comprise at least one communication interface 320A (e.g., a wireless modem, an antenna, a wired modem, and/or the like), at least one processor 321A, and at least one set of program code instructions 323A that may be stored in non-transitory memory 322A and executable by the at least one processor 321A. The base station 2, 120B, may comprise at least one communication interface 320B, at least one processor 321B, and at least one set of program code instructions 323B that may be stored in non-transitory memory 322B and executable by the at least one processor 321B.

A base station may comprise any number of sectors, for example: 1, 2, 3, 4, or 6 sectors. A base station may comprise any number of cells, for example, ranging from 1 to 50 cells or more. A cell may be categorized, for example, as a primary cell or secondary cell. At Radio Resource Control (RRC) connection establishment, re-establishment, handover, etc., a serving cell may provide NAS (non-access stratum) mobility information (e.g., Tracking Area Identifier (TAI)). At RRC connection re-establishment and/or handover, a serving cell may provide security input. This serving cell may be referred to as the Primary Cell (Pcell). In the downlink, a carrier corresponding to the Pcell may be a DL Primary Component Carrier (PCC). In the uplink, a carrier may be an UL PCC. Secondary Cells (Scells) may be configured to form together with a Pcell a set of serving cells, for example, depending on wireless device capabilities. In a downlink, a carrier corresponding to an Scell may be a downlink secondary component carrier (DL SCC). In an uplink, a carrier may be an uplink secondary component carrier (UL SCC). An Scell may or may not have an uplink carrier.

A cell, comprising a downlink carrier and optionally an uplink carrier, may be assigned a physical cell ID and/or a cell index. A carrier (downlink and/or uplink) may belong to one cell. The cell ID and/or cell index may identify the downlink carrier and/or uplink carrier of the cell (e.g., depending on the context it is used). A cell ID may be equally referred to as a carrier ID, and a cell index may be referred to as a carrier index. A physical cell ID and/or a cell index may be assigned to a cell. A cell ID may be determined using a synchronization signal transmitted via a downlink carrier. A cell index may be determined using RRC messages. A first physical cell ID for a first downlink carrier may indicate that the first physical cell ID is for a cell comprising the first downlink carrier. The same concept may be used, for example, with carrier activation and/or deactivation (e.g., secondary cell activation and/or deactivation). A first carrier that is activated may indicate that a cell comprising the first carrier is activated.

A base station may send (e.g., transmit) to a wireless device one or more messages (e.g., RRC messages) comprising a plurality of configuration parameters for one or more cells. One or more cells may comprise at least one primary cell and at least one secondary cell. An RRC message may be broadcasted and/or unicasted to the wireless device. Configuration parameters may comprise common parameters and dedicated parameters.

Services and/or functions of an RRC sublayer may comprise at least one of: broadcast of system information related to AS and/or NAS; paging initiated by a 5GC and/or an NG-RAN; establishment, maintenance, and/or release of an RRC connection between a wireless device and an NG-RAN, which may comprise at least one of addition, modification, and/or release of carrier aggregation; and/or addition, modification, and/or release of dual connectivity in NR or between E-UTRA and NR. Services and/or functions of an RRC sublayer may comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g., intra NR mobility or inter-RAT mobility) and/or a context transfer; and/or a wireless device cell selection and/or reselection and/or control of cell selection and reselection. Services and/or functions of an RRC sublayer may comprise at least one of QoS management functions; a wireless device measurement configuration/reporting; detection of and/or recovery from radio link failure; and/or NAS message transfer to and/or from a core network entity (e.g., AMF, Mobility Management Entity (MME)) from and/or to the wireless device.

An RRC sublayer may support an RRC_Idle state, an RRC_Inactive state, and/or an RRC_Connected state for a wireless device. In an RRC_Idle state, a wireless device may perform at least one of: Public Land Mobile Network (PLMN) selection; receiving broadcasted system information; cell selection and/or re-selection; monitoring and/or receiving a paging for mobile terminated data initiated by 5GC; paging for mobile terminated data area managed by 5GC; and/or DRX for CN paging configured via NAS. In an RRC_Inactive state, a wireless device may perform at least one of: receiving broadcasted system information; cell selection and/or re-selection; monitoring and/or receiving a RAN and/or CN paging initiated by an NG-RAN and/or a 5GC; RAN-based notification area (RNA) managed by an NG-RAN; and/or DRX for a RAN and/or CN paging configured by NG-RAN/NAS. In an RRC_Idle state of a wireless device, a base station (e.g., NG-RAN) may keep a 5GC-NG-RAN connection (e.g., both C/U-planes) for the wireless device; and/or store a wireless device AS context for the wireless device. In an RRC_Connected state of a wireless device, a base station (e.g., NG-RAN) may perform at least one of: establishment of 5GC-NG-RAN connection (both C/U-planes) for the wireless device; storing a UE AS context for the wireless device; send (e.g., transmit) and/or receive of unicast data to and/or from the wireless device; and/or network-controlled mobility based on measurement results received from the wireless device. In an RRC_Connected state of a wireless device, an NG-RAN may know a cell to which the wireless device belongs.

System information (SI) may be divided into minimum SI and other SI. The minimum SI may be periodically broadcast. The minimum SI may comprise basic information required for initial access and/or information for acquiring any other SI broadcast periodically and/or provisioned on-demand (e.g., scheduling information). The other SI may either be broadcast, and/or be provisioned in a dedicated manner, such as either triggered by a network and/or upon request from a wireless device. A minimum SI may be transmitted via two different downlink channels using different messages (e.g., MasterInformationBlock and SystemInformationBlockType1). Another SI may be transmitted via SystemInformationBlockType2. For a wireless device in an RRC_Connected state, dedicated RRC signalling may be used for the request and delivery of the other SI. For the wireless device in the RRC_Idle state and/or in the RRC_Inactive state, the request may trigger a random access procedure.

A wireless device may report its radio access capability information, which may be static. A base station may request one or more indications of capabilities for a wireless device to report based on band information. A temporary capability restriction request may be sent by the wireless device (e.g., if allowed by a network) to signal the limited availability of some capabilities (e.g., due to hardware sharing, interference, and/or overheating) to the base station. The base station may confirm or reject the request. The temporary capability restriction may be transparent to 5GC (e.g., static capabilities may be stored in 5GC).

A wireless device may have an RRC connection with a network, for example, if CA is configured. At RRC connection establishment, re-establishment, and/or handover procedures, a serving cell may provide NAS mobility information. At RRC connection re-establishment and/or handover, a serving cell may provide a security input. This serving cell may be referred to as the Pcell. Scells may be configured to form together with the Pcell a set of serving cells, for example, depending on the capabilities of the wireless device. The configured set of serving cells for the wireless device may comprise a Pcell and one or more Scells.

The reconfiguration, addition, and/or removal of Scells may be performed by RRC messaging. At intra-NR handover, RRC may add, remove, and/or reconfigure Scells for usage with the target Pcell. Dedicated RRC signaling may be used (e.g., if adding a new Scell) to send all required system information of the Scell (e.g., if in connected mode, wireless devices may not acquire broadcasted system information directly from the Scells).

The purpose of an RRC connection reconfiguration procedure may be to modify an RRC connection, (e.g., to establish, modify, and/or release RBs; to perform handover; to setup, modify, and/or release measurements, for example, to add, modify, and/or release Scells and cell groups). NAS dedicated information may be transferred from the network to the wireless device, for example, as part of the RRC connection reconfiguration procedure. The RRCConnectionReconfiguration message may be a command to modify an RRC connection. One or more RRC messages may convey information for measurement configuration, mobility control, and/or radio resource configuration (e.g., RBs, MAC main configuration, and/or physical channel configuration), which may comprise any associated dedicated NAS information and/or security configuration. The wireless device may perform an Scell release, for example, if the received RRC Connection Reconfiguration message includes the sCellToReleaseList. The wireless device may perform Scell additions or modification, for example, if the received RRC Connection Reconfiguration message includes the sCellToAddModList.

An RRC connection establishment, reestablishment, and/or resume procedure may be to establish, reestablish, and/or resume an RRC connection, respectively. An RRC connection establishment procedure may comprise SRB1 establishment. The RRC connection establishment procedure may be used to transfer the initial NAS dedicated information and/or message from a wireless device to an E-UTRAN. The RRCConnectionReestablishment message may be used to re-establish SRB1.

A measurement report procedure may be used to transfer measurement results from a wireless device to an NG-RAN. The wireless device may initiate a measurement report procedure, for example, after successful security activation. A measurement report message may be used to send (e.g., transmit) measurement results.

The wireless device 110 may comprise at least one communication interface 310 (e.g., a wireless modem, an antenna, and/or the like), at least one processor 314, and at least one set of program code instructions 316 that may be stored in non-transitory memory 315 and executable by the at least one processor 314. The wireless device 110 may further comprise at least one of at least one speaker and/or microphone 311, at least one keypad 312, at least one display and/or touchpad 313, at least one power source 317, at least one global positioning system (GPS) chipset 318, and/or other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and/or the like. The processor 314 of the wireless device 110, the processor 321A in base station 1 120A, and/or the processor 321B in base station 2 120B may perform at least one of signal coding and/or processing, data processing, power control, input/output processing, and/or any other functionality that may enable the wireless device 110, the base station 1 120A and/or the base station 2 120B to operate in a wireless environment.

The processor 314 of the wireless device 110 may be connected to and/or in communication with the speaker and/or microphone 311, the keypad 312, and/or the display and/or touchpad 313. The processor 314 may receive user input data from and/or provide user output data to the speaker and/or microphone 311, the keypad 312, and/or the display and/or touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and/or the like. The processor 314 may be connected to the GPS chipset 318. The GPS chipset 318 may be configured to provide geographic location information of the wireless device 110.

The processor 314 of the wireless device 110 may further be connected to and/or in communication with other peripherals 319, which may comprise one or more software and/or hardware modules that may provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and/or the like.

The communication interface 320A of the base station 1, 120A, and/or the communication interface 320B of the base station 2, 120B, may be configured to communicate with the communication interface 310 of the wireless device 110, for example, via a wireless link 330A and/or via a wireless link 330B, respectively. The communication interface 320A of the base station 1, 120A, may communicate with the communication interface 320B of the base station 2 and/or other RAN and/or core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110, and/or the base station 2 120B and the wireless device 110, may be configured to send and receive transport blocks, for example, via the wireless link 330A and/or via the wireless link 330B, respectively. The wireless link 330A and/or the wireless link 330B may use at least one frequency carrier. Transceiver(s) may be used. A transceiver may be a device that comprises both a transmitter and a receiver. Transceivers may be used in devices such as wireless devices, base stations, relay nodes, computing devices, and/or the like. Radio technology may be implemented in the communication interface 310, 320A, and/or 320B, and the wireless link 330A and/or 330B. The radio technology may comprise one or more elements shown in FIG. 4A, FIG. 4B, FIG. 4C, FIG. 4D, FIG. 6, FIG. 7A, FIG. 7B, FIG. 8, and associated text, described below.

Other nodes in a wireless network (e.g. AMF, UPF, SMF, etc.) may comprise one or more communication interfaces, one or more processors, and memory storing instructions. A node (e.g., wireless device, base station, AMF, SMF, UPF, servers, switches, antennas, and/or the like) may comprise one or more processors, and memory storing instructions that when executed by the one or more processors causes the node to perform certain processes and/or functions. Single-carrier and/or multi-carrier communication operation may be performed. A non-transitory tangible computer readable media may comprise instructions executable by one or more processors to cause operation of single-carrier and/or multi-carrier communications. An article of manufacture may comprise a non-transitory tangible computer readable machine-accessible medium having instructions encoded thereon for enabling programmable hardware to cause a node to enable operation of single-carrier and/or multi-carrier communications. The node may include processors, memory, interfaces, and/or the like.

An interface may comprise at least one of a hardware interface, a firmware interface, a software interface, and/or a combination thereof. The hardware interface may comprise connectors, wires, and/or electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and/or code stored in (and/or in communication with) a memory device to implement connections, electronic device operations, protocol(s), protocol layers, communication drivers, device drivers, hardware operations, combinations thereof, and/or the like.

A communication network may comprise the wireless device 110, the base station 1, 120A, the base station 2, 120B, and/or any other device. The communication network may comprise any number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, or any other network for wireless communications. Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network. As used throughout, the term "base station" may comprise one or more of: a base station, a node, a Node B, a gNB, an eNB, an ng-eNB, a relay node (e.g., an integrated access and backhaul (IAB) node), a donor node (e.g., a donor eNB, a donor gNB, etc.), an access point (e.g., a WiFi access point), a computing device, a device capable of wirelessly communicating, or any other device capable of sending and/or receiving signals. As used throughout, the term "wireless device" may comprise one or more of: a UE, a handset, a mobile device, a computing device, a node, a device capable of wirelessly communicating, or any other device capable of sending and/or receiving signals. Any reference to one or more of these terms/devices also considers use of any other term/device mentioned above.

FIG. 4A, FIG. 4B, FIG. 4C and FIG. 4D show examples of uplink and downlink signal transmission. FIG. 4A shows an example uplink transmitter for at least one physical channel A baseband signal representing a physical uplink shared channel may perform one or more functions. The one or more functions may comprise at least one of: scrambling (e.g., by Scrambling); modulation of scrambled bits to generate complex-valued symbols (e.g., by a Modulation mapper); mapping of the complex-valued modulation symbols onto one or several transmission layers (e.g., by a Layer mapper); transform precoding to generate complex-valued symbols (e.g., by a Transform precoder); precoding of the complex-valued symbols (e.g., by a Precoder); mapping of precoded complex-valued symbols to resource elements (e.g., by a Resource element mapper); generation of complex-valued time-domain Single Carrier-Frequency Division Multiple Access (SC-FDMA) or CP-OFDM signal for an antenna port (e.g., by a signal gen.); and/or the like. A SC-FDMA signal for uplink transmission may be generated, for example, if transform precoding is enabled. A CP-OFDM signal for uplink transmission may be generated by FIG. 4A, for example, if transform precoding is not enabled. These functions are shown as examples and other mechanisms may be implemented.

FIG. 4B shows an example of modulation and up-conversion to the carrier frequency of a complex-valued SC-FDMA or CP-OFDM baseband signal for an antenna port and/or for the complex-valued Physical Random Access Channel (PRACH) baseband signal. Filtering may be performed prior to transmission.

FIG. 4C shows an example of downlink transmissions. The baseband signal representing a downlink physical channel may perform one or more functions. The one or more functions may comprise: scrambling of coded bits in a codeword to be transmitted on a physical channel (e.g., by Scrambling); modulation of scrambled bits to generate complex-valued modulation symbols (e.g., by a Modulation mapper); mapping of the complex-valued modulation symbols onto one or several transmission layers (e.g., by a Layer mapper); precoding of the complex-valued modulation symbols on a layer for transmission on the antenna ports (e.g., by Precoding); mapping of complex-valued modulation symbols for an antenna port to resource elements (e.g., by a Resource element mapper); generation of complex-valued time-domain OFDM signal for an antenna port (e.g., by an OFDM signal gen.); and/or the like. These functions are shown as examples and other mechanisms may be implemented.

A base station may send (e.g., transmit) a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. A first antenna port and a second antenna port may be quasi co-located, for example, if one or more large-scale properties of the channel over which a first symbol on the first antenna port is conveyed may be inferred from the channel over which a second symbol on a second antenna port is conveyed. The one or more large-scale properties may comprise at least one of: delay spread; Doppler spread; Doppler shift; average gain; average delay; and/or spatial receiving (Rx) parameters.

FIG. 4D shows an example modulation and up-conversion to the carrier frequency of the complex-valued OFDM baseband signal for an antenna port. Filtering may be performed prior to transmission.

Figure 5A:
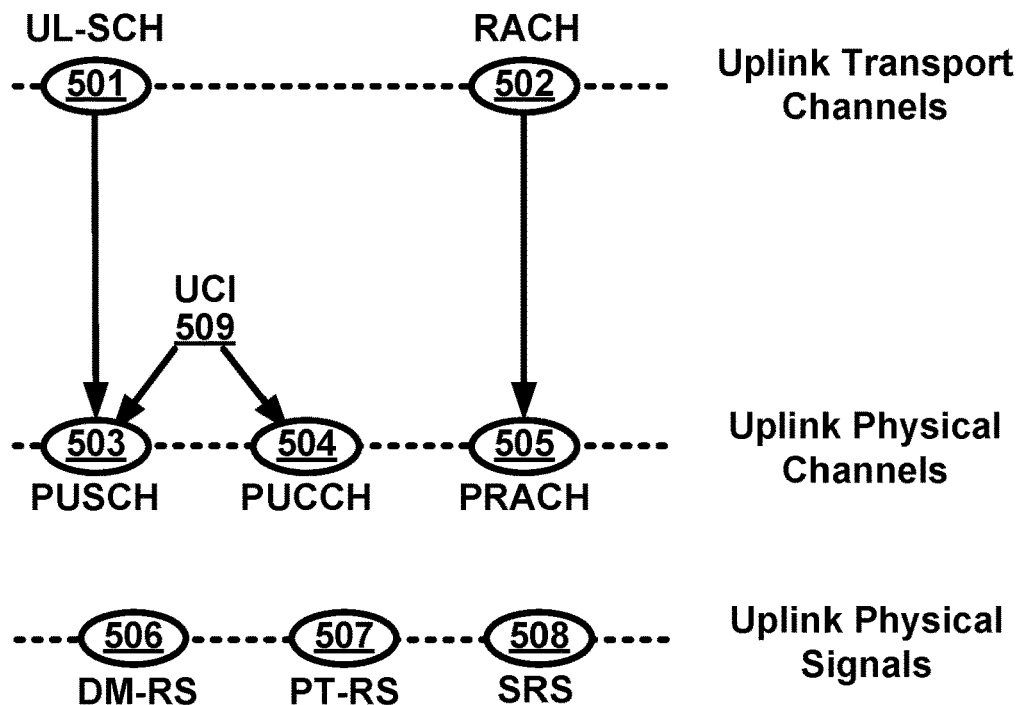
FIG. 5A shows an example uplink channel mapping and example uplink physical signals.

FIG. 5A shows example uplink channel mapping and example uplink physical signals. A physical layer may provide one or more information transfer services to a MAC and/or one or more higher layers. The physical layer may provide the one or more information transfer services to the MAC via one or more transport channels. An information transfer service may indicate how and/or with what characteristics data is transferred over the radio interface.

Uplink transport channels may comprise an Uplink-Shared Channel (UL-SCH) 501 and/or a Random Access Channel (RACH) 502. A wireless device may send (e.g., transmit) one or more uplink DM-RSs 506 to a base station for channel estimation, for example, for coherent demodulation of one or more uplink physical channels (e.g., PUSCH 503 and/or PUCCH 504). The wireless device may send (e.g., transmit) to a base station at least one uplink DM-RS 506 with PUSCH 503 and/or PUCCH 504, wherein the at least one uplink DM-RS 506 may be spanning a same frequency range as a corresponding physical channel. The base station may configure the wireless device with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to send (e.g., transmit) at one or more symbols of a PUSCH and/or PUCCH. The base station may semi-statically configure the wireless device with a maximum number of front-loaded DM-RS symbols for PUSCH and/or PUCCH. The wireless device may schedule a single-symbol DM-RS and/or double symbol DM-RS based on a maximum number of front-loaded DM-RS symbols, wherein the base station may configure the wireless device with one or more additional uplink DM-RS for PUSCH and/or PUCCH. A new radio network may support, for example, at least for CP-OFDM, a common DM-RS structure for DL and UL, wherein a DM-RS location, DM-RS pattern, and/or scrambling sequence may be same or different.

Whether or not an uplink PT-RS 507 is present may depend on an RRC configuration. A presence of the uplink PT-RS may be wireless device-specifically configured. A presence and/or a pattern of the uplink PT-RS 507 in a scheduled resource may be wireless device-specifically configured by a combination of RRC signaling and/or association with one or more parameters used for other purposes (e.g., Modulation and Coding Scheme (MCS)) which may be indicated by DCI. If configured, a dynamic presence of uplink PT-RS 507 may be associated with one or more DCI parameters comprising at least a MCS. A radio network may support a plurality of uplink PT-RS densities defined in time/frequency domain. If present, a frequency domain density may be associated with at least one configuration of a scheduled bandwidth. A wireless device may assume a same precoding for a D-MRS port and a PT-RS port. A number of PT-RS ports may be less than a number of DM-RS ports in a scheduled resource. The uplink PT-RS 507 may be confined in the scheduled time/frequency duration for a wireless device.

A wireless device may send (e.g., transmit) an SRS 508 to a base station for channel state estimation, for example, to support uplink channel dependent scheduling and/or link adaptation. The SRS 508 sent (e.g., transmitted) by the wireless device may allow for the base station to estimate an uplink channel state at one or more different frequencies. A base station scheduler may use an uplink channel state to assign one or more resource blocks of a certain quality (e.g., above a quality threshold) for an uplink PUSCH transmission from the wireless device. The base station may semi-statically configure the wireless device with one or more SRS resource sets. For an SRS resource set, the base station may configure the wireless device with one or more SRS resources. An SRS resource set applicability may be configured by a higher layer (e.g., RRC) parameter. An SRS resource in each of one or more SRS resource sets may be sent (e.g., transmitted) at a time instant, for example, if a higher layer parameter indicates beam management. The wireless device may send (e.g., transmit) one or more SRS resources in different SRS resource sets simultaneously. A new radio network may support aperiodic, periodic, and/or semi-persistent SRS transmissions. The wireless device may send (e.g., transmit) SRS resources, for example, based on one or more trigger types. The one or more trigger types may comprise higher layer signaling (e.g., RRC) and/or one or more DCI formats (e.g., at least one DCI format may be used for a wireless device to select at least one of one or more configured SRS resource sets). An SRS trigger type 0 may refer to an SRS triggered based on a higher layer signaling. An SRS trigger type 1 may refer to an SRS triggered based on one or more DCI formats. The wireless device may be configured to send (e.g., transmit) the SRS 508 after a transmission of PUSCH 503 and corresponding uplink DM-RS 506, for example, if PUSCH 503 and the SRS 508 are transmitted in a same slot.

A base station may semi-statically configure a wireless device with one or more SRS configuration parameters indicating at least one of following: an SRS resource configuration identifier, a number of SRS ports, time domain behavior of SRS resource configuration (e.g., an indication of periodic, semi-persistent, or aperiodic SRS), slot (mini-slot, and/or subframe) level periodicity and/or offset for a periodic and/or aperiodic SRS resource, a number of OFDM symbols in a SRS resource, starting OFDM symbol of a SRS resource, an SRS bandwidth, a frequency hopping bandwidth, a cyclic shift, and/or an SRS sequence ID.

Figure 5B:
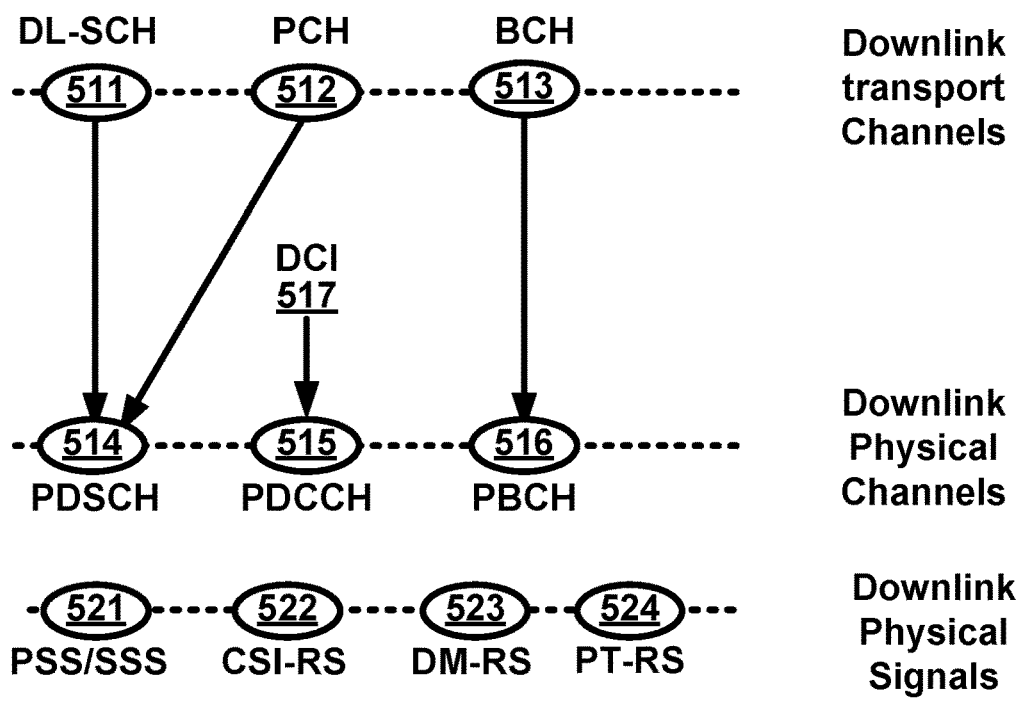
FIG. 5B shows an example downlink channel mapping and example downlink physical signals.

FIG. 5B shows an example downlink channel mapping and downlink physical signals. Downlink transport channels may comprise a Downlink-Shared Channel (DL-SCH) 511, a Paging Channel (PCH) 512, and/or a Broadcast Channel (BCH) 513. A transport channel may be mapped to one or more corresponding physical channels. A UL-SCH 501 may be mapped to a Physical Uplink Shared Channel (PUSCH) 503. A RACH 502 may be mapped to a PRACH 505. A DL-SCH 511 and a PCH 512 may be mapped to a Physical Downlink Shared Channel (PDSCH) 514. A BCH 513 may be mapped to a Physical Broadcast Channel (PBCH) 516.

A radio network may comprise one or more downlink and/or uplink transport channels. The radio network may comprise one or more physical channels without a corresponding transport channel. The one or more physical channels may be used for an Uplink Control Information (UCI) 509 and/or a Downlink Control Information (DCI) 517. A Physical Uplink Control Channel (PUCCH) 504 may carry UCI 509 from a wireless device to a base station. A Physical Downlink Control Channel (PDCCH) 515 may carry the DCI 517 from a base station to a wireless device. The radio network (e.g., NR) may support the UCI 509 multiplexing in the PUSCH 503, for example, if the UCI 509 and the PUSCH 503 transmissions may coincide in a slot (e.g., at least in part). The UCI 509 may comprise at least one of a CSI, an Acknowledgement (ACK)/Negative Acknowledgement (NACK), and/or a scheduling request. The DCI 517 via the PDCCH 515 may indicate at least one of following: one or more downlink assignments and/or one or more uplink scheduling grants.

In uplink, a wireless device may send (e.g., transmit) one or more Reference Signals (RSs) to a base station. The one or more RSs may comprise at least one of a Demodulation-RS (DM-RS) 506, a Phase Tracking-RS (PT-RS) 507, and/or a Sounding RS (SRS) 508. In downlink, a base station may send (e.g., transmit, unicast, multicast, and/or broadcast) one or more RSs to a wireless device. The one or more RSs may comprise at least one of a Primary Synchronization Signal (PSS)/Secondary Synchronization Signal (SSS) 521, a CSI-RS 522, a DM-RS 523, and/or a PT-RS 524.

In a time domain, an SS/PBCH block may comprise one or more OFDM symbols (e.g., 4 OFDM symbols numbered in increasing order from 0 to 3) within the SS/PBCH block. An SS/PBCH block may comprise the PSS/SSS 521 and/or the PBCH 516. In the frequency domain, an SS/PBCH block may comprise one or more contiguous subcarriers (e.g., 240 contiguous subcarriers with the subcarriers numbered in increasing order from 0 to 239) within the SS/PBCH block. The PSS/SSS 521 may occupy, for example, 1 OFDM symbol and 127 subcarriers. The PBCH 516 may span across, for example, 3 OFDM symbols and 240 subcarriers. A wireless device may assume that one or more SS/PBCH blocks transmitted with a same block index may be quasi co-located, for example, with respect to Doppler spread, Doppler shift, average gain, average delay, and/or spatial Rx parameters. A wireless device may not assume quasi co-location for other SS/PBCH block transmissions. A periodicity of an SS/PBCH block may be configured by a radio network (e.g., by an RRC signaling). One or more time locations in which the SS/PBCH block may be sent may be determined by sub-carrier spacing. A wireless device may assume a band-specific sub-carrier spacing for an SS/PBCH block, for example, unless a radio network has configured the wireless device to assume a different sub-carrier spacing.

The downlink CSI-RS 522 may be used for a wireless device to acquire channel state information. A radio network may support periodic, aperiodic, and/or semi-persistent transmission of the downlink CSI-RS 522. A base station may semi-statically configure and/or reconfigure a wireless device with periodic transmission of the downlink CSI-RS 522. A configured CSI-RS resources may be activated and/or deactivated. For semi-persistent transmission, an activation and/or deactivation of a CSI-RS resource may be triggered dynamically. A CSI-RS configuration may comprise one or more parameters indicating at least a number of antenna ports. A base station may configure a wireless device with 32 ports, or any other number of ports. A base station may semi-statically configure a wireless device with one or more CSI-RS resource sets. One or more CSI-RS resources may be allocated from one or more CSI-RS resource sets to one or more wireless devices. A base station may semi-statically configure one or more parameters indicating CSI RS resource mapping, for example, time-domain location of one or more CSI-RS resources, a bandwidth of a CSI-RS resource, and/or a periodicity. A wireless device may be configured to use the same OFDM symbols for the downlink CSI-RS 522 and the Control Resource Set (CORESET), for example, if the downlink CSI-RS 522 and the CORESET are spatially quasi co-located and resource elements associated with the downlink CSI-RS 522 are the outside of PRBs configured for the CORESET. A wireless device may be configured to use the same OFDM symbols for downlink CSI-RS 522 and SS/PBCH blocks, for example, if the downlink CSI-RS 522 and SS/PBCH blocks are spatially quasi co-located and resource elements associated with the downlink CSI-RS 522 are outside of the PRBs configured for the SS/PBCH blocks.

A wireless device may send (e.g., transmit) one or more downlink DM-RSs 523 to a base station for channel estimation, for example, for coherent demodulation of one or more downlink physical channels (e.g., PDSCH 514). A radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statically configure a wireless device with a maximum number of front-loaded DM-RS symbols for PDSCH 514. A DM-RS configuration may support one or more DM-RS ports. A DM-RS configuration may support at least 8 orthogonal downlink DM-RS ports, for example, for single user-MIMO. ADM-RS configuration may support 12 orthogonal downlink DM-RS ports, for example, for multiuser-MIMO. A radio network may support, for example, at least for CP-OFDM, a common DM-RS structure for DL and UL, wherein a DM-RS location, DM-RS pattern, and/or scrambling sequence may be the same or different.

Whether or not the downlink PT-RS 524 is present may depend on an RRC configuration. A presence of the downlink PT-RS 524 may be wireless device-specifically configured. A presence and/or a pattern of the downlink PT-RS 524 in a scheduled resource may be wireless device-specifically configured, for example, by a combination of RRC signaling and/or an association with one or more parameters used for other purposes (e.g., MCS) which may be indicated by the DCI. If configured, a dynamic presence of the downlink PT-RS 524 may be associated with one or more DCI parameters comprising at least MCS. A radio network may support a plurality of PT-RS densities in a time/frequency domain. If present, a frequency domain density may be associated with at least one configuration of a scheduled bandwidth. A wireless device may assume the same precoding for a DM-RS port and a PT-RS port. A number of PT-RS ports may be less than a number of DM-RS ports in a scheduled resource. The downlink PT-RS 524 may be confined in the scheduled time/frequency duration for a wireless device.

Figure 6:
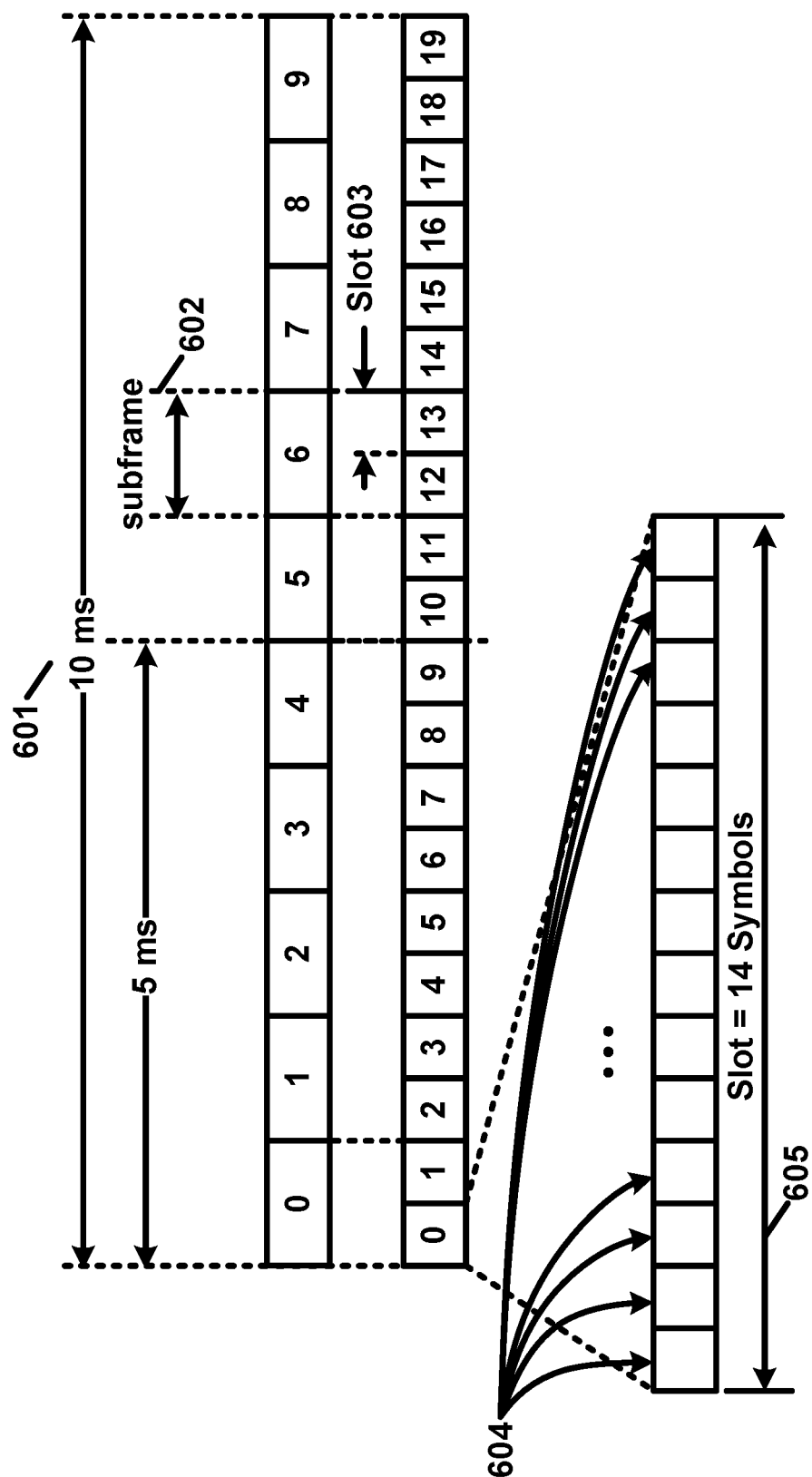
FIG. 6 shows an example transmission time and/or reception time for a carrier.

FIG. 6 shows an example transmission time and reception time for a carrier. A multicarrier OFDM communication system may include one or more carriers, for example, ranging from 1 to 32 carriers (such as for carrier aggregation) or ranging from 1 to 64 carriers (such as for dual connectivity). Different radio frame structures may be supported (e.g., for FDD and/or for TDD duplex mechanisms). FIG. 6 shows an example frame timing. Downlink and uplink transmissions may be organized into radio frames 601. Radio frame duration may be 10 milliseconds (ms). A 10 ms radio frame 601 may be divided into ten equally sized subframes 602, each with a 1 ms duration. Subframe(s) may comprise one or more slots (e.g., slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG. 6, a subframe may be divided into two equally sized slots 603 with 0.5 ms duration. For example, 10 subframes may be available for downlink transmission and 10 subframes may be available for uplink transmissions in a 10 ms interval. Other subframe durations such as, for example, 0.5 ms, 1 ms, 2 ms, and 5 ms may be supported. Uplink and downlink transmissions may be separated in the frequency domain. Slot(s) may include a plurality of OFDM symbols 604. The number of OFDM symbols 604 in a slot 605 may depend on the cyclic prefix length. A slot may be 14 OFDM symbols for the same subcarrier spacing of up to 480 kHz with normal CP. A slot may be 12 OFDM symbols for the same subcarrier spacing of 60 kHz with extended CP. A slot may comprise downlink, uplink, and/or a downlink part and an uplink part, and/or alike.

Figure 7A:
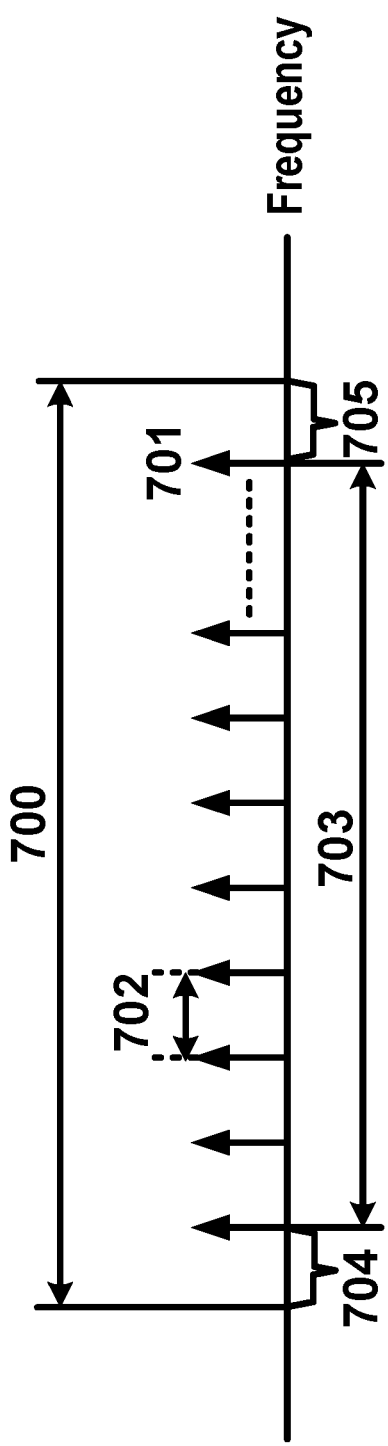
FIG. 7A and FIG. 7B show example sets of orthogonal frequency division multiplexing (OFDM) subcarriers.

FIG. 7A shows example sets of OFDM subcarriers. A base station may communicate with a wireless device using a carrier having an example channel bandwidth 700. Arrow(s) in the example may depict a subcarrier in a multicarrier OFDM system. The OFDM system may use technology such as OFDM technology, SC-FDMA technology, and/or the like. An arrow 701 shows a subcarrier transmitting information symbols. A subcarrier spacing 702, between two contiguous subcarriers in a carrier, may be any one of 15 kHz, 30 kHz, 60 kHz, 120 kHz, 240 kHz, or any other frequency. Different subcarrier spacing may correspond to different transmission numerologies. A transmission numerology may comprise at least: a numerology index; a value of subcarrier spacing; and/or a type of cyclic prefix (CP). A base station may send (e.g., transmit) to and/or receive from a wireless device via a number of subcarriers 703 in a carrier. A bandwidth occupied by a number of subcarriers 703 (e.g., transmission bandwidth) may be smaller than the channel bandwidth 700 of a carrier, for example, due to guard bands 704 and 705. Guard bands 704 and 705 may be used to reduce interference to and from one or more neighbor carriers. A number of subcarriers (e.g., transmission bandwidth) in a carrier may depend on the channel bandwidth of the carrier and/or the subcarrier spacing. A transmission bandwidth, for a carrier with a 20 MHz channel bandwidth and a 15 kHz subcarrier spacing, may be in number of 1024 subcarriers.

A base station and a wireless device may communicate with multiple component carriers (CCs), for example, if configured with CA. Different component carriers may have different bandwidth and/or different subcarrier spacing, for example, if CA is supported. A base station may send (e.g., transmit) a first type of service to a wireless device via a first component carrier. The base station may send (e.g., transmit) a second type of service to the wireless device via a second component carrier. Different types of services may have different service requirements (e.g., data rate, latency, reliability), which may be suitable for transmission via different component carriers having different subcarrier spacing and/or different bandwidth.

Figure 7B:
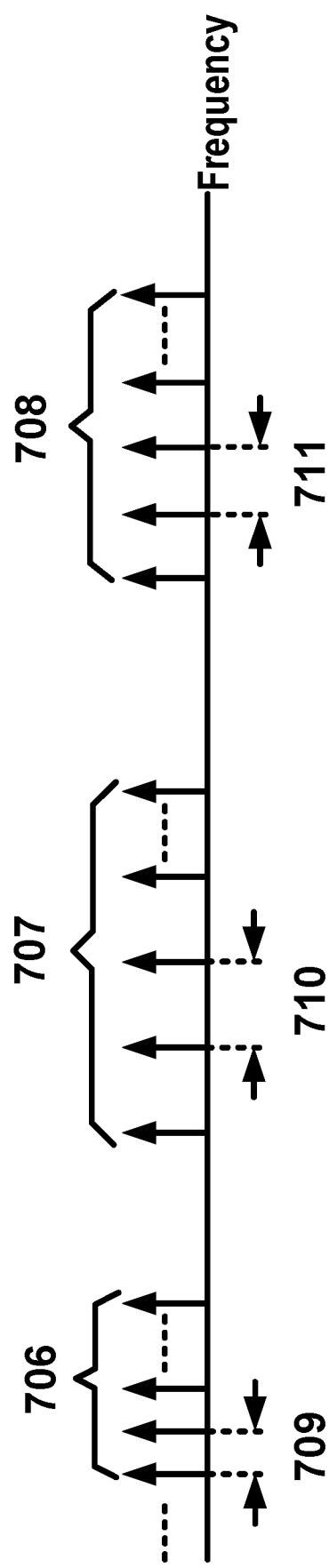

FIG. 7B shows examples of component carriers. A first component carrier may comprise a first number of subcarriers 706 having a first subcarrier spacing 709. A second component carrier may comprise a second number of subcarriers 707 having a second subcarrier spacing 710. A third component carrier may comprise a third number of subcarriers 708 having a third subcarrier spacing 711. Carriers in a multicarrier OFDM communication system may be contiguous carriers, non-contiguous carriers, or a combination of both contiguous and non-contiguous carriers.

Figure 8:
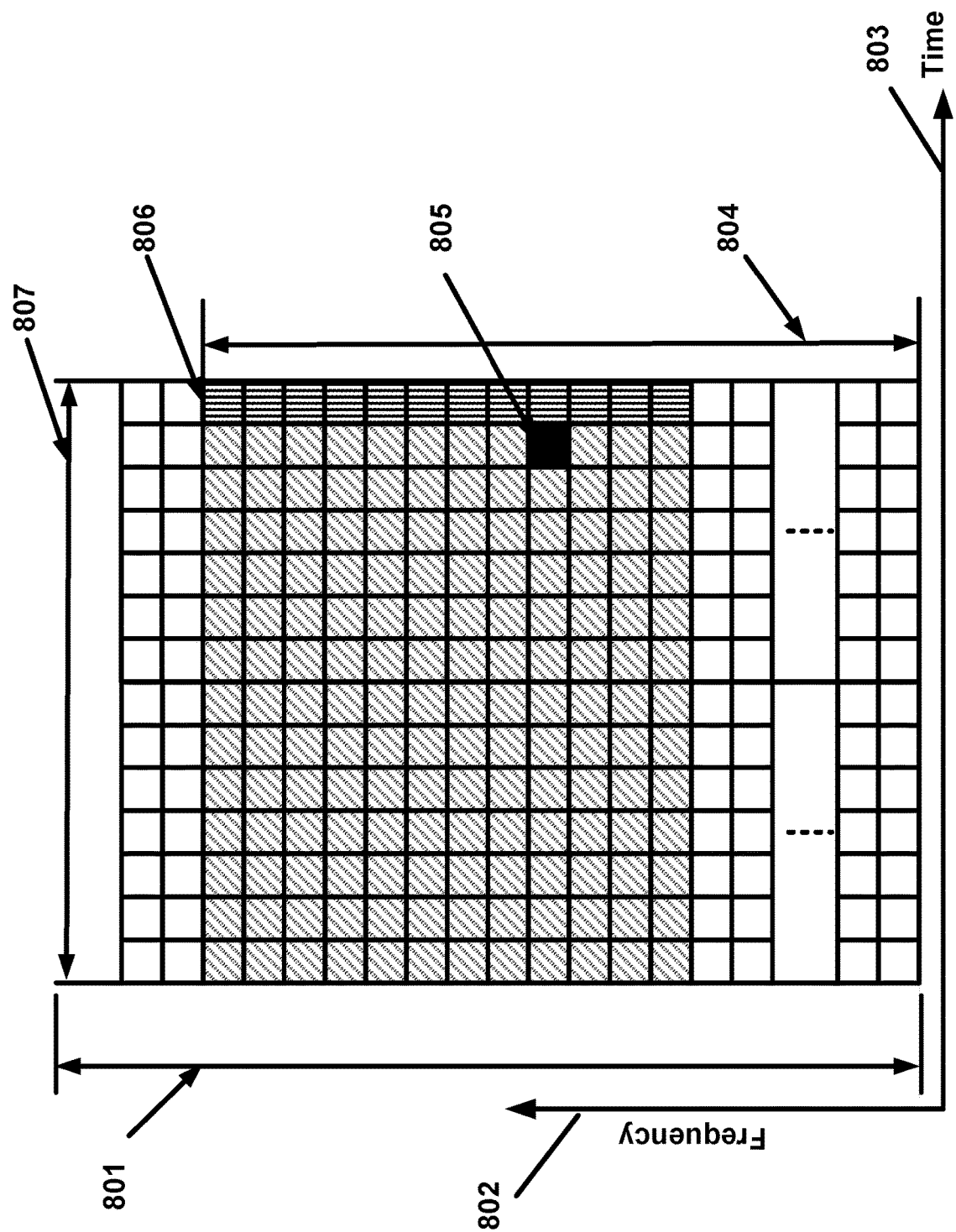
FIG. 8 shows example OFDM radio resources.

FIG. 8 shows an example of OFDM radio resources. A carrier may have a transmission bandwidth 801. A resource grid may be in a structure of frequency domain 802 and time domain 803. A resource grid may comprise a first number of OFDM symbols in a subframe and a second number of resource blocks, starting from a common resource block indicated by higher-layer signaling (e.g., RRC signaling), for a transmission numerology and a carrier. In a resource grid, a resource element 805 may comprise a resource unit that may be identified by a subcarrier index and a symbol index. A subframe may comprise a first number of OFDM symbols 807 that may depend on a numerology associated with a carrier. A subframe may have 14 OFDM symbols for a carrier, for example, if a subcarrier spacing of a numerology of a carrier is 15 kHz. A subframe may have 28 OFDM symbols, for example, if a subcarrier spacing of a numerology is 30 kHz. A subframe may have 56 OFDM symbols, for example, if a subcarrier spacing of a numerology is 60 kHz. A subcarrier spacing of a numerology may comprise any other frequency. A second number of resource blocks comprised in a resource grid of a carrier may depend on a bandwidth and a numerology of the carrier.

A resource block 806 may comprise 12 subcarriers. Multiple resource blocks may be grouped into a Resource Block Group (RBG) 804. A size of a RBG may depend on at least one of: a RRC message indicating a RBG size configuration; a size of a carrier bandwidth; and/or a size of a bandwidth part of a carrier. A carrier may comprise multiple bandwidth parts. A first bandwidth part of a carrier may have a different frequency location and/or a different bandwidth from a second bandwidth part of the carrier.

A base station may send (e.g., transmit), to a wireless device, a downlink control information comprising a downlink or uplink resource block assignment. A base station may send (e.g., transmit) to and/or receive from, a wireless device, data packets (e.g., transport blocks). The data packets may be scheduled on and transmitted via one or more resource blocks and one or more slots indicated by parameters in downlink control information and/or RRC message(s). A starting symbol relative to a first slot of the one or more slots may be indicated to the wireless device. A base station may send (e.g., transmit) to and/or receive from, a wireless device, data packets. The data packets may be scheduled for transmission on one or more RBGs and in one or more slots.

A base station may send (e.g., transmit), to a wireless device, downlink control information comprising a downlink assignment. The base station may send (e.g., transmit) the DCI via one or more PDCCHs. The downlink assignment may comprise parameters indicating at least one of a modulation and coding format; resource allocation; and/or HARQ information related to the DL-SCH. The resource allocation may comprise parameters of resource block allocation; and/or slot allocation. A base station may allocate (e.g., dynamically) resources to a wireless device, for example, via a Cell-Radio Network Temporary Identifier (C-RNTI) on one or more PDCCHs. The wireless device may monitor the one or more PDCCHs, for example, in order to find possible allocation if its downlink reception is enabled. The wireless device may receive one or more downlink data packets on one or more PDSCH scheduled by the one or more PDCCHs, for example, if the wireless device successfully detects the one or more PDCCHs.

A base station may allocate Configured Scheduling (CS) resources for down link transmission to a wireless device. The base station may send (e.g., transmit) one or more RRC messages indicating a periodicity of the CS grant. The base station may send (e.g., transmit) DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages. The CS grant may be implicitly reused, for example, until deactivated.

A base station may send (e.g., transmit), to a wireless device via one or more PDCCHs, downlink control information comprising an uplink grant. The uplink grant may comprise parameters indicating at least one of a modulation and coding format; a resource allocation; and/or HARQ information related to the UL-SCH. The resource allocation may comprise parameters of resource block allocation; and/or slot allocation. The base station may dynamically allocate resources to the wireless device via a C-RNTI on one or more PDCCHs. The wireless device may monitor the one or more PDCCHs, for example, in order to find possible resource allocation. The wireless device may send (e.g., transmit) one or more uplink data packets via one or more PUSCH scheduled by the one or more PDCCHs, for example, if the wireless device successfully detects the one or more PDCCHs.

The base station may allocate CS resources for uplink data transmission to a wireless device. The base station may transmit one or more RRC messages indicating a periodicity of the CS grant. The base station may send (e.g., transmit) DCI via a PDCCH addressed to a CS-RNTI to activate the CS resources. The DCI may comprise parameters indicating that the uplink grant is a CS grant. The CS grant may be implicitly reused according to the periodicity defined by the one or more RRC message, The CS grant may be implicitly reused, for example, until deactivated.

A base station may send (e.g., transmit) DCI and/or control signaling via a PDCCH. The DCI may comprise a format of a plurality of formats. The DCI may comprise downlink and/or uplink scheduling information (e.g., resource allocation information, HARQ related parameters, MCS), request(s) for CSI (e.g., aperiodic CQI reports), request(s) for an SRS, uplink power control commands for one or more cells, one or more timing information (e.g., TB transmission/reception timing, HARQ feedback timing, etc.), and/or the like. The DCI may indicate an uplink grant comprising transmission parameters for one or more transport blocks. The DCI may indicate a downlink assignment indicating parameters for receiving one or more transport blocks. The DCI may be used by the base station to initiate a contention-free random access at the wireless device. The base station may send (e.g., transmit) DCI comprising a slot format indicator (SFI) indicating a slot format. The base station may send (e.g., transmit) DCI comprising a pre-emption indication indicating the PRB(s) and/or OFDM symbol(s) in which a wireless device may assume no transmission is intended for the wireless device. The base station may send (e.g., transmit) DCI for group power control of the PUCCH, the PUSCH, and/or an SRS. DCI may correspond to an RNTI. The wireless device may obtain an RNTI after or in response to completing the initial access (e.g., C-RNTI). The base station may configure an RNTI for the wireless (e.g., CS-RNTI, TPC-CS-RNTI, TPC-PUCCH-RNTI, TPC-PUSCH-RNTI, TPC-SRS-RNTI, etc.). The wireless device may determine (e.g., compute) an RNTI (e.g., the wireless device may determine the RA-RNTI based on resources used for transmission of a preamble). An RNTI may have a pre-configured value (e.g., P-RNTI or SI-RNTI). The wireless device may monitor a group common search space which may be used by the base station for sending (e.g., transmitting) DCIs that are intended for a group of wireless devices. A group common DCI may correspond to an RNTI which is commonly configured for a group of wireless devices. The wireless device may monitor a wireless device-specific search space. A wireless device specific DCI may correspond to an RNTI configured for the wireless device.

A communications system (e.g., an NR system) may support a single beam operation and/or a multi-beam operation. In a multi-beam operation, a base station may perform a downlink beam sweeping to provide coverage for common control channels and/or downlink SS blocks, which may comprise at least a PSS, a SSS, and/or PBCH. A wireless device may measure quality of a beam pair link using one or more RSs. One or more SS blocks, or one or more CSI-RS resources (e.g., which may be associated with a CSI-RS resource index (CRI)), and/or one or more DM-RSs of a PBCH, may be used as an RS for measuring a quality of a beam pair link. The quality of a beam pair link may be based on a reference signal received power (RSRP) value, a reference signal received quality (RSRQ) value, and/or a CSI value measured on RS resources. The base station may indicate whether an RS resource, used for measuring a beam pair link quality, is quasi-co-located (QCLed) with DM-RSs of a control channel. An RS resource and DM-RSs of a control channel may be called QCLed, for example, if channel characteristics from a transmission on an RS to a wireless device, and that from a transmission on a control channel to a wireless device, are similar or the same under a configured criterion. In a multi-beam operation, a wireless device may perform an uplink beam sweeping to access a cell.

A wireless device may be configured to monitor a PDCCH on one or more beam pair links simultaneously, for example, depending on a capability of the wireless device. This monitoring may increase robustness against beam pair link blocking. A base station may send (e.g., transmit) one or more messages to configure the wireless device to monitor the PDCCH on one or more beam pair links in different PDCCH OFDM symbols. A base station may send (e.g., transmit) higher layer signaling (e.g., RRC signaling) and/or a MAC CE comprising parameters related to the Rx beam setting of the wireless device for monitoring the PDCCH on one or more beam pair links. The base station may send (e.g., transmit) an indication of a spatial QCL assumption between an DL RS antenna port(s) (e.g., a cell-specific CSI-RS, a wireless device-specific CSI-RS, an SS block, and/or a PBCH with or without DM-RSs of the PBCH) and/or DL RS antenna port(s) for demodulation of a DL control channel. Signaling for beam indication for a PDCCH may comprise MAC CE signaling, RRC signaling, DCI signaling, and/or specification-transparent and/or implicit method, and/or any combination of signaling methods.

A base station may indicate spatial QCL parameters between DL RS antenna port(s) and DM-RS antenna port(s) of a DL data channel, for example, for reception of a unicast DL data channel. The base station may send (e.g., transmit) DCI (e.g., downlink grants) comprising information indicating the RS antenna port(s). The information may indicate RS antenna port(s) that may be QCL-ed with the DM-RS antenna port(s). A different set of DM-RS antenna port(s) for a DL data channel may be indicated as QCL with a different set of the RS antenna port(s).

Figure 9A:
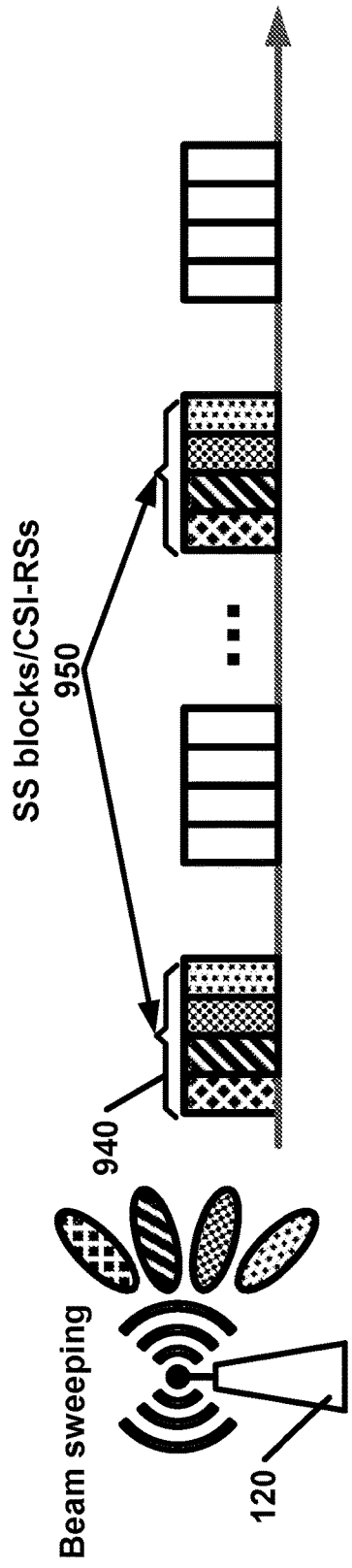
FIG. 9A shows an example channel state information reference signal (CSI-RS) and/or synchronization signal (SS) block transmission in a multi-beam system.

FIG. 9A shows an example of beam sweeping in a DL channel. In an RRC_INACTIVE state or RRC_IDLE state, a wireless device may assume that SS blocks form an SS burst 940, and an SS burst set 950. The SS burst set 950 may have a given periodicity. A base station 120 may send (e.g., transmit) SS blocks in multiple beams, together forming an SS burst 940, for example, in a multi-beam operation. One or more SS blocks may be sent (e.g., transmitted) on one beam. If multiple SS bursts 940 are transmitted with multiple beams, the SS bursts 940 together may form the SS burst set 950.

A wireless device may use CSI-RS for estimating a beam quality of a link between a wireless device and a base station, for example, in the multi beam operation. A beam may be associated with a CSI-RS. A wireless device may (e.g., based on a RSRP measurement on CSI-RS) report a beam index, which may be indicated in a CRI for downlink beam selection and/or associated with an RSRP value of a beam. A CSI-RS may be sent (e.g., transmitted) on a CSI-RS resource, which may comprise at least one of: one or more antenna ports and/or one or more time and/or frequency radio resources. A CSI-RS resource may be configured in a cell-specific way such as by common RRC signaling, or in a wireless device-specific way such as by dedicated RRC signaling and/or L1/L2 signaling. Multiple wireless devices covered by a cell may measure a cell-specific CSI-RS resource. A dedicated subset of wireless devices covered by a cell may measure a wireless device-specific CSI-RS resource.

A CSI-RS resource may be sent (e.g., transmitted) periodically, using aperiodic transmission, or using a multi-shot or semi-persistent transmission. In a periodic transmission in FIG. 9A, a base station 120 may send (e.g., transmit) configured CSI-RS resources 940 periodically using a configured periodicity in a time domain. In an aperiodic transmission, a configured CSI-RS resource may be sent (e.g., transmitted) in a dedicated time slot. In a multi-shot and/or semi-persistent transmission, a configured CSI-RS resource may be sent (e.g., transmitted) within a configured period. Beams used for CSI-RS transmission may have a different beam width than beams used for SS-blocks transmission.

Figure 9B:
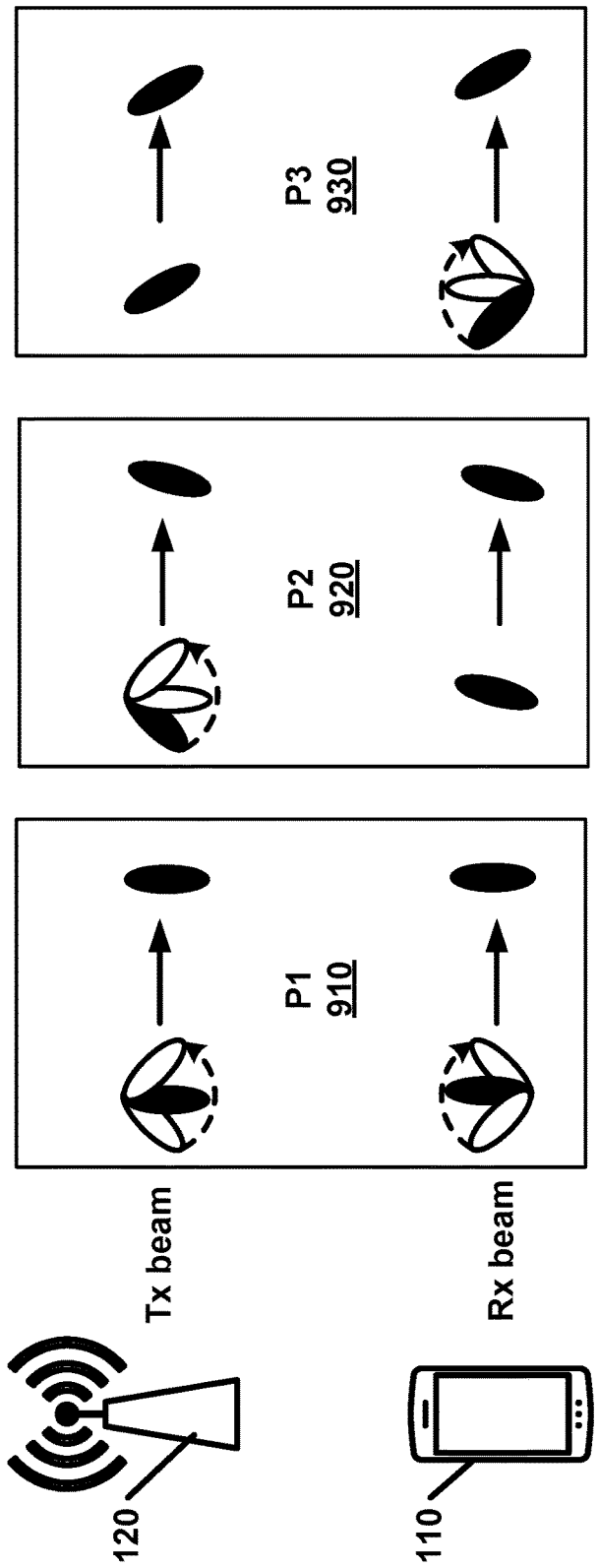
FIG. 9B shows an example downlink beam management procedure.

FIG. 9B shows an example of a beam management procedure, such as new radio network. The base station 120 and/or the wireless device 110 may perform a downlink L1/L2 beam management procedure. One or more of the following downlink L1/L2 beam management procedures may be performed within one or more wireless devices 110 and one or more base stations 120. A P1 procedure 910 may be used to enable the wireless device 110 to measure one or more Transmission (Tx) beams associated with the base station 120, for example, to support a selection of a first set of Tx beams associated with the base station 120 and a first set of Rx beam(s) associated with the wireless device 110. A base station 120 may sweep a set of different Tx beams, for example, for beamforming at a base station 120 (such as shown in the top row, in a counter-clockwise direction). A wireless device 110 may sweep a set of different Rx beams, for example, for beamforming at a wireless device 110 (such as shown in the bottom row, in a clockwise direction). A P2 procedure 920 may be used to enable a wireless device 110 to measure one or more Tx beams associated with a base station 120, for example, to possibly change a first set of Tx beams associated with a base station 120. A P2 procedure 920 may be performed on a possibly smaller set of beams (e.g., for beam refinement) than in the P1 procedure 910. A P2 procedure 920 may be a special example of a P1 procedure 910. A P3 procedure 930 may be used to enable a wireless device 110 to measure at least one Tx beam associated with a base station 120, for example, to change a first set of Rx beams associated with a wireless device 110.

A wireless device 110 may send (e.g., transmit) one or more beam management reports to a base station 120. In one or more beam management reports, a wireless device 110 may indicate one or more beam pair quality parameters comprising one or more of: a beam identification; an RSRP; a Precoding Matrix Indicator (PMI), Channel Quality Indicator (CQI), and/or Rank Indicator (RI) of a subset of configured beams. Based on one or more beam management reports, the base station 120 may send (e.g., transmit) to a wireless device 110 a signal indicating that one or more beam pair links are one or more serving beams. The base station 120 may send (e.g., transmit) the PDCCH and the PDSCH for a wireless device 110 using one or more serving beams.

A communications network (e.g., a new radio network) may support a Bandwidth Adaptation (BA). Receive and/or transmit bandwidths that may be configured for a wireless device using a BA may not be large. Receive and/or transmit bandwidth may not be as large as a bandwidth of a cell. Receive and/or transmit bandwidths may be adjustable. A wireless device may change receive and/or transmit bandwidths, for example, to reduce (e.g., shrink) the bandwidth(s) at (e.g., during) a period of low activity such as to save power. A wireless device may change a location of receive and/or transmit bandwidths in a frequency domain, for example, to increase scheduling flexibility. A wireless device may change a subcarrier spacing, for example, to allow different services.

A Bandwidth Part (BWP) may comprise a subset of a total cell bandwidth of a cell. A base station may configure a wireless device with one or more BWPs, for example, to achieve a BA. A base station may indicate, to a wireless device, which of the one or more (configured) BWPs is an active BWP.

Figure 10:
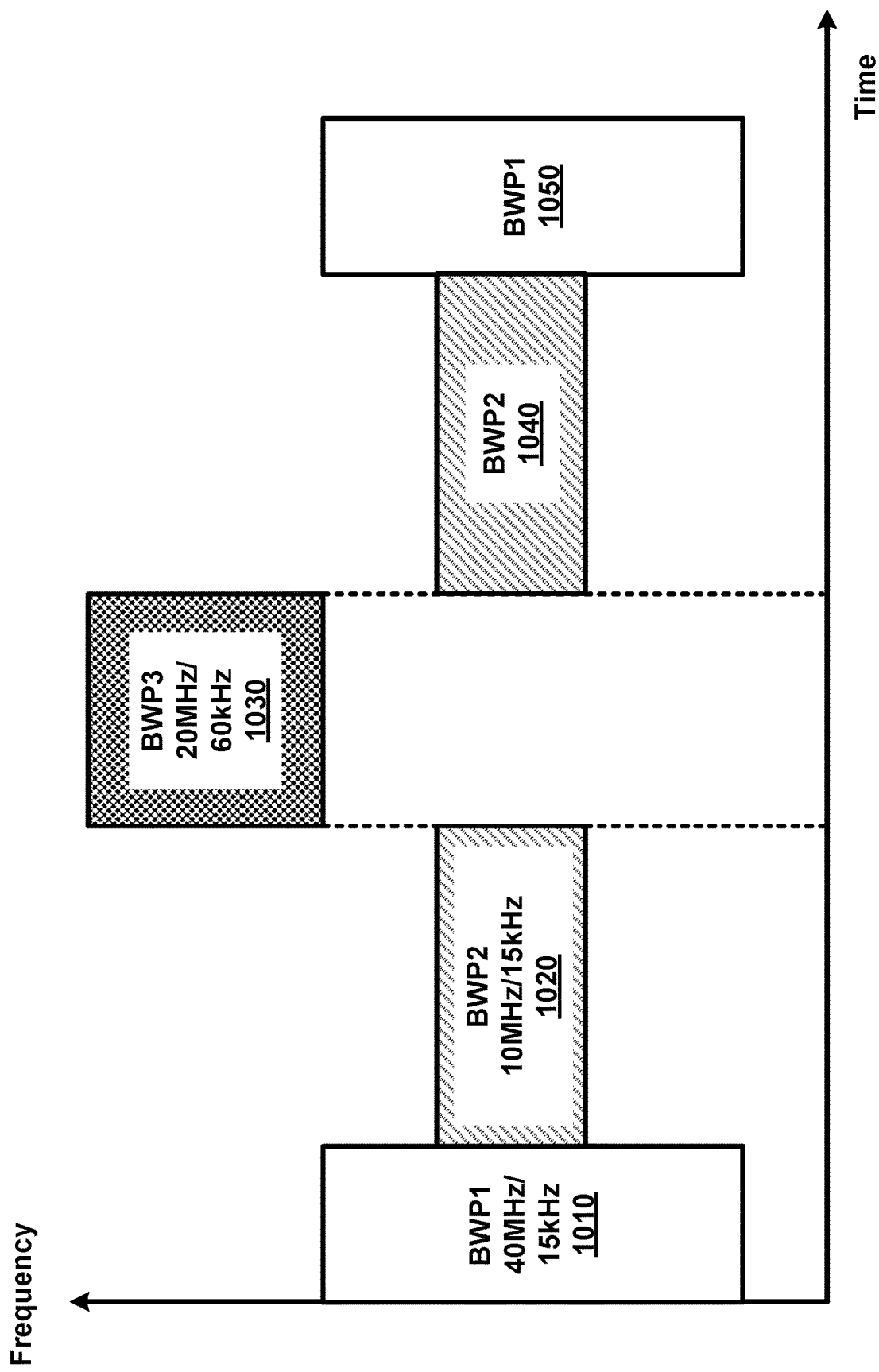
FIG. 10 shows an example of configured bandwidth parts (BWPs).

FIG. 10 shows an example of BWP configurations. BWPs may be configured as follows: BWP1 (1010 and 1050) with a width of 40 MHz and subcarrier spacing of 15 kHz; BWP2 (1020 and 1040) with a width of 10 MHz and subcarrier spacing of 15 kHz; BWP3 1030 with a width of 20 MHz and subcarrier spacing of 60 kHz. Any number of BWP configurations may comprise any other width and subcarrier spacing combination.

A wireless device, configured for operation in one or more BWPs of a cell, may be configured by one or more higher layers (e.g., RRC layer). The wireless device may be configured for a cell with: a set of one or more BWPs (e.g., at most four BWPs) for reception (e.g., a DL BWP set) in a DL bandwidth by at least one parameter DL-BWP; and a set of one or more BWPs (e.g., at most four BWPs) for transmissions (e.g., UL BWP set) in an UL bandwidth by at least one parameter UL-BWP. BWPs are described as example resources. Any wireless resource may be applicable to one or more procedures described herein.

A base station may configure a wireless device with one or more UL and DL BWP pairs, for example, to enable BA on the Pcell. To enable BA on Scells (e.g., for CA), a base station may configure a wireless device at least with one or more DL BWPs (e.g., there may be none in an UL).

An initial active DL BWP may comprise at least one of a location and number of contiguous PRBs, a subcarrier spacing, or a cyclic prefix, for example, for a control resource set for at least one common search space. For operation on the Pcell, one or more higher layer parameters may indicate at least one initial UL BWP for a random access procedure. If a wireless device is configured with a secondary carrier on a primary cell, the wireless device may be configured with an initial BWP for random access procedure on a secondary carrier.

A wireless device may expect that a center frequency for a DL BWP may be same as a center frequency for a UL BWP, for example, for unpaired spectrum operation. A base station may semi-statically configure a wireless device for a cell with one or more parameters, for example, for a DL BWP or an UL BWP in a set of one or more DL BWPs or one or more UL BWPs, respectively. The one or more parameters may indicate one or more of following: a subcarrier spacing; a cyclic prefix; a number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; and/or an offset of a first PRB of a DL bandwidth or an UL bandwidth, respectively, relative to a first PRB of a bandwidth.

For a DL BWP in a set of one or more DL BWPs on a Pcell, a base station may configure a wireless device with one or more control resource sets for at least one type of common search space and/or one wireless device-specific search space. A base station may refrain from configuring a wireless device without a common search space on a Pcell, or on a PSCell, in an active DL BWP. For an UL BWP in a set of one or more UL BWPs, a base station may configure a wireless device with one or more resource sets for one or more PUCCH transmissions.

DCI may comprise a BWP indicator field. The BWP indicator field value may indicate an active DL BWP, from a configured DL BWP set, for one or more DL receptions. The BWP indicator field value may indicate an active UL BWP, from a configured UL BWP set, for one or more UL transmissions.

For a Pcell, a base station may semi-statically configure a wireless device with a default DL BWP among configured DL BWPs. If a wireless device is not provided with a default DL BWP, a default BWP may be an initial active DL BWP. A default BWP may not be configured for one or more wireless devices. A first (or initial) BWP may serve as a default BWP, for example, if a default BWP is not configured.

A base station may configure a wireless device with a timer value for a Pcell. A wireless device may start a timer (e.g., a BWP inactivity timer), for example, if a wireless device detects DCI indicating an active DL BWP, other than a default DL BWP, for a paired spectrum operation, and/or if a wireless device detects DCI indicating an active DL BWP or UL BWP, other than a default DL BWP or UL BWP, for an unpaired spectrum operation. The wireless device may increment the timer by an interval of a first value (e.g., the first value may be 1 millisecond, 0.5 milliseconds, or any other time duration), for example, if the wireless device does not detect DCI at (e.g., during) the interval for a paired spectrum operation or for an unpaired spectrum operation. The timer may expire at a time that the timer is equal to the timer value. A wireless device may switch to the default DL BWP from an active DL BWP, for example, if the timer expires.

A base station may semi-statically configure a wireless device with one or more BWPs. A wireless device may switch an active BWP from a first BWP to a second BWP, for example, after or in response to receiving DCI indicating the second BWP as an active BWP, and/or after or in response to an expiry of BWP inactivity timer (e.g., the second BWP may be a default BWP). FIG. 10 shows an example of three BWPs configured, BWP1 (1010 and 1050), BWP2 (1020 and 1040), and BWP3 (1030). BWP2 (1020 and 1040) may be a default BWP. BWP1 (1010) may be an initial active BWP. A wireless device may switch an active BWP from BWP1 1010 to BWP2 1020, for example, after or in response to an expiry of the BWP inactivity timer. A wireless device may switch an active BWP from BWP2 1020 to BWP3 1030, for example, after or in response to receiving DCI indicating BWP3 1030 as an active BWP. Switching an active BWP from BWP3 1030 to BWP2 1040 and/or from BWP2 1040 to BWP1 1050 may be after or in response to receiving DCI indicating an active BWP, and/or after or in response to an expiry of BWP inactivity timer.

Wireless device procedures on a secondary cell may be same as on a primary cell using the timer value for the secondary cell and the default DL BWP for the secondary cell, for example, if a wireless device is configured for a secondary cell with a default DL BWP among configured DL BWPs and a timer value. A wireless device may use an indicated DL BWP and an indicated UL BWP on a secondary cell as a respective first active DL BWP and first active UL BWP on a secondary cell or carrier, for example, if a base station configures a wireless device with a first active DL BWP and a first active UL BWP on a secondary cell or carrier.

Figure 11A:
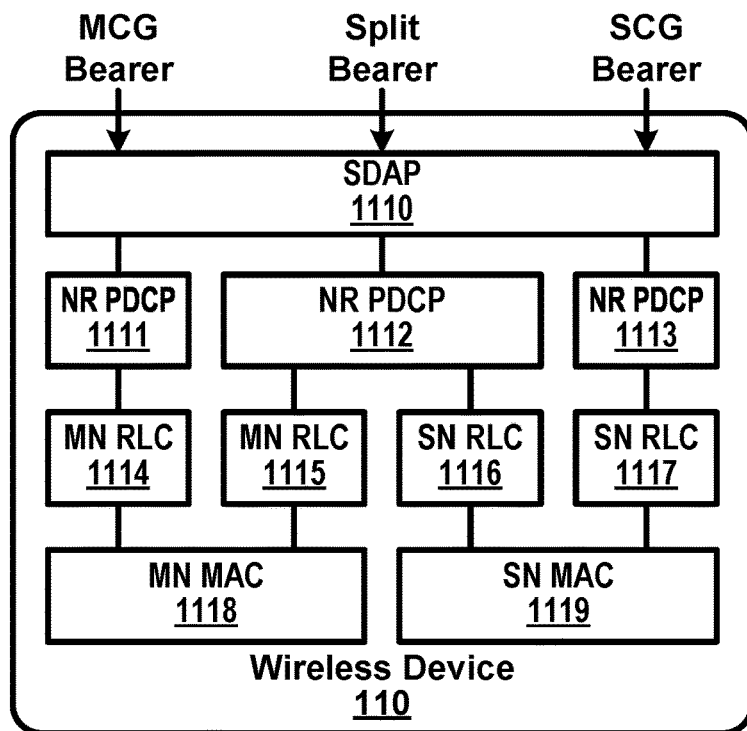
FIG. 11A and FIG. 11B show examples of multi connectivity.
Figure 11B:
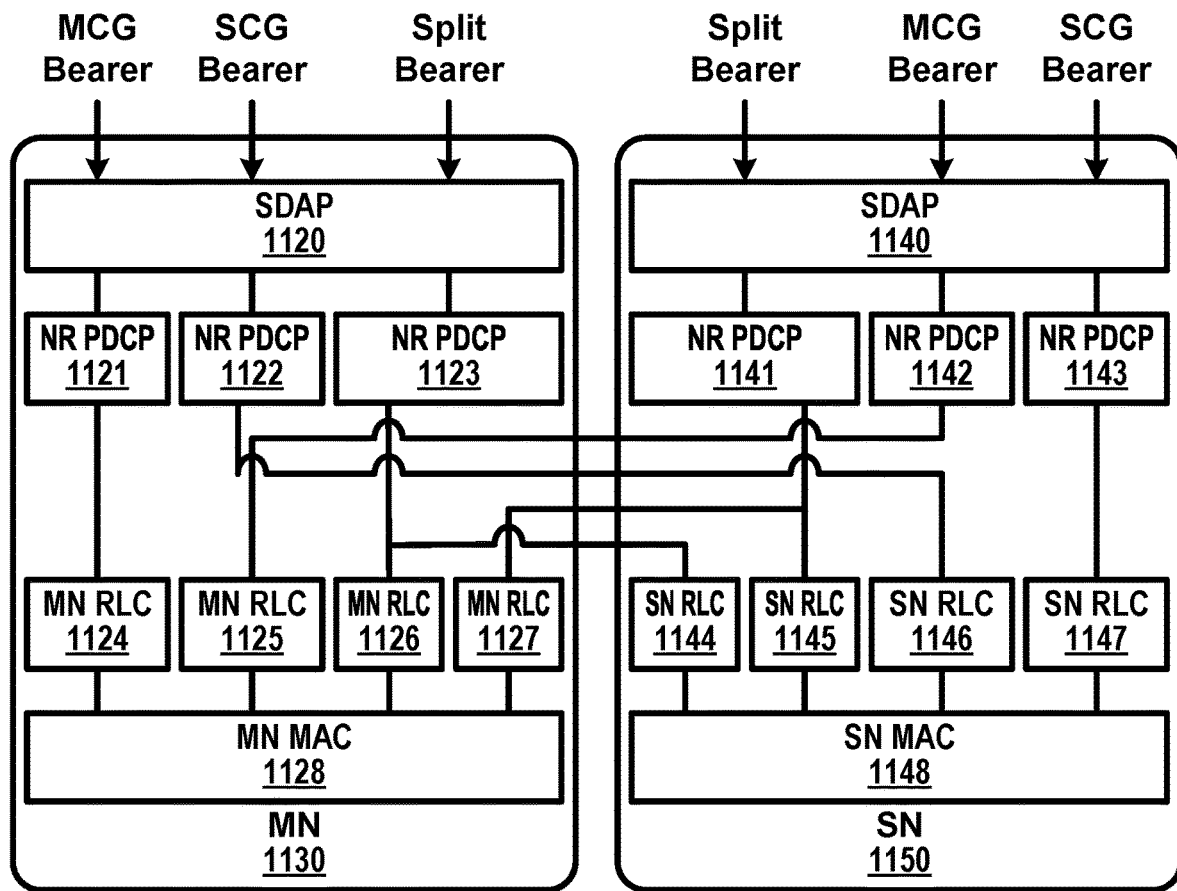

FIG. 11A and FIG. 11B show packet flows using a multi connectivity (e.g., dual connectivity, multi connectivity, tight interworking, and/or the like). FIG. 11A shows an example of a protocol structure of a wireless device 110 (e.g., UE) with CA and/or multi connectivity. FIG. 11B shows an example of a protocol structure of multiple base stations with CA and/or multi connectivity. The multiple base stations may comprise a master node, MN 1130 (e.g., a master node, a master base station, a master gNB, a master eNB, and/or the like) and a secondary node, SN 1150 (e.g., a secondary node, a secondary base station, a secondary gNB, a secondary eNB, and/or the like). A master node 1130 and a secondary node 1150 may co-work to communicate with a wireless device 110.

If multi connectivity is configured for a wireless device 110, the wireless device 110, which may support multiple reception and/or transmission functions in an RRC connected state, may be configured to utilize radio resources provided by multiple schedulers of a multiple base stations. Multiple base stations may be inter-connected via a non-ideal or ideal backhaul (e.g., Xn interface, X2 interface, and/or the like). A base station involved in multi connectivity for a certain wireless device may perform at least one of two different roles: a base station may act as a master base station or act as a secondary base station. In multi connectivity, a wireless device may be connected to one master base station and one or more secondary base stations. A master base station (e.g., the MN 1130) may provide a master cell group (MCG) comprising a primary cell and/or one or more secondary cells for a wireless device (e.g., the wireless device 110). A secondary base station (e.g., the SN 1150) may provide a secondary cell group (SCG) comprising a primary secondary cell (PSCell) and/or one or more secondary cells for a wireless device (e.g., the wireless device 110).

In multi connectivity, a radio protocol architecture that a bearer uses may depend on how a bearer is setup. Three different types of bearer setup options may be supported: an MCG bearer, an SCG bearer, and/or a split bearer. A wireless device may receive and/or send (e.g., transmit) packets of an MCG bearer via one or more cells of the MCG. A wireless device may receive and/or send (e.g., transmit) packets of an SCG bearer via one or more cells of an SCG. Multi-connectivity may indicate having at least one bearer configured to use radio resources provided by the secondary base station. Multi-connectivity may or may not be configured and/or implemented.

A wireless device (e.g., wireless device 110) may send (e.g., transmit) and/or receive: packets of an MCG bearer via an SDAP layer (e.g., SDAP 1110), a PDCP layer (e.g., NR PDCP 1111), an RLC layer (e.g., MN RLC 1114), and a MAC layer (e.g., MN MAC 1118); packets of a split bearer via an SDAP layer (e.g., SDAP 1110), a PDCP layer (e.g., NR PDCP 1112), one of a master or secondary RLC layer (e.g., MN RLC 1115, SN RLC 1116), and one of a master or secondary MAC layer (e.g., MN MAC 1118, SN MAC 1119); and/or packets of an SCG bearer via an SDAP layer (e.g., SDAP 1110), a PDCP layer (e.g., NR PDCP 1113), an RLC layer (e.g., SN RLC 1117), and a MAC layer (e.g., MN MAC 1119).

A master base station (e.g., MN 1130) and/or a secondary base station (e.g., SN 1150) may send (e.g., transmit) and/or receive: packets of an MCG bearer via a master or secondary node SDAP layer (e.g., SDAP 1120, SDAP 1140), a master or secondary node PDCP layer (e.g., NR PDCP 1121, NR PDCP 1142), a master node RLC layer (e.g., MN RLC 1124, MN RLC 1125), and a master node MAC layer (e.g., MN MAC 1128); packets of an SCG bearer via a master or secondary node SDAP layer (e.g., SDAP 1120, SDAP 1140), a master or secondary node PDCP layer (e.g., NR PDCP 1122, NR PDCP 1143), a secondary node RLC layer (e.g., SN RLC 1146, SN RLC 1147), and a secondary node MAC layer (e.g., SN MAC 1148); packets of a split bearer via a master or secondary node SDAP layer (e.g., SDAP 1120, SDAP 1140), a master or secondary node PDCP layer (e.g., NR PDCP 1123, NR PDCP 1141), a master or secondary node RLC layer (e.g., MN RLC 1126, SN RLC 1144, SN RLC 1145, MN RLC 1127), and a master or secondary node MAC layer (e.g., MN MAC 1128, SN MAC 1148).

In multi connectivity, a wireless device may configure multiple MAC entities, such as one MAC entity (e.g., MN MAC 1118) for a master base station, and other MAC entities (e.g., SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be used. At least one cell of an SCG may have a configured UL CC and at least one cell of a SCG, named as primary secondary cell (e.g., PSCell, Pcell of SCg, Pcell), and may be configured with PUCCH resources. If an SCG is configured, there may be at least one SCG bearer or one split bearer. After or upon detection of a physical layer problem or a random access problem on a PSCell, or a number of NR RLC retransmissions has been reached associated with the SCG, or after or upon detection of an access problem on a PSCell associated with (e.g., during) a SCG addition or an SCG change: an RRC connection re-establishment procedure may not be triggered, UL transmissions towards cells of an SCG may be stopped, a master base station may be informed by a wireless device of a SCG failure type, a DL data transfer over a master base station may be maintained (e.g., for a split bearer). An NR RLC acknowledged mode (AM) bearer may be configured for a split bearer. A Pcell and/or a PSCell may not be de-activated. A PSCell may be changed with a SCG change procedure (e.g., with security key change and a RACH procedure). A bearer type change between a split bearer and a SCG bearer, and/or simultaneous configuration of a SCG and a split bearer, may or may not be supported.

With respect to interactions between a master base station and a secondary base stations for multi-connectivity, one or more of the following may be used. A master base station and/or a secondary base station may maintain Radio Resource Management (RRM) measurement configurations of a wireless device. A master base station may determine (e.g., based on received measurement reports, traffic conditions, and/or bearer types) to request a secondary base station to provide additional resources (e.g., serving cells) for a wireless device. After or upon receiving a request from a master base station, a secondary base station may create and/or modify a container that may result in a configuration of additional serving cells for a wireless device (or decide that the secondary base station has no resource available to do so). For a wireless device capability coordination, a master base station may provide (e.g., all or a part of) an AS configuration and wireless device capabilities to a secondary base station. A master base station and a secondary base station may exchange information about a wireless device configuration such as by using RRC containers (e.g., inter-node messages) carried via Xn messages. A secondary base station may initiate a reconfiguration of the secondary base station existing serving cells (e.g., PUCCH towards the secondary base station). A secondary base station may decide which cell is a PSCell within a SCG. A master base station may or may not change content of RRC configurations provided by a secondary base station. A master base station may provide recent (and/or the latest) measurement results for SCG cell(s), for example, if an SCG addition and/or an ScG Scell addition occurs. A master base station and secondary base stations may receive information of SFN and/or subframe offset of each other from an OAM and/or via an Xn interface (e.g., for a purpose of DRX alignment and/or identification of a measurement gap). Dedicated RRC signaling may be used for sending required system information of a cell as for CA, for example, if adding a new ScG Scell, except for an SFN acquired from an MIB of a PSCell of a SCG.

Figure 12:
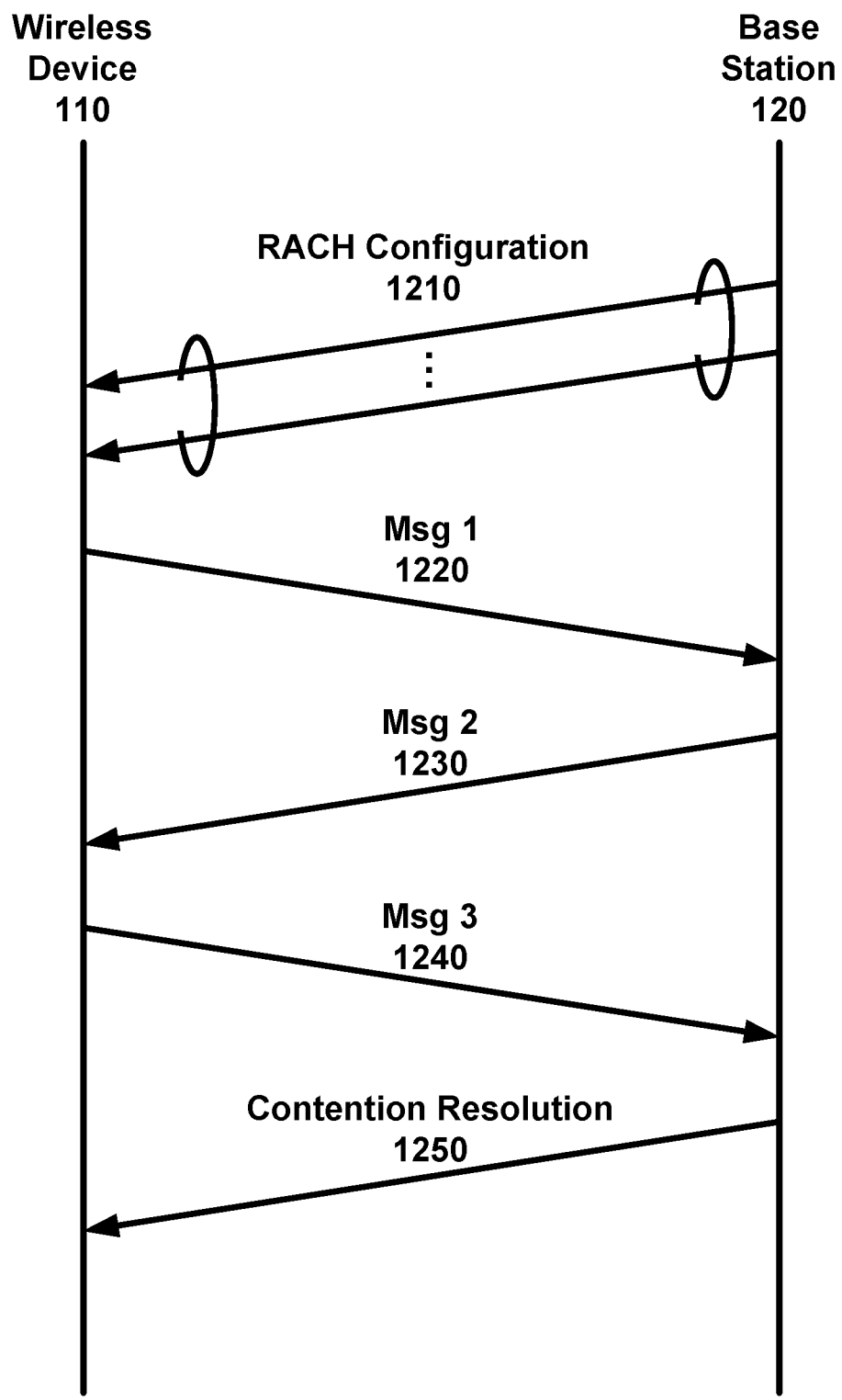
FIG. 12 shows an example of a random access procedure.

FIG. 12 shows an example of a random access procedure. One or more events may trigger a random access procedure. For example, one or more events may be at least one of following: initial access from RRC_IDLE, RRC connection re-establishment procedure, handover, DL or UL data arrival in (e.g., during) a state of RRC_CONNECTED (e.g., if UL synchronization status is non-synchronized), transition from RRC_Inactive, and/or request for other system information. A PDCCH order, a MAC entity, and/or a beam failure indication may initiate a random access procedure.

A random access procedure may comprise or be one of at least a contention based random access procedure and/or a contention free random access procedure. A contention based random access procedure may comprise one or more Msg 1 1220 transmissions, one or more Msg2 1230 transmissions, one or more Msg3 1240 transmissions, and contention resolution 1250. A contention free random access procedure may comprise one or more Msg 1 1220 transmissions and one or more Msg2 1230 transmissions. One or more of Msg 1 1220, Msg 2 1230, Msg 3 1240, and/or contention resolution 1250 may be transmitted in the same step. A two-step random access procedure, for example, may comprise a first transmission (e.g., Msg A) and a second transmission (e.g., Msg B). The first transmission (e.g., Msg A) may comprise transmitting, by a wireless device (e.g., wireless device 110) to a base station (e.g., base station 120), one or more messages indicating an equivalent and/or similar contents of Msg1 1220 and Msg3 1240 of a four-step random access procedure. The second transmission (e.g., Msg B) may comprise transmitting, by the base station (e.g., base station 120) to a wireless device (e.g., wireless device 110) after or in response to the first message, one or more messages indicating an equivalent and/or similar content of Msg2 1230 and contention resolution 1250 of a four-step random access procedure.

A base station may send (e.g., transmit, unicast, multicast, broadcast, etc.), to a wireless device, a RACH configuration 1210 via one or more beams. The RACH configuration 1210 may comprise one or more parameters indicating at least one of following: an available set of PRACH resources for a transmission of a random access preamble, initial preamble power (e.g., random access preamble initial received target power), an RSRP threshold for a selection of a SS block and corresponding PRACH resource, a power-ramping factor (e.g., random access preamble power ramping step), a random access preamble index, a maximum number of preamble transmissions, preamble group A and group B, a threshold (e.g., message size) to determine the groups of random access preambles, a set of one or more random access preambles for a system information request and corresponding PRACH resource(s) (e.g., if any), a set of one or more random access preambles for a beam failure recovery procedure and corresponding PRACH resource(s) (e.g., if any), a time window to monitor RA response(s), a time window to monitor response(s) on a beam failure recovery procedure, and/or a contention resolution timer.

The Msg1 1220 may comprise one or more transmissions of a random access preamble. For a contention based random access procedure, a wireless device may select an SS block with an RSRP above the RSRP threshold. If random access preambles group B exists, a wireless device may select one or more random access preambles from a group A or a group B, for example, depending on a potential Msg3 1240 size. If a random access preambles group B does not exist, a wireless device may select the one or more random access preambles from a group A. A wireless device may select a random access preamble index randomly (e.g., with equal probability or a normal distribution) from one or more random access preambles associated with a selected group. If a base station semi-statically configures a wireless device with an association between random access preambles and SS blocks, the wireless device may select a random access preamble index randomly with equal probability from one or more random access preambles associated with a selected SS block and a selected group.

A wireless device may initiate a contention free random access procedure, for example, based on a beam failure indication from a lower layer. A base station may semi-statically configure a wireless device with one or more contention free PRACH resources for a beam failure recovery procedure associated with at least one of SS blocks and/or CSI-RSs. A wireless device may select a random access preamble index corresponding to a selected SS block or a CSI-RS from a set of one or more random access preambles for a beam failure recovery procedure, for example, if at least one of the SS blocks with an RSRP above a first RSRP threshold amongst associated SS blocks is available, and/or if at least one of CSI-RSs with a RSRP above a second RSRP threshold amongst associated CSI-RSs is available.

A wireless device may receive, from a base station, a random access preamble index via PDCCH or RRC for a contention free random access procedure. The wireless device may select a random access preamble index, for example, if a base station does not configure a wireless device with at least one contention free PRACH resource associated with SS blocks or CSI-RS. The wireless device may select the at least one SS block and/or select a random access preamble corresponding to the at least one SS block, for example, if a base station configures the wireless device with one or more contention free PRACH resources associated with SS blocks and/or if at least one SS block with a RSRP above a first RSRP threshold amongst associated SS blocks is available. The wireless device may select the at least one CSI-RS and/or select a random access preamble corresponding to the at least one CSI-RS, for example, if a base station configures a wireless device with one or more contention free PRACH resources associated with CSI-RSs and/or if at least one CSI-RS with a RSRP above a second RSPR threshold amongst the associated CSI-RSs is available.

A wireless device may perform one or more Msg1 1220 transmissions, for example, by sending (e.g., transmitting) the selected random access preamble. The wireless device may determine a PRACH occasion from one or more PRACH occasions corresponding to a selected SS block, for example, if the wireless device selects an SS block and is configured with an association between one or more PRACH occasions and/or one or more SS blocks. The wireless device may determine a PRACH occasion from one or more PRACH occasions corresponding to a selected CSI-RS, for example, if the wireless device selects a CSI-RS and is configured with an association between one or more PRACH occasions and one or more CSI-RSs. The wireless device may send (e.g., transmit), to a base station, a selected random access preamble via a selected PRACH occasions. The wireless device may determine a transmit power for a transmission of a selected random access preamble at least based on an initial preamble power and a power-ramping factor. The wireless device may determine an RA-RNTI associated with a selected PRACH occasion in which a selected random access preamble is sent (e.g., transmitted). The wireless device may not determine an RA-RNTI for a beam failure recovery procedure. The wireless device may determine an RA-RNTI at least based on an index of a first OFDM symbol, an index of a first slot of a selected PRACH occasions, and/or an uplink carrier index for a transmission of Msg1 1220.

A wireless device may receive, from a base station, a random access response, Msg 2 1230. The wireless device may start a time window (e.g., ra-ResponseWindow) to monitor a random access response. For a beam failure recovery procedure, the base station may configure the wireless device with a different time window (e.g., bfr-ResponseWindow) to monitor response to on a beam failure recovery request. The wireless device may start a time window (e.g., ra-ResponseWindow or bfr-ResponseWindow) at a start of a first PDCCH occasion, for example, after a fixed duration of one or more symbols from an end of a preamble transmission. If the wireless device sends (e.g., transmits) multiple preambles, the wireless device may start a time window at a start of a first PDCCH occasion after a fixed duration of one or more symbols from an end of a first preamble transmission. The wireless device may monitor a PDCCH of a cell for at least one random access response identified by a RA-RNTI, or for at least one response to a beam failure recovery request identified by a C-RNTI, at a time that a timer for a time window is running.

A wireless device may determine that a reception of random access response is successful, for example, if at least one random access response comprises a random access preamble identifier corresponding to a random access preamble sent (e.g., transmitted) by the wireless device. The wireless device may determine that the contention free random access procedure is successfully completed, for example, if a reception of a random access response is successful. The wireless device may determine that a contention free random access procedure is successfully complete, for example, if a contention free random access procedure is triggered for a beam failure recovery request and if a PDCCH transmission is addressed to a C-RNTI. The wireless device may determine that the random access procedure is successfully completed, and may indicate a reception of an acknowledgement for a system information request to upper layers, for example, if at least one random access response comprises a random access preamble identifier. The wireless device may stop sending (e.g., transmitting) remaining preambles (if any) after or in response to a successful reception of a corresponding random access response, for example, if the wireless device has signaled multiple preamble transmissions.

The wireless device may perform one or more Msg 3 1240 transmissions, for example, after or in response to a successful reception of random access response (e.g., for a contention based random access procedure). The wireless device may adjust an uplink transmission timing, for example, based on a timing advanced command indicated by a random access response. The wireless device may send (e.g., transmit) one or more transport blocks, for example, based on an uplink grant indicated by a random access response. Subcarrier spacing for PUSCH transmission for Msg3 1240 may be provided by at least one higher layer (e.g., RRC) parameter. The wireless device may send (e.g., transmit) a random access preamble via a PRACH, and Msg3 1240 via PUSCH, on the same cell. A base station may indicate an UL BWP for a PUSCH transmission of Msg3 1240 via system information block. The wireless device may use HARQ for a retransmission of Msg 3 1240.

Multiple wireless devices may perform Msg 1 1220, for example, by sending (e.g., transmitting) the same preamble to a base station. The multiple wireless devices may receive, from the base station, the same random access response comprising an identity (e.g., TC-RNTI). Contention resolution (e.g., comprising the wireless device 110 receiving contention resolution 1250) may be used to increase the likelihood that a wireless device does not incorrectly use an identity of another wireless device. The contention resolution 1250 may be based on, for example, a C-RNTI on a PDCCH, and/or a wireless device contention resolution identity on a DL-SCH. If a base station assigns a C-RNTI to a wireless device, the wireless device may perform contention resolution (e.g., comprising receiving contention resolution 1250), for example, based on a reception of a PDCCH transmission that is addressed to the C-RNTI. The wireless device may determine that contention resolution is successful, and/or that a random access procedure is successfully completed, for example, after or in response to detecting a C-RNTI on a PDCCH. If a wireless device has no valid C-RNTI, a contention resolution may be addressed by using a TC-RNTI. If a MAC PDU is successfully decoded and a MAC PDU comprises a wireless device contention resolution identity MAC CE that matches or otherwise corresponds with the CCCH SDU sent (e.g., transmitted) in Msg3 1250, the wireless device may determine that the contention resolution (e.g., comprising contention resolution 1250) is successful and/or the wireless device may determine that the random access procedure is successfully completed.

Figure 13:
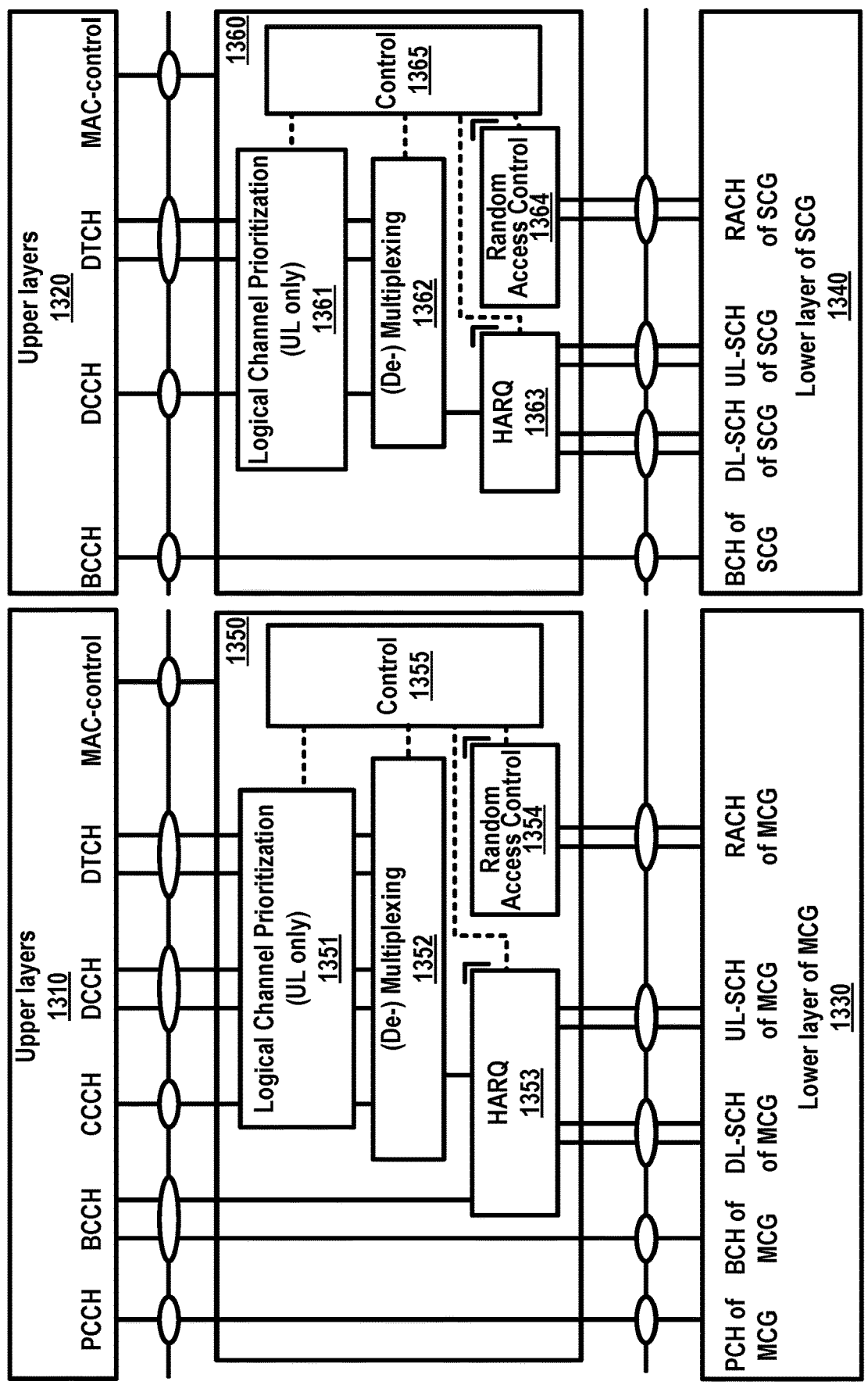
FIG. 13 shows example medium access control (MAC) entities.

FIG. 13 shows an example structure for MAC entities. A wireless device may be configured to operate in a multi-connectivity mode. A wireless device in RRC_CON- NECTED with multiple Rx/Tx may be configured to utilize radio resources provided by multiple schedulers that may be located in a plurality of base stations. The plurality of base stations may be connected via a non-ideal or ideal backhaul over the Xn interface. A base station in a plurality of base stations may act as a master base station or as a secondary base station. A wireless device may be connected to and/or in communication with, for example, one master base station and one or more secondary base stations. A wireless device may be configured with multiple MAC entities, for example, one MAC entity for a master base station, and one or more other MAC entities for secondary base station(s). A configured set of serving cells for a wireless device may comprise two subsets: an MCG comprising serving cells of a master base station, and one or more SCGs comprising serving cells of a secondary base station(s). FIG. 13 shows an example structure for MAC entities in which a MCG and a SCG are configured for a wireless device.

At least one cell in a SCG may have a configured UL CC. A cell of the at least one cell may comprise a PSCell or a Pcell of a SCG, or a Pcell. A PSCell may be configured with PUCCH resources. There may be at least one SCG bearer, or one split bearer, for a SCG that is configured. After or upon detection of a physical layer problem or a random access problem on a PSCell, after or upon reaching a number of RLC retransmissions associated with the SCG, and/or after or upon detection of an access problem on a PSCell associated with (e.g., during) a SCG addition or a SCG change: an RRC connection re-establishment procedure may not be triggered, UL transmissions towards cells of a SCG may be stopped, and/or a master base station may be informed by a wireless device of a SCG failure type and DL data transfer over a master base station may be maintained.

A MAC sublayer may provide services such as data transfer and radio resource allocation to upper layers (e.g., 1310 or 1320). A MAC sublayer may comprise a plurality of MAC entities (e.g., 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. BCCH, PCCH, CCCH and/or DCCH may be control channels, and DTCH may be a traffic channel. A first MAC entity (e.g., 1310) may provide services on PCCH, BCCH, CCCH, DCCH, DTCH, and/or MAC control elements. A second MAC entity (e.g., 1320) may provide services on BCCH, DCCH, DTCH, and/or MAC control elements.

A MAC sublayer may expect from a physical layer (e.g., 1330 or 1340) services such as data transfer services, signaling of HARQ feedback, and/or signaling of scheduling request or measurements (e.g., CQI). In dual connectivity, two MAC entities may be configured for a wireless device: one for a MCG and one for a SCG. A MAC entity of a wireless device may handle a plurality of transport channels. A first MAC entity may handle first transport channels comprising a PCCH of a MCG, a first BCH of the MCG, one or more first DL-SCHs of the MCG, one or more first UL-SCHs of the MCG, and/or one or more first RACHs of the MCG. A second MAC entity may handle second transport channels comprising a second BCH of a SCG, one or more second DL-SCHs of the SCG, one or more second UL-SCHs of the SCG, and/or one or more second RACHs of the SCG.

If a MAC entity is configured with one or more Scells, there may be multiple DL-SCHs, multiple UL-SCHs, and/or multiple RACHs per MAC entity. There may be one DL-SCH and/or one UL-SCH on an SpCell. There may be one DL-SCH, zero or one UL-SCH, and/or zero or one RACH for an Scell. A DL-SCH may support receptions using different numerologies and/or TTI duration within a MAC entity. A UL-SCH may support transmissions using different numerologies and/or TTI duration within the MAC entity.

A MAC sublayer may support different functions. The MAC sublayer may control these functions with a control (e.g., Control 1355 and/or Control 1365) element. Functions performed by a MAC entity may comprise one or more of: mapping between logical channels and transport channels (e.g., in uplink or downlink), multiplexing (e.g., (De-) Multiplexing 1352 and/or (De-) Multiplexing 1362) of MAC SDUs from one or different logical channels onto transport blocks (TBs) to be delivered to the physical layer on transport channels (e.g., in uplink), demultiplexing (e.g., (De-) Multiplexing 1352 and/or (De-) Multiplexing 1362) of MAC SDUs to one or different logical channels from transport blocks (TBs) delivered from the physical layer on transport channels (e.g., in downlink), scheduling information reporting (e.g., in uplink), error correction through HARQ in uplink and/or downlink (e.g., 1363), and logical channel prioritization in uplink (e.g., Logical Channel Prioritization 1351 and/or Logical Channel Prioritization 1361). A MAC entity may handle a random access process (e.g., Random Access Control 1354 and/or Random Access Control 1364).

Figure 14:
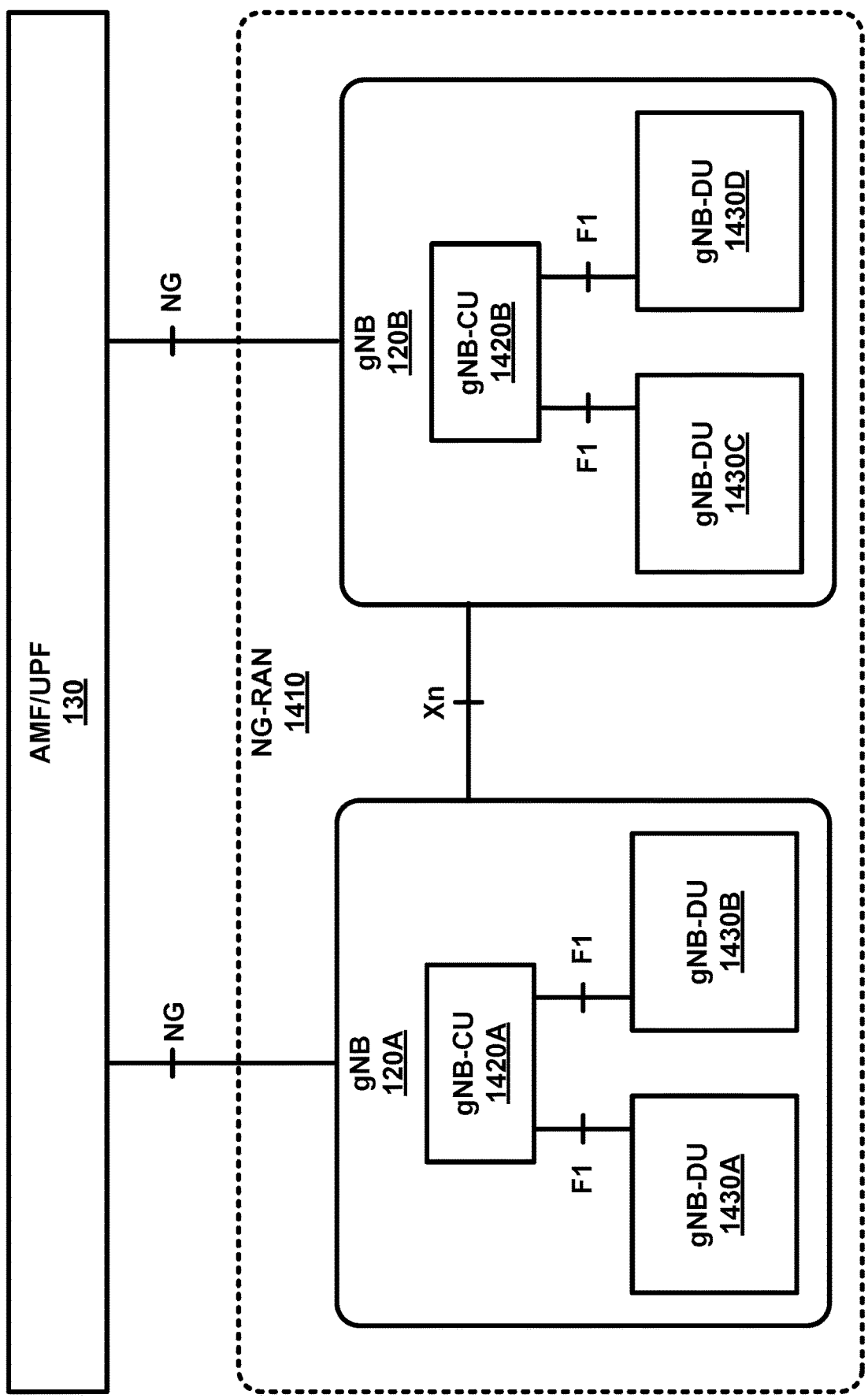
FIG. 14 shows an example RAN architecture.

FIG. 14 shows an example of a RAN architecture comprising one or more base stations. A protocol stack (e.g., RRC, SDAP, PDCP, RLC, MAC, and/or PHY) may be supported at a node. A base station (e.g., gNB 120A and/or 120B) may comprise a base station central unit (CU) (e.g., gNB-CU 1420A or 1420B) and at least one base station distributed unit (DU) (e.g., gNB-DU 1430A, 1430B, 1430C, and/or 1430D), for example, if a functional split is configured. Upper protocol layers of a base station may be located in a base station CU, and lower layers of the base station may be located in the base station Dus. An F1 interface (e.g., CU-DU interface) connecting a base station CU and base station Dus may be an ideal or non-ideal backhaul. F1-C may provide a control plane connection over an F1 interface, and F1-U may provide a user plane connection over the F1 interface. An Xn interface may be configured between base station Cus.

A base station CU may comprise an RRC function, an SDAP layer, and/or a PDCP layer. Base station Dus may comprise an RLC layer, a MAC layer, and/or a PHY layer. Various functional split options between a base station CU and base station Dus may be possible, for example, by locating different combinations of upper protocol layers (e.g., RAN functions) in a base station CU and different combinations of lower protocol layers (e.g., RAN functions) in base station Dus. A functional split may support flexibility to move protocol layers between a base station CU and base station Dus, for example, depending on service requirements and/or network environments.

Functional split options may be configured per base station, per base station CU, per base station DU, per wireless device, per bearer, per slice, and/or with other granularities. In a per base station CU split, a base station CU may have a fixed split option, and base station Dus may be configured to match a split option of a base station CU. In a per base station DU split, a base station DU may be configured with a different split option, and a base station CU may provide different split options for different base station Dus. In a per wireless device split, a base station (e.g., a base station CU and at least one base station Dus) may provide different split options for different wireless devices. In a per bearer split, different split options may be utilized for different bearers. In a per slice splice, different split options may be used for different slices.

Figure 15:
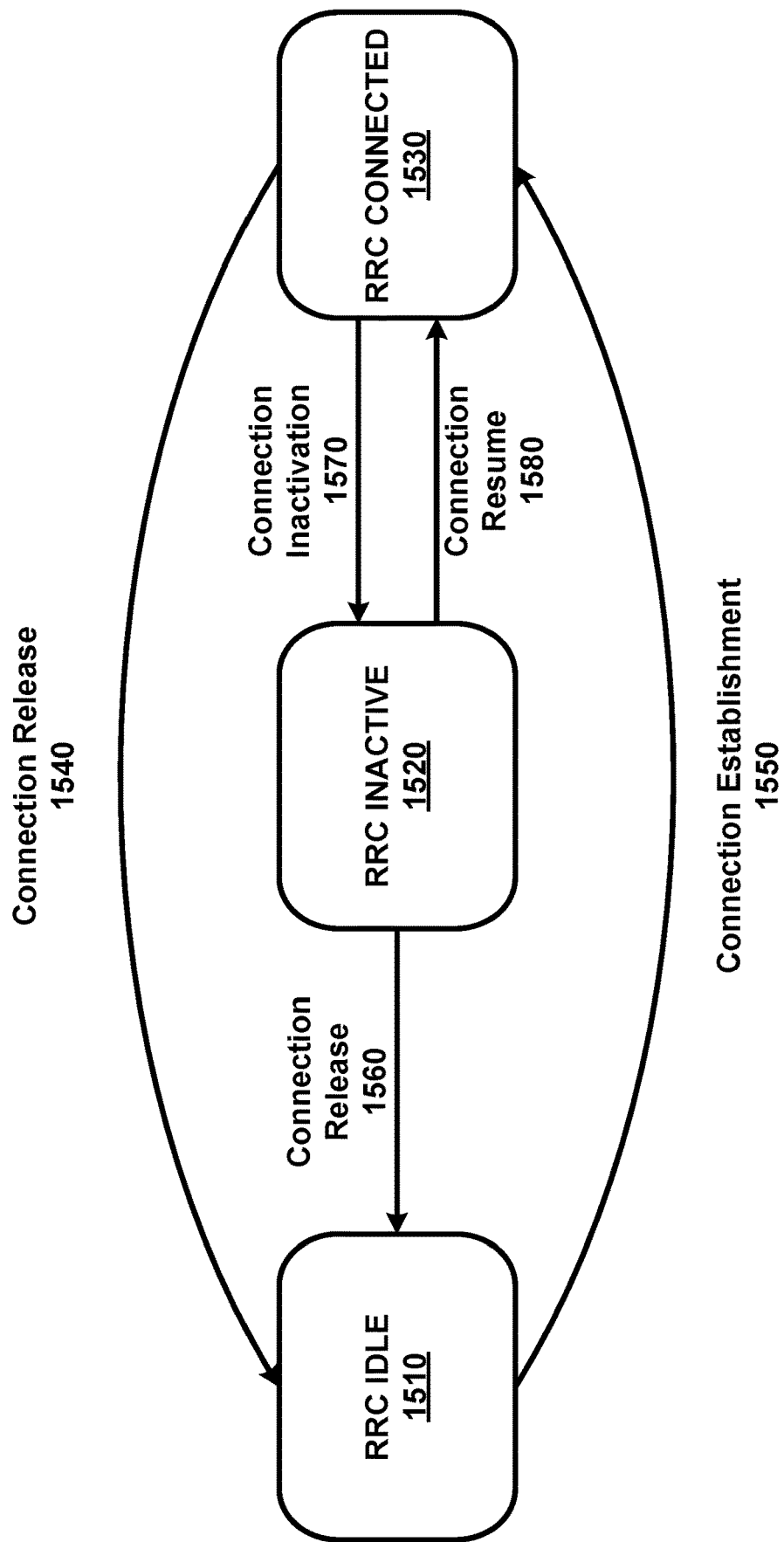
FIG. 15 shows example radio resource control (RRC) states.

FIG. 15 shows example RRC state transitions of a wireless device. A wireless device may be in at least one RRC state among an RRC connected state (e.g., RRC Connected 1530, RRC_Connected, etc.), an RRC idle state (e.g., RRC Idle 1510, RRC_Idle, etc.), and/or an RRC inactive state (e.g., RRC Inactive 1520, RRC_Inactive, etc.). In an RRC connected state, a wireless device may have at least one RRC connection with at least one base station (e.g., gNB and/or eNB), which may have a context of the wireless device (e.g., UE context). A wireless device context (e.g., UE context) may comprise at least one of an access stratum context, one or more radio link configuration parameters, bearer (e.g., data radio bearer (DRB), signaling radio bearer (SRB), logical channel, QoS flow, PDU session, and/or the like) configuration information, security information, PHY/MAC/RLC/PDCP/SDAP layer configuration information, and/or the like configuration information for a wireless device. In an RRC idle state, a wireless device may not have an RRC connection with a base station, and a context of the wireless device may not be stored in a base station. In an RRC inactive state, a wireless device may not have an RRC connection with a base station. A context of a wireless device may be stored in a base station, which may comprise an anchor base station (e.g., a last serving base station).

A wireless device may transition an RRC state (e.g., UE RRC state) between an RRC idle state and an RRC connected state in both ways (e.g., connection release 1540 or connection establishment 1550; and/or connection reestablishment) and/or between an RRC inactive state and an RRC connected state in both ways (e.g., connection inactivation 1570 or connection resume 1580). A wireless device may transition its RRC state from an RRC inactive state to an RRC idle state (e.g., connection release 1560).

An anchor base station may be a base station that may keep a context of a wireless device (e.g., UE context) at least at (e.g., during) a time period that the wireless device stays in a RAN notification area (RNA) of an anchor base station, and/or at (e.g., during) a time period that the wireless device stays in an RRC inactive state. An anchor base station may comprise a base station that a wireless device in an RRC inactive state was most recently connected to in a latest RRC connected state, and/or a base station in which a wireless device most recently performed an RNA update procedure. An RNA may comprise one or more cells operated by one or more base stations. A base station may belong to one or more RNAs. A cell may belong to one or more RNAs.

A wireless device may transition, in a base station, an RRC state (e.g., UE RRC state) from an RRC connected state to an RRC inactive state. The wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

An anchor base station may broadcast a message (e.g., RAN paging message) to base stations of an RNA to reach to a wireless device in an RRC inactive state. The base stations receiving the message from the anchor base station may broadcast and/or multicast another message (e.g., paging message) to wireless devices in their coverage area, cell coverage area, and/or beam coverage area associated with the RNA via an air interface.

A wireless device may perform an RNA update (RNAU) procedure, for example, if the wireless device is in an RRC inactive state and moves into a new RNA. The RNAU procedure may comprise a random access procedure by the wireless device and/or a context retrieve procedure (e.g., UE context retrieve). A context retrieve procedure may comprise: receiving, by a base station from a wireless device, a random access preamble; and requesting and/or receiving (e.g., fetching), by a base station, a context of the wireless device (e.g., UE context) from an old anchor base station. The requesting and/or receiving (e.g., fetching) may comprise: sending a retrieve context request message (e.g., UE context request message) comprising a resume identifier to the old anchor base station and receiving a retrieve context response message comprising the context of the wireless device from the old anchor base station.

A wireless device in an RRC inactive state may select a cell to camp on based on at least a measurement result for one or more cells, a cell in which a wireless device may monitor an RNA paging message, and/or a core network paging message from a base station. A wireless device in an RRC inactive state may select a cell to perform a random access procedure to resume an RRC connection and/or to send (e.g., transmit) one or more packets to a base station (e.g., to a network). The wireless device may initiate a random access procedure to perform an RNA update procedure, for example, if a cell selected belongs to a different RNA from an RNA for the wireless device in an RRC inactive state. The wireless device may initiate a random access procedure to send (e.g., transmit) one or more packets to a base station of a cell that the wireless device selects, for example, if the wireless device is in an RRC inactive state and has one or more packets (e.g., in a buffer) to send (e.g., transmit) to a network. A random access procedure may be performed with two messages (e.g., 2-stage or 2-step random access) and/or four messages (e.g., 4-stage or 4-step random access) between the wireless device and the base station.

A base station receiving one or more uplink packets from a wireless device in an RRC inactive state may request and/or receive (e.g., fetch) a context of a wireless device (e.g., UE context), for example, by sending (e.g., transmitting) a retrieve context request message for the wireless device to an anchor base station of the wireless device based on at least one of an AS context identifier, an RNA identifier, a base station identifier, a resume identifier, and/or a cell identifier received from the wireless device. A base station may send (e.g., transmit) a path switch request for a wireless device to a core network entity (e.g., AMF, MME, and/or the like), for example, after or in response to requesting and/or receiving (e.g., fetching) a context. A core network entity may update a downlink tunnel endpoint identifier for one or more bearers established for the wireless device between a user plane core network entity (e.g., UPF, S-GW, and/or the like) and a RAN node (e.g., the base station), such as by changing a downlink tunnel endpoint identifier from an address of the anchor base station to an address of the base station).

A base station may communicate with a wireless device via a wireless network using one or more technologies, such as new radio technologies (e.g., NR, 5G, etc.). The one or more radio technologies may comprise at least one of: multiple technologies related to physical layer; multiple technologies related to medium access control layer; and/or multiple technologies related to radio resource control layer Enhancing the one or more radio technologies may improve performance of a wireless network. System throughput, and/or data rate of transmission, may be increased. Battery consumption of a wireless device may be reduced. Latency of data transmission between a base station and a wireless device may be improved. Network coverage of a wireless network may be improved. Transmission efficiency of a wireless network may be improved.

A base station and/or wireless device may determine wireless resources for wireless communications. For example, a bandwidth part (BWP) and/or a channel may be determined to be an active BWP and/or a channel, among a plurality (e.g., four or any other quantity) of available BWPs or channels, for performing the wireless communications. The active BWP and/or channel may be determined, for example, based on it comprising fewer active wireless communications connections and/or less congestion relative to other available BWPs and/or channels. Selecting a wireless resource (e.g., a BWP and/or a channel) that is less congested may reduce and/or avoid wireless data collisions between messages sent (e.g., transmitted) via the selected BWP and/or channel. Reducing and/or avoiding wireless data collisions may improve a quality of service (QoS) via the selected BWP and/or channel. The base station and/or wireless device may determine a low (e.g., a least) congested BWP and/or channel, for example, by measuring a channel busy ratio (CBR) of the available BWPs and/or channels, and/or by performing comparison(s) between the measurement result(s). The base station and/or wireless device may determine the CBR as a quantity of subchannels and/or a portion of total subchannels within a selected CBR measurement window (e.g., 100 subframes, 100 slots, or any other duration or period) in a radio resource pool in a selected BWP and/or a selected channel. The selected BWP and/or the selected channel may be selected based on it actively being used for sidelink communications by one or more devices (e.g., wireless devices). The base station and/or wireless device may determine the subchannel(s) of the selected BWP and/or channel to be active, for example, if the subchannel(s) have measured RSSIs that exceed a threshold value (e.g., a pre-configured threshold value).

In some types of wireless communications, a base station and/or a wireless device may measure the CBR as a channel status, or channel congestion indicator, during a fixed number/quantity of time resources (e.g., 100 subframes or any other duration or period). The wireless device may measure CBR based on a measure of energy received per subchannel. The wireless device may measure the energy in a fixed unit resource (e.g., a subchannel and/or a group of RBs), for example, if measuring of the CBR. The CBR measurement may be made in any combination of one or more unit resources (e.g., subchannels and/or RBs), for example, a designated time window, a designated frequency range and/or frequency-domain symbol space, and/or a designated spatial region. The CBR measurement result may be unclear if a size of a unit resource, for example, a quantity of OFDM symbols or subcarrier spacing of the wireless channel, varies. The CBR measurement may use weighting factors to bias the CBR toward specific unit resources and/or subchannels. The CBR measurement may use weighting factors to overcome a bias of the CBR toward specific unit resources and/or subchannels, for example, due to different quantities of slots of other durations or periods. The CBR measurement may be biased to a specific subchannel, for example, by the wireless device determining the CBR based on a weighted average of a quantity of unit resources. The CBR measurement, may be based on the average energy received in the subchannel, in which case the wireless device may be unable to measure the spatial domain energy intensity. A wireless device's CBR measurement results may vary depending on directionality or spatial characteristics of the wireless channel, for example, if the wireless device is equipped with a plurality of antennas. A wireless device may measure CBR and/or perform congestion control in a variety of ways, for example, if the wireless device comprises multiple antennas or multiple antenna panels.

A wireless device's channel occupancy ratio (CR) may indicate a total quantity and/or portion of total subchannels within a selected CR measurement window (e.g., 1000 subframes or any other duration or period) of subchannels of a BWP and/or channel that are in the selected BWP and/or channel that are active (e.g., actively being used for sidelink communications by one or more wireless devices). A CR limit value may be determined based on the CBR measurement result. A wireless device may measure the CR for a sidelink. The wireless device may determine whether the measured CR falls within an acceptable range below the CR limit value, for example, before proceeding to perform wireless communications via a sidelink.

In some types of wireless communications, a wireless device may have a fixed computational processing time for performing CBR measurements and/or congestion control. The wireless device may experience unnecessary and/or excessive delays, at least for one or more sidelinks, for example, if the fixed processing time is defined for all numerologies. The unnecessary and/or excessive delays may lead to decreased network throughput and/or decreased performance, due to a fixed computational processing time being defined for all numerologies.

As described herein, a base station and/or wireless device may perform numerology adaptation for sidelink communications (e.g., for sidelink SCS of 15, 30, 60, and 120 kHz). A base station and/or wireless device, for example, may have a different processing time for CBR measurements in different sidelink channels. The processing time may be based on at least one of an SCS characteristic and/or a wireless device processing capability. Adaptable processing times for CBR measurements (e.g., based on SCS, wireless device processing capabilities, and/or resource pool configurations) may facilitate increased accuracy in performing CBR measurements, reduced delays in performing congestion control, and/or improved throughput and/or reliability of a wireless network associated with the base station and/or the wireless device.

A wireless device may measure CBR for a variable size of subchannel across slots in a wireless channel A wireless device may measure CBR in a spatial domain, for example, if the wireless device comprises multiple receiving antennas. A wireless device may perform congestion control based on the measured CBR. A wireless device may perform fair and accurate congestion control, thereby facilitating more reliable communication.

Wireless devices may communicate with each other directly via wireless communications, for example, device-to-device communications, vehicle-to-everything communications, vehicle-to-vehicle communications, vehicle-to-network communications, vehicle-to-roadside infrastructure communications, vehicle-to-pedestrian communications, and/or direct communications, with or without involving a base station as an intermediary. Wireless devices may exchange data without passing the data through a base station in a wireless communications scheme, for example, a direct wireless device-to-wireless device (e.g., UE-to-UE)

communication scheme. Communications between wireless devices that establish a direct communication link (e.g., a sidelink) between each other may have reduced latency and/or may utilize fewer radio resources compared to communications established via a central base station.

Figure 16B:
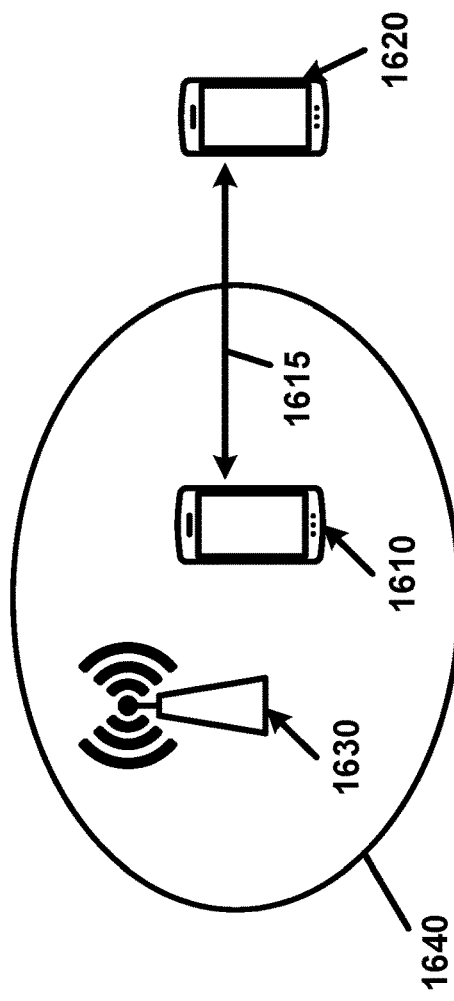
FIG. 16B shows an example of wireless communications between wireless devices with one wireless device having access to a base station of a wireless network.
Figure 16D:
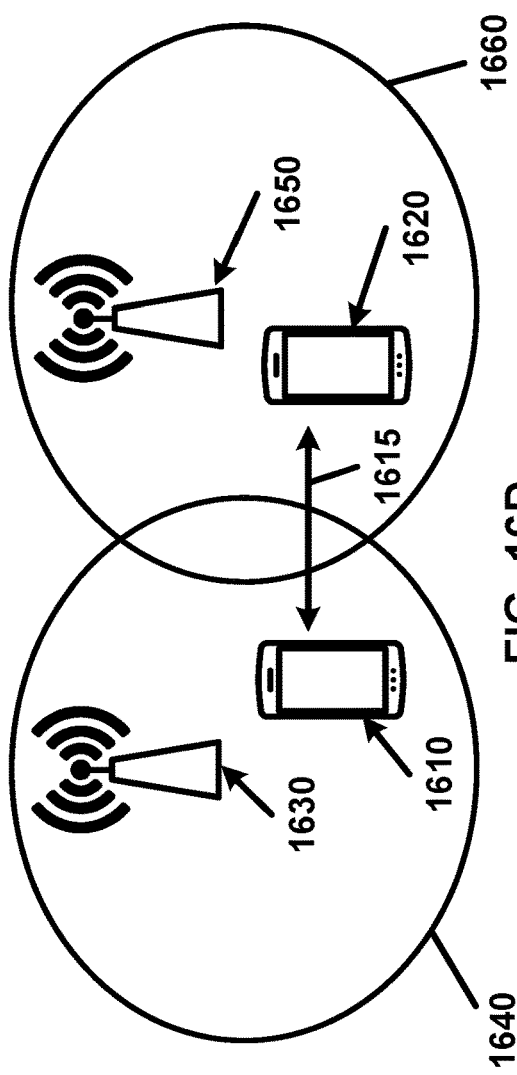
FIG. 16D shows an example of inter-cell wireless communications between wireless devices having accesses to different base stations of a wireless network.
Figure 16A:
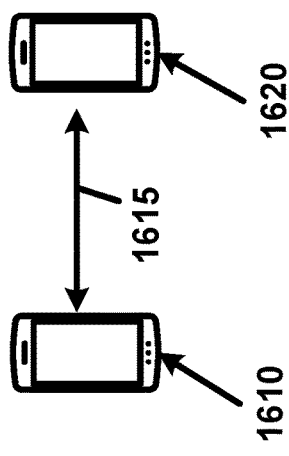
FIG. 16A shows an example of wireless communications between wireless devices without access to a base station of a wireless network.
Figure 16C:
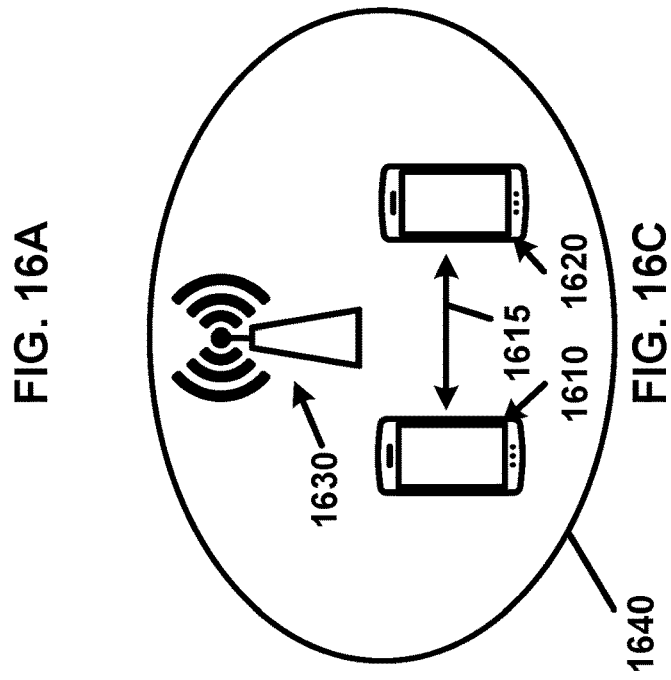
FIG. 16C shows an example of intra-cell wireless communications between wireless devices having access to a same base station of a wireless network.

FIGS. 16A-16D show examples of wireless communications between wireless devices 1610 and 1620. Referring to FIG. 16A, wireless device 1610 and wireless device 1620 may perform wireless communications 1615 while located outside of range of a wireless network cell coverage provided by, for example, a base station or TRP. Referring to FIG. 16B, wireless device 1610 and wireless device 1620 may perform wireless communications 1615 while the wireless device 1610 is located within range of a wireless network cell coverage 1640 provided by, for example, a base station or TRP 1630, and the wireless device 1620 is located outside of range of the wireless network cell coverage 1640. Referring to FIG. 16C, wireless device 1610 and wireless device 1620 may perform intra-cell wireless communications 1615 while located within range of the same wireless network cell coverage 1640 provided by, for example, a base station or TRP 1630. Referring to FIG. 16D, wireless device 1610 and wireless device 1620 may perform inter-cell wireless communications 1615 while the wireless device 1610 is located within a first wireless network cell coverage 1640 provided by, for example, a first base station or TRP 1630, and the wireless device 1620 is located within a second wireless network cell coverage 1660 provided by, for example, a second base station or TRP 1650.

A wireless device (e.g., the wireless device 1610, 1620) may send (e.g., transmit) a wireless communications signal via a sidelink to perform one or more of discovery or communications. The wireless device 1610, 1620 may send the wireless communications signal to discover (e.g., determine) at least one other wireless device 1620, 1610 adjacent (e.g., closer than a base station 1630, 1650) to the wireless device 1610, 1620. The wireless device 1610, 1620 may send (e.g., transmit) and/or receive a wireless communications signal via a physical sidelink discovery channel (PSDCH) to perform discovery of one or more other wireless devices. The wireless device 1610, 1620 may send (e.g., transmit) the wireless communications signal to send general data (e.g., voice data, image data, video data, safety information, etc.) directly to at least one other wireless device 1620, 1610. A physical sidelink broadcast channel (PSBCH), a physical sidelink shared channel (PSSCH), a physical sidelink control channel (PSCCH), or the like may send (e.g., transmitting) and/or receive a wireless communications signal between wireless devices.

Figure 17A:
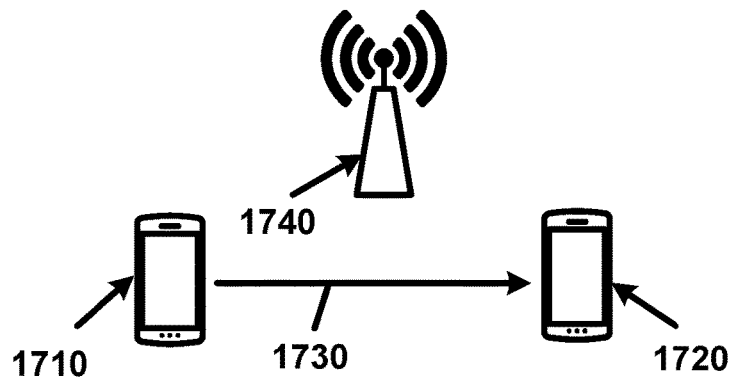
FIG. 17A shows an example of wireless communications between wireless devices having access to a base station of a wireless network.
Figure 17B:
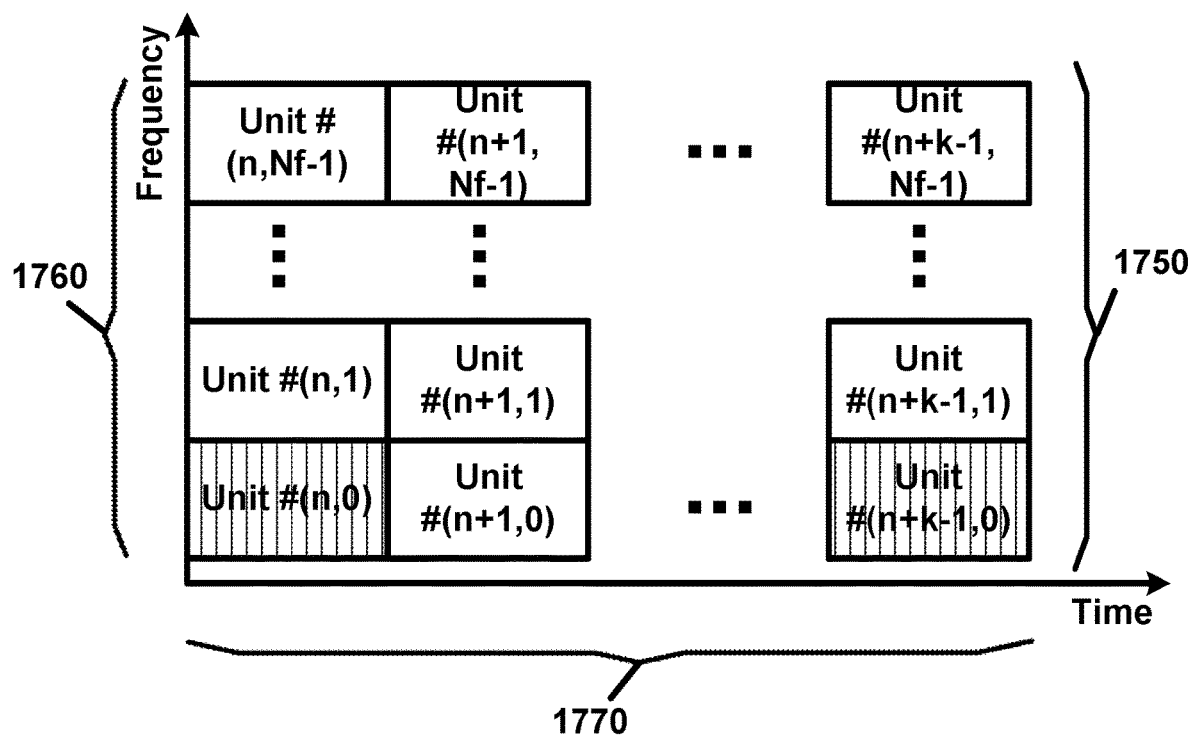
FIG. 17B shows an example of a resource pool for performing wireless communications.

FIG. 17A and FIG. 17B show examples of wireless communications. FIG. 17A shows an example of wireless communications between wireless devices having access to a base station of a wireless network. A wireless device 1710 may perform wireless communications with a wireless device 1720 by sending (e.g., transmitting) a wireless communications signal 1730 directly to the wireless device 1720. FIG. 17B shows an example of a resource pool 1750 for performing wireless communications. The resource pool 1750 may comprise radio resource units associated with the wireless devices 1710 and 1720 performing wireless communications. The wireless devices 1710 and 1720 may comprise a wireless terminal, access point (AP), or base station that sends (e.g., transmits) and/or receives a wireless signal for wireless communications. The wireless device 1710 may designate one or more radio resource unit(s) #(n . . . n+k−1, 0 . . . Nf−1) comprised by the resource pool 1750. The wireless device 1710 may send (e.g., transmit) the wireless communications signal 1730 based on or configured according to the designated one or more radio resource unit(s) #(n . . . n+k−1, 0 . . . Nf−1). The wireless device 1720 may receive a designation of one or more radio resource unit(s) #(n . . . n+k−1, 0 . . . Nf−1) comprised by the resource pool 1750 via which the wireless device 1710 may send (e.g., transmit) and the wireless device 1720 may receive the wireless communications signal 1730.

The base station 1740 may send (e.g., transmit) information regarding the resource pool 1750 to the wireless device 1710, for example, if the wireless device 1710 is located inside of a cell of network coverage provided by the base station 1740. The wireless device 1710 may receive the information regarding the resource pool 1750 from the wireless device 1720, for example, if the wireless device 1710 is located outside of a cell of network coverage provided by the base station 1740. The wireless device 1710 may access internally stored pre-configured information regarding the resource pool 1750, for example, if the wireless device 1710 is located outside of a cell of network coverage provided by any base station.

The resource pool 1750 may comprise a plurality of radio resource units #(n . . . n+k−1, 0 . . . Nf−1) indexed according to time slots (e.g., x axis) and frequency band slots (e.g., y axis). A radio resource unit may comprise one or more resource blocks (e.g., a frequency band slot, a subframe, K OFDM symbols) and a time duration. The wireless device 1710 may designate one or more radio resource unit(s) from a plurality of the radio resource units #(n . . . n+k−1, 0 . . . Nf−1) comprised by the resource pool 1750 and may send (e.g., transmit) a wireless communications signal 1730 according to the designated radio resource unit(s) for wireless communications with the wireless device 1720. A frequency band 1760 may be divided into a plurality of Nf frequency resource blocks. Each of the plurality of radio resource units #(n . . . n+k−1, 0 . . . Nf−1) may designate one (or more) of the Nf frequency resource blocks of the frequency band 1760. A time period 1770 may be divided into a plurality of k time resource blocks (e.g., time slot). Each of the plurality of radio resource units #(n . . . n+k−1, 0 . . . Nf−1) may designate one (or more) of the Nf frequency resource blocks of the frequency band 1760. The resource pool 1750 may be temporally repeated with a period of k time resource blocks. The resource pool 1750 may comprise a frequency band within a bandwidth part (BWP) for wireless communications or sidelink communications (e.g., a SL BWP). The given radio resource units #(n . . . n+k−1, 0 . . . Nf−1) may periodically and/or repeatedly appear over time. An index of a radio resource unit to which a logical resource unit is mapped may change with a predetermined pattern according to a value of time to generate a diversity gain in the time domain and/or the frequency domain. The resource pool 1750 may correspond to a set of radio resource units that the wireless devices 1710, 1720 may utilize for sending (e.g., transmitting) and/or receiving wireless communications signals 1730.

The resource pool 1750 may be classified according to contents of a wireless communications signal 1730 transmitted via the resource pool 1750. A plurality of wireless communications signals 1730 may be classified according to information content to be sent via the respective wireless communications signals 1730, and a separate resource pool 1750 may be allocated for each of the classifications of the wireless communications signals 1730. The resource pool 1750 may be allocated based on information content of the corresponding wireless communications signal 1730. The information contents of the wireless communications signal

1730 may include a control channel, a data channel, and/or a discovery channel. The control channel may correspond to a wireless communications signal 1730 that may comprise information indicating/specifying a radio resource position of a data channel, information indicating/specifying an MCS for modulating and demodulating a data channel, information indicating/specifying a MIMO transmission scheme, information specifying packet priority, information indicating/specifying target coverage, information specifying QoS requirements, or the like. The control channel may be multiplexed with and sent (e.g., transmitted) on a same radio resource unit as a data channel A control and data channel resource pool may correspond to a resource pool 1750 via which control information and data information are multiplexed and sent (e.g., transmitted). The control channel may comprise a physical sidelink control channel (PSCCH). The data channel may comprise a physical sidelink shared channel (PSSCH) corresponding to a resource pool 1750 via which the wireless device 1710 sends (e.g., transmits) user data to the wireless device 1720. A data channel excluding control information may be sent (e.g., transmitted) in a resource pool 1750 dedicated to the data channel, for example, if control information and data information are multiplexed in a same radio resource unit and sent (e.g., transmitted). The wireless devices 1710 and 1720 may send (e.g., transmit) control information in a designated resource unit of a control resource pool and data information in a data resource pool via the same resource elements (Res). The wireless device 1710 may send (e.g., transmit) one or more messages via a discovery channel corresponding to a resource pool 1750 dedicated to the discovery channel to facilitate neighboring wireless devices, for example, the wireless device 1720, to discover the wireless device 1710 sending (e.g., transmitting) information such as identification (ID) information pertaining to the wireless device 1710 and/or the like.

The resource pool 1750 may be classified according to QoS level and/or associated service. The base station 1740 may designate a priority level for each resource pool 1750. The resource pool 1750 may be configured differently for different associated services. A specific resource pool 1750 may be configured for use by only specific unicast or groupcast wireless devices. Different resource pools 1750 may be designated for different wireless communications signals 1730, for example, based on one or more transmission/reception attributes of the wireless communications signals 1730. Different resource pools 1750 may be designated for different wireless communications signals 1730, for example, regardless of whether or not information contents of the wireless communications signals 1730 are identical to each other.

Different instances of a same data channel or a same discovery signal/message may be associated with differently classified resource pools 1750. The resource pool 1750 may be classified according to contents of a data channel or a discovery signal/message based on a transmission timing determination scheme of a wireless communications signal 1730 (e.g., whether the wireless communications signal 1730 is sent (e.g., transmitted) at a time based on a time of receiving a synchronization reference signal, for example, at the time of receiving the synchronization reference signal or a different time based on the addition of a timing advance value). The resource pool 1750 may be classified according to contents of a data channel or a discovery signal/message based on a resource allocation scheme (e.g., whether a base station designates a transmission resource of an individual wireless communications signal 1730 or a wireless device designates the transmission resource of the individual wireless communications signal 1730 from a resource pool 1750). The resource pool 1750 may be classified according to contents of a data channel or a discovery signal/message based on a signal format of a wireless communications signal 1730 (e.g., a number of symbols occupied by a wireless communications signal 1730 in a subframe, or a number of subframes used for sending (e.g., transmitting) a wireless communications signal 1730). The resource pool 1750 may be classified according to contents of a data channel or a discovery signal/message based on signal strength from a base station (e.g., the base station 1740), transmit power level of a wireless device (e.g., wireless device 1710) sending (e.g., transmitting) the wireless communications signal 1730, and/or the like.

Transmission resource designation methods may be categorized as different modes and/or types. A base station (e.g., base station 1740) may designate (e.g., directly designate) a transmission resource to be used by a wireless device (e.g., the wireless device 1710) for sending (e.g., transmitting) a wireless communications signal using a mode 1. The base station (e.g., eNB, gNB, etc.) may send (e.g., transmit) DCI to schedule a transmission of a wireless communications signal 1730 according to mode 1. A wireless device (e.g., wireless device 1710) may directly designate a transmission resource from a pre-configured transmission resource region or resource pool 1750 or from a transmission resource region or resource pool 1750 designated by a base station (e.g., base station 1740) using a mode 2. A base station (e.g., base station 1740) may designate (e.g., directly designate) a transmission resource to be used by a wireless device (e.g., the wireless device 1710) for performing a Type 2 discovery. A wireless device (e.g., wireless device 1710) may designate (e.g., directly designate) a transmission resource from a pre-configured transmission resource region or resource pool 1750 or from a transmission resource region or resource pool 1750 designated by a base station (e.g., base station 1740) for performing a Type 1 discovery.

The wireless device 1710 and the wireless device 1720 may perform time synchronization and/or frequency synchronization with one another, for example, to perform wireless communications with one another. The base station 1740 may synchronize the time and frequency references of the wireless devices 1710 and 1720 (e.g., by PSSs/SSSs of a cell provided by the base station 1740, other reference signals (e.g., CSI-RSs), and/or the like transmitted by the base station 1740), if the wireless devices 1710 and 1720 both are located within the network coverage of the cell. The wireless devices 1710 and 1720 may maintain time/frequency synchronization in a level that the wireless devices 1710 and 1720 are capable of directly sending (e.g., transmitting) and receiving a signal. The wireless device 1710 may send (e.g., transmit) a synchronization signal (e.g., a sidelink synchronization signal (SLSS)) and the wireless device 1720 may receive and synchronize with the synchronization signal. The SLSS may comprise a sidelink primary synchronization signal (S-PSS) and/or a sidelink secondary synchronization signal (S-SSS). The wireless device 1710 may send (e.g., transmit) the SLSS with a physical sidelink broadcast channel (PSBCH) to convey some basic or initial system information. The wireless devices 1710, 1720 may synchronize or derive a timing of transmission time intervals (e.g., frames, subframes, slots, and/or the like) using global navigation satellite system (GNSS) timing. S-PSS, S-SSS and PSBCH may be structured in a block format (e.g., sidelink synchronization signal block (S-SSB)) and may support periodic transmission. The S-SSB may use a same numerology (e.g., SCS and CP length) as a sidelink data channel and a sidelink control channel in a carrier. The S-SSB's transmission bandwidth may be within the pre-configured sidelink BWP. The S-SSB's frequency location may be pre-configured. The wireless device (e.g., the wireless device 1710) may forego performing hypothesis detection in frequency to find S-SSB in a carrier, if the S-SSB's frequency location is pre-configured. Sidelink synchronization sources may include GNSS, gNB, eNB, and/or NR UE. Each sidelink synchronization source may be associated with a synchronization priority level A priority order of the sidelink synchronization sources and/or synchronization priority levels may be pre-configured.

Figure 18:
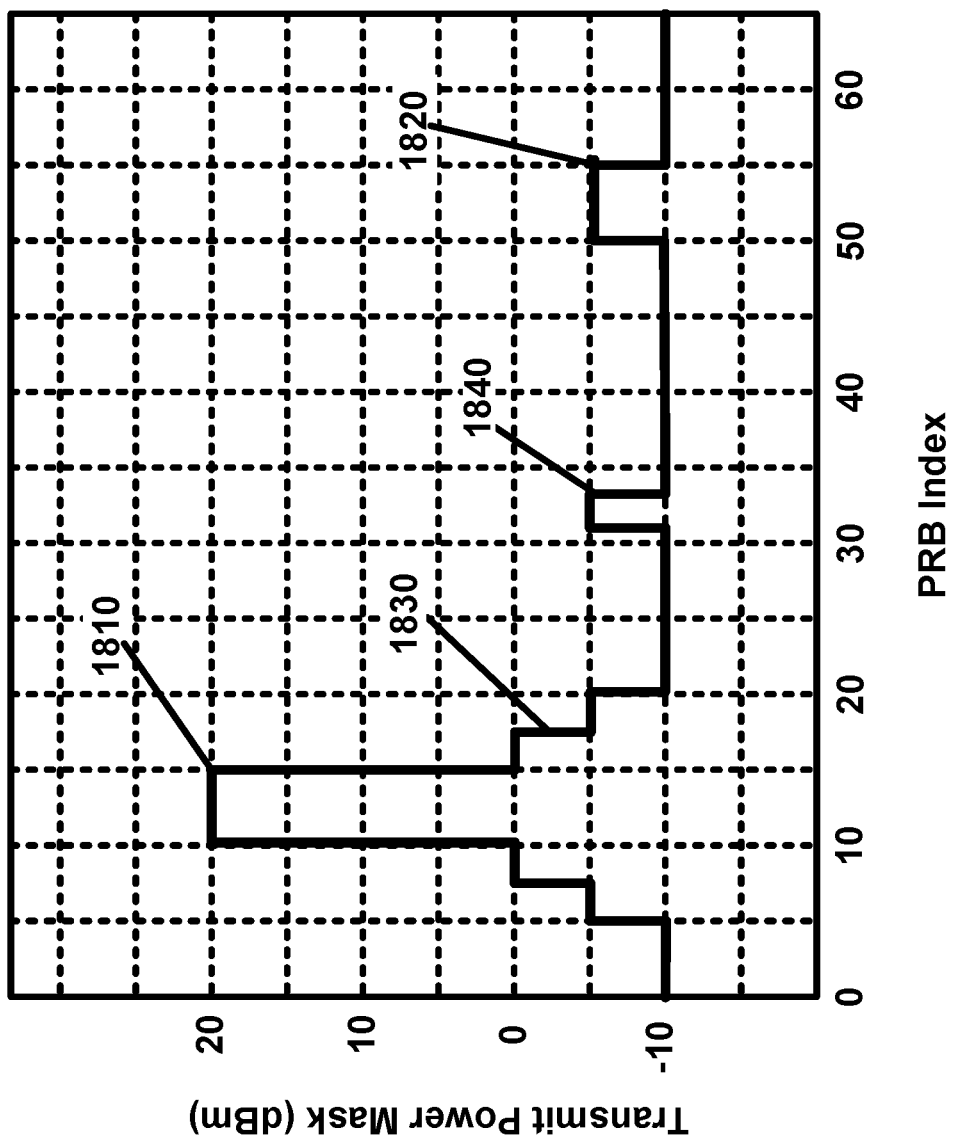
FIG. 18 shows an example of an in-band emissions (IBE) model.

Each of a plurality of neighboring wireless devices 1710, 1720 may designate one or more subchannels of a resource pool 1750 for sending (e.g., transmitting) a wireless communications signal 1730. A frequency bandwidth of the resource pool 1750 may be divided into multiple subchannels. A wireless device 1710, 1720 may designate a subchannel, for example, based on received energy measurements and/or control channel decoding. A wireless device 1710, 1720 may determine a subchannel that another wireless device 1710, 1720 is designating for use, for example, based on control channel decoding and/or an energy measurement for each subchannel. In-band emissions (IBEs) may effectively impose a limit on system performance. An in-band emission may comprise interference caused by one transmitter transmitting on one subchannel and imposed on another transmitter transmitting to a receiver on another subchannel FIG. 18 shows an example of an in-band emissions (IBE) model. Subchannels nearby to a desired transmitted signal 1810, as well as other subchannels (e.g., I/Q image subchannels 1820) may experience more interference, as shown in FIG. 18. General in-band emissions 1830 tend to be stronger close in frequency to the desired transmitted signal 1810. Carrier leakage 1840 tends to be generated around a direct current or direct conversion (DC) subcarrier. The I/Q image subchannels 1820 may be located in symmetrical subchannels of the desired transmitted signal around the DC subcarrier.

A wireless device 1710 radiating power in association with performing wireless communications within a cell of a wireless network provided by a base station 1740 may cause serious interference to the cellular communications of the cell. If the wireless device 1710 performing wireless communications uses only some frequency resources in a particular slot or subframe, the in-band emission of the power radiated by the wireless device 1710 may cause serious interference to the frequency resources used by the cellular communications network. The wireless device 1710 performing wireless communications may perform cellular pathloss-based power control to prevent excess interference that causes these problems. The base station 1740 may configure parameters used for power control (e.g., P0 or alpha).

A wireless device 1710 that sends (e.g., transmits) a wireless communications signal 1730 may correspond to a half-duplex wireless device, which may not be capable of receiving a signal at a same time of sending a signal (e.g., performing transmission). The wireless device 1710 may fail to receive a signal sent (e.g., transmitted) by another wireless device 1720 due to the half-duplex problem. Different wireless devices 1710, 1720 performing wireless communications may send (e.g., transmit) signals via one or more different time resources to mitigate the half-duplex problem.

Direct wireless communications between wireless devices in proximity to each other (e.g., closer to each other than the wireless devices are to a base station or sufficiently close to each other for the wireless devices to establish a reliable communication link with each other) may have various advantages. For example, the wireless devices participating in direct wireless communications with each other may have a high data transfer rate with low latency for data communications. Wireless devices performing wireless communications between each other in a wireless network cell may reduce network traffic concentration on a base station of the cell, for example, by distributing network traffic among direct connections between wireless devices in the cell. A wireless device, in a cell of a wireless network, performing wireless communications with another wireless device outside the cell, may perform a communications relay role and thereby effectively extend the communications reach and/or cell coverage of a base station that provides the cell's network communications.

Figure 19:
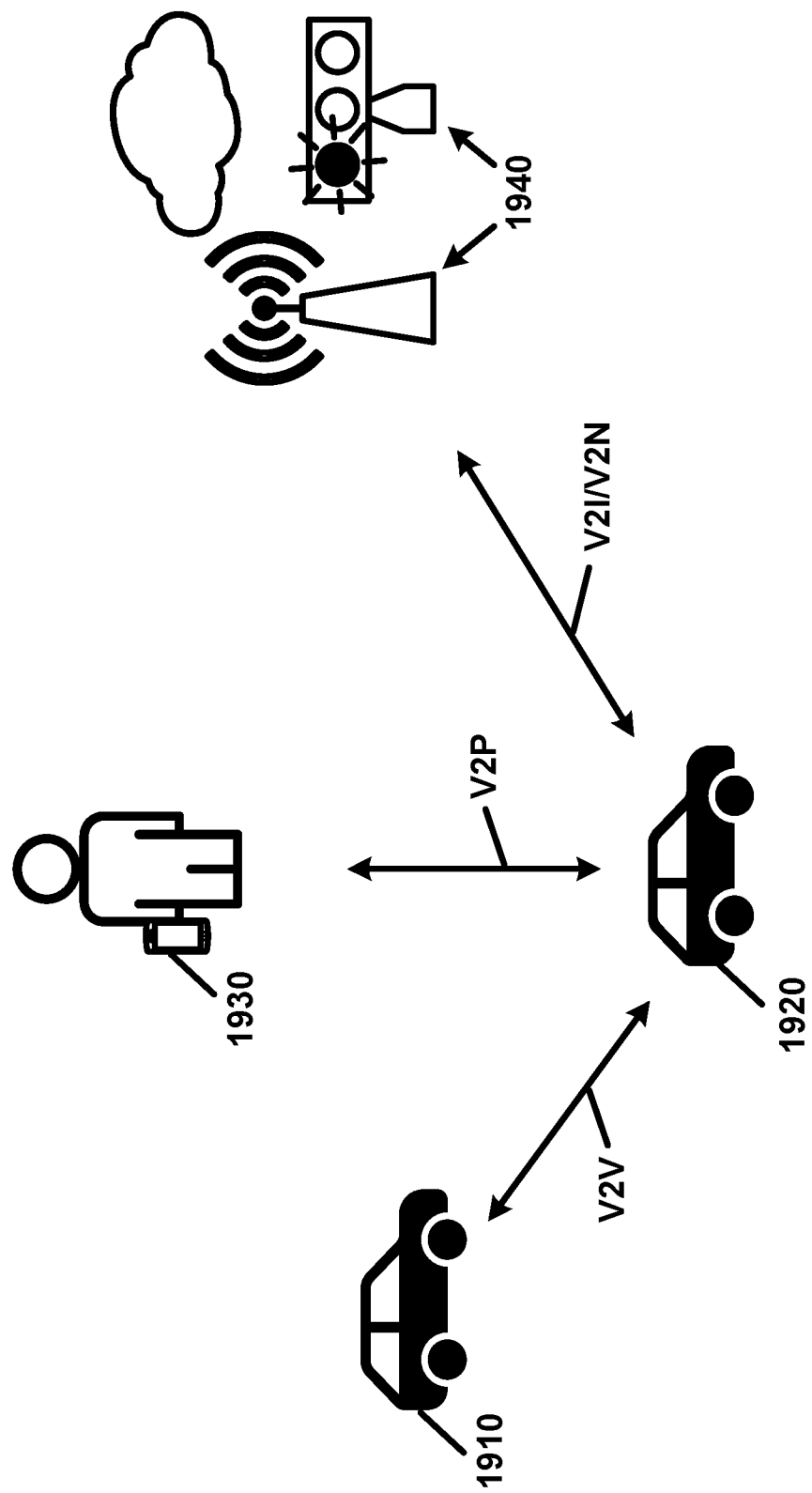
FIG. 19 shows an example of wireless communications between various vehicles and wireless devices.

FIG. 19 shows an example of wireless communications between various vehicles and wireless devices. At least one automotive vehicle 1910, 1920 may apply the wireless communications methods described herein for sending and/or receiving communications signals and messages to and/or from an automotive vehicle (e.g., vehicle-to-everything (V2X) communications). V2X communications may include wireless communications between a vehicle and another vehicle, for example, vehicle-to-vehicle (V2V) wireless communications. V2X communications may include wireless communications between a vehicle and a portable wireless device 1930 carried by an individual (e.g., handheld wireless terminal carried by a pedestrian, cyclist, driver, or passenger), for example, vehicle-to-pedestrian (V2P) wireless communications. V2X communications may include wireless communications between a vehicle and an infrastructure/network and/or roadside unit (RSU)/network 1940 (e.g., traffic light and/or signal), for example, vehicle-to-infrastructure/network (V2I/N) wireless communications. An RSU 1940 may include a transportation infrastructure entity implemented in a base station or a stationary wireless device proximate a road or highway. The RSU may comprise, for example, an entity sending (e.g., transmitting) speed notifications to vehicles and/or wireless devices in the vicinity of a road or highway. A vehicle, an RSU, a stationary wireless device, and/or a portable wireless device may comprise a transceiver configured to perform V2X communications.

A vehicle 1910, 1920, a portable wireless device 1930, and/or an RSU 1940 may perform V2X communications to indicate warnings for various safety-related events and the like. The vehicle 1910 may perform V2X communications to send information regarding an event occurring on the vehicle 1910 or road via which the vehicle 1910 is traveling to another vehicle 1920, the RSU 1940, and/or a pedestrian's portable wireless device 1930. The information regarding the event may comprise a warning of a traffic accident on the road, a change of a road situation, and/or occurrence of an accident involving the vehicle 1910. The vehicle 1910 may perform V2X communications to send information regarding the event to a pedestrian adjacent to or crossing a road via the pedestrian's portable wireless device 1930, for example, as the vehicle 1910 approaches the pedestrian.

At least one vehicle 1910, 1920, portable wireless device 1930, and/or RSU 1940 may be configured for performing V2X communications, for example, to prevent and/or reduce vehicle collisions and/or improve communications quality of service in geographic locations having a high density of wireless devices 1930, for example, in city downtowns. At least one vehicle 1910, 1920, portable wireless device 1930, and/or RSU 1940 may be configured for performing wireless congestion control, for example, in conjunction with V2X communications, to mitigate collisions by adjusting one or more communications parameters to control a congestion level on the wireless channel(s) used by the at least one vehicle 1910, 1920 and improve reliability of V2X communications.

In some types of wireless communications, a wireless device may measure a channel busy ratio (CBR) and/or a channel occupancy ratio (CR). The wireless device may measure the CBR and/or CR, for example, to determine (e.g., characterize) the channel state, and/or allow/facilitate the wireless device to determine and/or take corrective actions. The CBR may be determined based on a portion (or quantity) of subchannels in a radio resource pool having measured RSSIs exceeding a threshold (e.g., a configured threshold, or a pre-configured threshold such as may be pre-configured by a base station). The total frequency resources of the radio resource pool may be divided into a quantity (e.g., a given number) of subchannels. The CBR may be sensed over, for example, the last 100 subframes (e.g., with subframes determined according to LTE or other standard or access technology), or any other duration or period (e.g., slots determined based on NR or any other access technology). The CBR may determine an estimate of a state of the channel. The CR may be determined at subframe n as a sum of the total number/quantity of subchannels used for sidelink transmissions in subframes ([n−a, n−1] subchannels) and granted in subframes ([n, n+b] subchannels), divided by a total number of subchannels ([n−a, n+b] subchannels). Values for the variables a and b may be determined by the wireless device based on the conditions a+b+1=1000, a≥500. The CR may provide an indication of the channel utilization by the transmitter of the wireless device. A wireless device's CR limit, for each interval of CBR values, may represent a maximum footprint for the transmitter of the wireless device. A base station may establish the CR limit based on a CBR range and packet priority. The base station may establish a low CR limit, for example, if a high CBR is observed. The base station may establish a low CR limit, for example, based on a low packet priority level. The base station may map its CBR value to the correct interval to determine the corresponding CR limit value, for example, if transmitting a data packet. The wireless device may decrease its CR below the CR limit, for example, if the wireless device's CR is higher/greater than the CR limit. Various methods may be practiced to reduce the CR, for example. A base station may disable packet retransmission, for example, via a drop packet retransmission procedure. A base station may disable packet transmission and retransmission, for example, via a drop packet transmission procedure. A wireless device may reduce CR by augmenting the utilized MCS index, for example, via a procedure for adapting the MCS. The wireless device adapting the MCS may reduce the quantity of subchannels used for transmission. The wireless device increasing the MCS may reduce robustness of the message that the wireless device sends, and may consequently reduce a range of the message. A wireless device may reduce transmission power, for example, via a procedure for adapting the transmission power. The wireless device reducing transmission power may reduce overall CBR in the area, and may increase the value of the CR limit.

A wireless device may measure CBR taking into account a variable quantity of OFDM symbols represented in a subchannel and a variable numerology, for example, as in an NR system. A wireless device may perform a sensing operation on a subchannel designated for sidelink communications. The wireless device may designate resources based on the subchannel. A wireless communication system may designate a variable format, variable quantity, and/or variable time period for slots in temporal resources for the sidelink. A slot may comprise downlink components, uplink components, sidelink components, and/or flexible components. A quantity of symbols allocated to the sidelink in each slot may be based on a quantity of resources that are allocated to downlink, uplink, and/or flexible components. Subcarrier spacing in a wireless communication system may be varied. Subcarrier spacing in a wireless communication system may be set differently for each carrier or bandwidth part of the wireless communication system.

Figure 20:
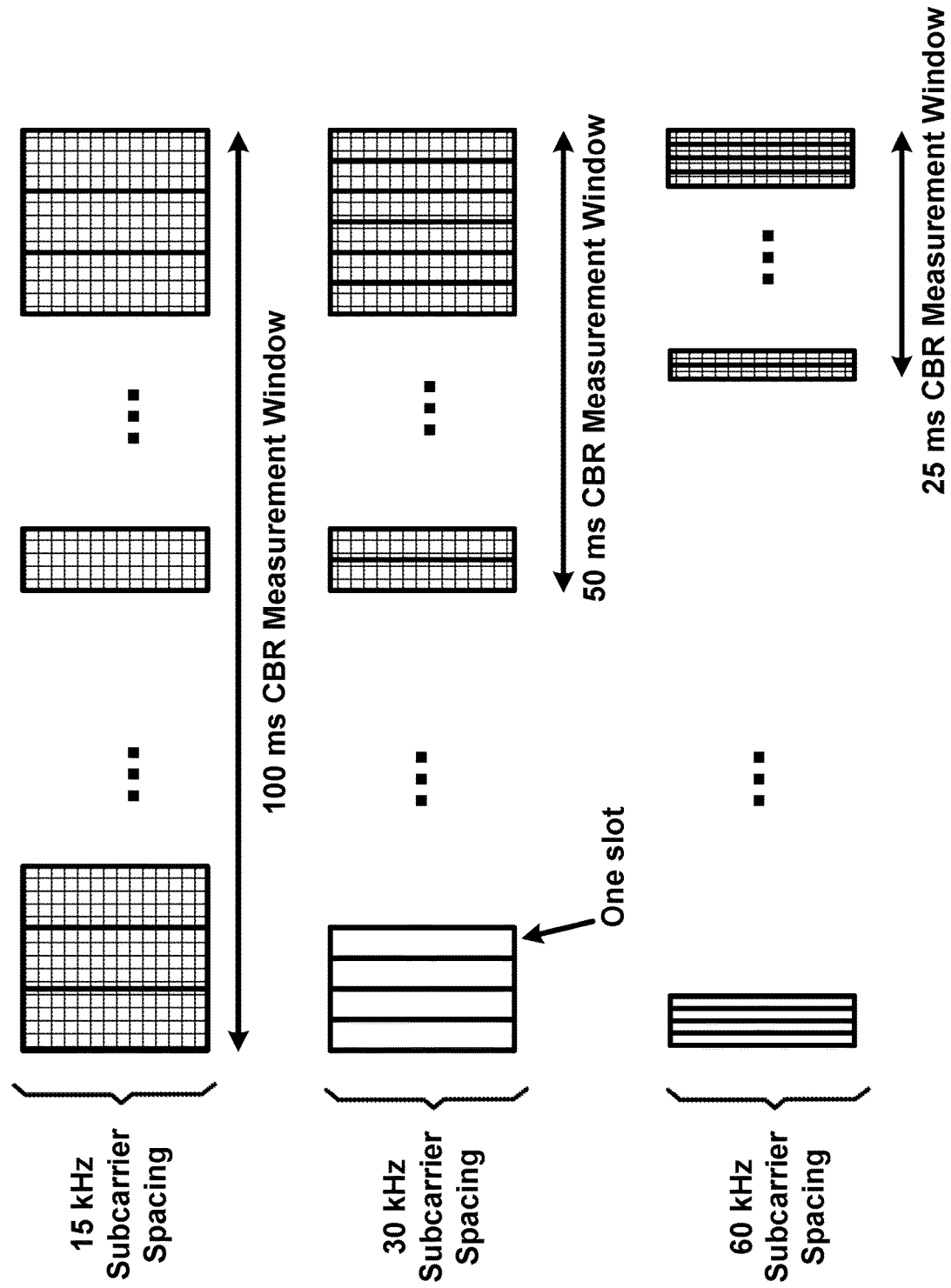
FIG. 20 shows an example of channel busy ratio (CBR) measurement.

FIG. 20 shows an example of CBR measurement. A wireless device may vary a CBR measurement window size, for example, based on the subcarrier spacing. For example, the wireless device may vary a width of CBR measurement window if each carrier and/or BWP (or other wireless resource) is designated with different subcarrier spacings, and/or if the wireless device measures a CBR based on a fixed quantity of slots (e.g., regardless of subcarrier spacing). A wireless device may measure CBR during a 50 ms period for 30 kHz subcarrier spacing and/or during a 25 ms period for 60 kHz subcarrier spacing (or any other period for any other frequency of subcarrier spacing), respectively, for example, if the wireless device performs measurements in 100 slots (or any other duration or period) regardless of the subcarrier spacing. The wireless device measurement results of the CBR for 25 ms subcarrier spacing (or any other subcarrier spacing) may be unstable, for example, due to differences in the width of CBR measurement window. The wireless device's CBR measurement window width (or size) may be insufficient for accurate CBR measurement, for example, when a width of the CBR measurement window is based on the subcarrier spacing. The wireless device may produce more accurate and reliable CBR measurement results based on the subcarrier spacing, for example, the width of the CBR measurement window increasing in proportion to the subcarrier spacing. For example, the width of CBR measurement for 15 kHz, 30 kHz, and 60 kHz subcarrier spacing may be 100 slots, 200 slots, and 400 slots, respectively. A wireless device may determine the width of the CBR measurement window, based on the subcarrier spacing in a sidelink resource pool, a BWP, and/or a carrier. The base station may send (e.g., transmit) configuration parameters of the subcarrier spacing to the wireless device. The wireless device may receive the configuration parameters from the base station, for example, via RRC message and/or SIB message(s).

Figure 21:
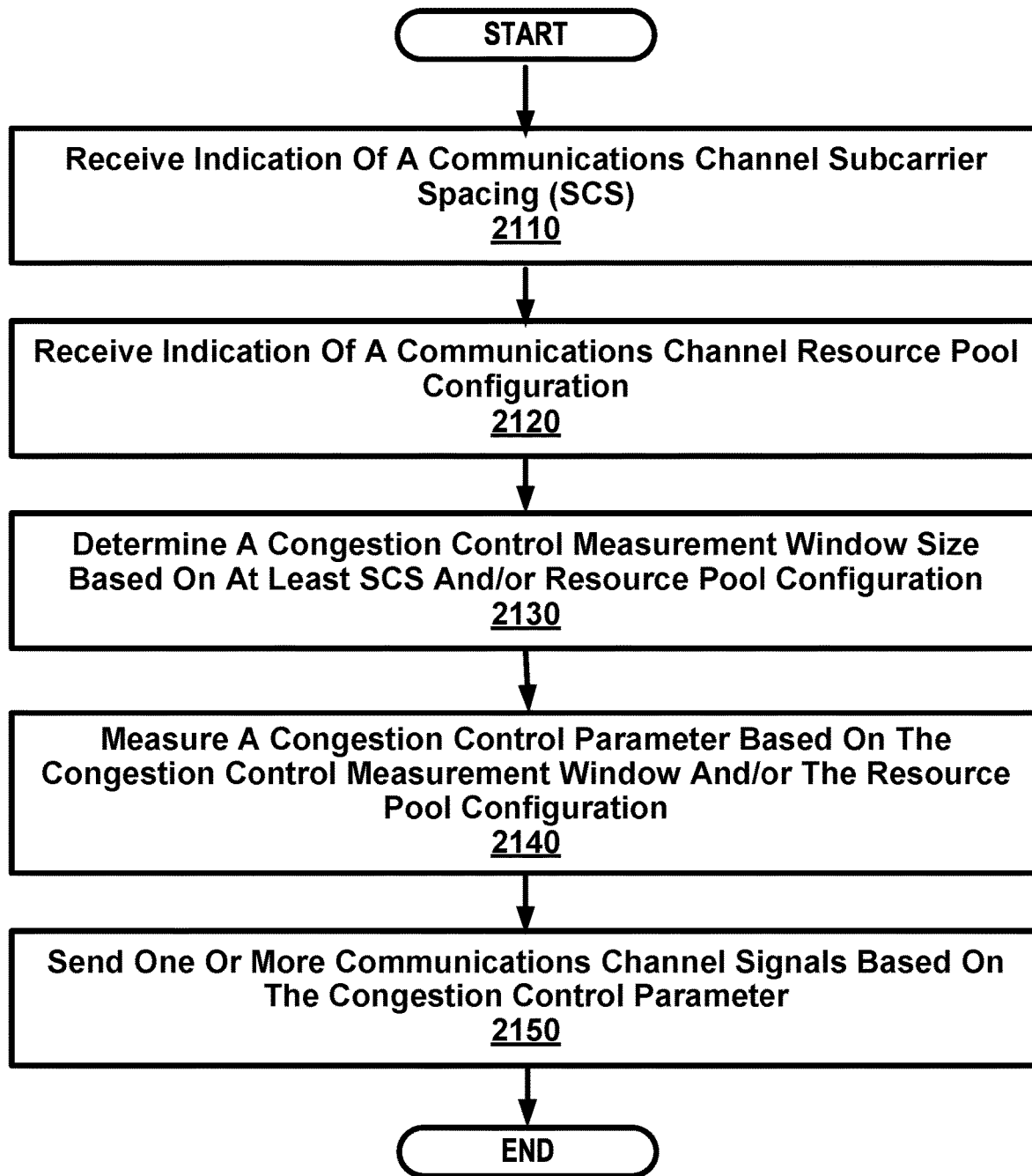
FIG. 21 shows an example of wireless communications.

FIG. 21 shows an example for a wireless device performing wireless communications. Any of the wireless devices 1610, 1620, 1710, 1720, 1930, and/or any other wireless device, may perform a method comprising steps shown in FIG. 21. In step 2110, a wireless device may receive an indication of communications channel subcarrier spacing (SCS) from a base station. The base station (e.g., a gNB, or any other wireless communications device) may determine, designate, and/or send (e.g., transmit) the indication of the SCS to a wireless device. The communications channel SCS may comprise a sidelink SCS. The wireless device may receive the indication of the SCS indirectly or directly from the base station, for example, if the wireless device is communicatively coupled with the base station via a wireless network cell provided by the base station. The wireless device may receive the indication of the SCS indirectly from the base station via another wireless device, for example, if the wireless device is not communicatively coupled with the base station via the wireless network cell provided by the base station. The SCS may be, for example, any of 15 kHz, 30 kHz, 60 kHz, and/or any other frequency spacing values that represent a difference in frequency between adjacent subcarriers of the communications channel The indication of the SCS may comprise an index value. An index value may be associated with, for example, a table (e.g., a predetermined lookup table) that may be stored at or accessible by the wireless device, for example, via a wireless network connection or a removable memory device. The indication of the SCS may comprise one or more parameters for use in a predetermined formula to determine the SCS. The indication of the SCS may comprise the value of the SCS. The indication of the SCS may be designated by the base station for the wireless device to configure a sidelink channel for direct wireless communications with another wireless device.

In step 2120, a wireless device may receive an indication of a communications channel resource pool configuration. The communications channel resource pool may comprise a plurality of unit resources. The communications channel resource pool may comprise the resource pool 1750. The communications channel resource pool configuration may correspond to a set of radio resource units of the resource pool 1750 that the wireless devices 1710, 1720 may utilize for sending (e.g., transmitting) and/or receiving wireless communications signals 1730. The indication of the communications channel resource pool configuration may comprise an index value to a predetermined lookup table stored at or accessible by the wireless device. The indication of the communications channel resource pool configuration may comprise a parameter for use in a predetermined formula to calculate the communications channel resource pool configuration. The indication of the communications channel resource pool configuration may comprise the value of the communications channel resource pool configuration. The indication of the communications channel resource pool configuration may be designated by the base station for the wireless device to configure a sidelink channel for direct wireless communications with another wireless device.

In step 2130, a wireless device may determine a congestion control measurement window size based on at least one or more of the communications channel SCS, processing capabilities of wireless device, and/or communications channel resource pool configuration (e.g., resource pool configuration). The communications channel resource pool configuration may include specifications for communications channel SCS, for example, sidelink SCS. Selecting a BWP or channel that is less congested may reduce or avoid wireless data collisions between messages sent (e.g., transmitted) via the selected BWP or channel. The congestion control measurement may comprise measurement of noise characteristics of one or more radio resources of a communications channel (e.g., sidelink channel, BWP) for determining a congestion control parameter (e.g., CBR).

At least some wireless communications (e.g., LTE) may feature a fixed time period (e.g., 4 ms or any other duration or period) for performing a congestion control measurement of a communications channel. A wireless device determining a congestion control measurement window size based on at least one of the SCS and/or communications channel resource pool configuration may provide a variable length time period for performing congestion control measurement of the communications channel. The variable length time period may adapt the length of the measurement time period according to the numerology of the SCS for reduced delay and/or improved performance A fixed length of measurement time period for all numerologies of SCS may lead to excessive delays for some numerologies of SCS, for example, 32 slots delay for a 120 kHz SCS (or other delay for other spacing). Processing times and/or delays for congestion control measurement and parameter determination being based on at least one of the communications channel SCS, processing capabilities of wireless device, and/or communications channel resource pool configuration may reduce to minimize processing times and/or delays at each of a plurality of numerologies of the SCS.

In step 2140, a wireless device may measure a congestion control parameter based on the congestion control measurement window, processing capabilities of wireless device, and/or the communications channel resource pool configuration (e.g., resource pool configuration). Measuring the congestion control parameter may comprise determining or calculating the congestion control parameter value based on measurements of the communications channel. The measurement may be based on at least the processing capabilities and/or speed of the wireless device. The wireless device may measure wireless signal and noise characteristics of a plurality of subchannels and/or radio resources of a channel (e.g., a specified channel). The channel may be associated with the SCS. The radio resources may be indicated (e.g., defined and/or indexed) by temporal characteristics, frequency-domain characteristics (e.g., OFDM symbols), and/or spatial characteristics (e.g., multiple antennas or antenna panels, beamforming, etc.) The wireless device may measure a signal strength and/or quality (e.g., signal to noise ratio, quantity or percentage of time slots comprising a symbol, quantity or percentage of frequency sub-bands comprising a symbol, quantity or percentage of spatial positions comprising a symbol) at each of the radio resource characteristics. The wireless device may determine a characteristic value. The congestion control parameter may be determined by a combination of characteristic values measured for each of the radio resources. The wireless device may determine the congestion control parameter by calculating a weighted average of the indicated (e.g., identified) and measured symbols/signals.

In step 2150, a wireless device may send (e.g., transmit) one or more communications channel signals based on the congestion control parameter. The communications channel may comprise a sidelink channel, or a BWP, for example. The congestion control parameter may comprise a CBR. The wireless device may send the one or more communications channel signals to a base station providing a cell of a wireless network to which the wireless device may be connected (e.g., for wireless communications). The wireless device may send the one or more communications channel signals to another wireless device, for example, via a wireless network cell (e.g., via which both the wireless device and the other wireless device may be connected), via a direct wireless communications between the two wireless devices, and/or via direct wireless communications between each of the two wireless devices and a third intermediary wireless device that forwards (e.g., retransmits) the communications channel signals received from one of the two wireless devices to the other of the two wireless devices.

Figure 22:
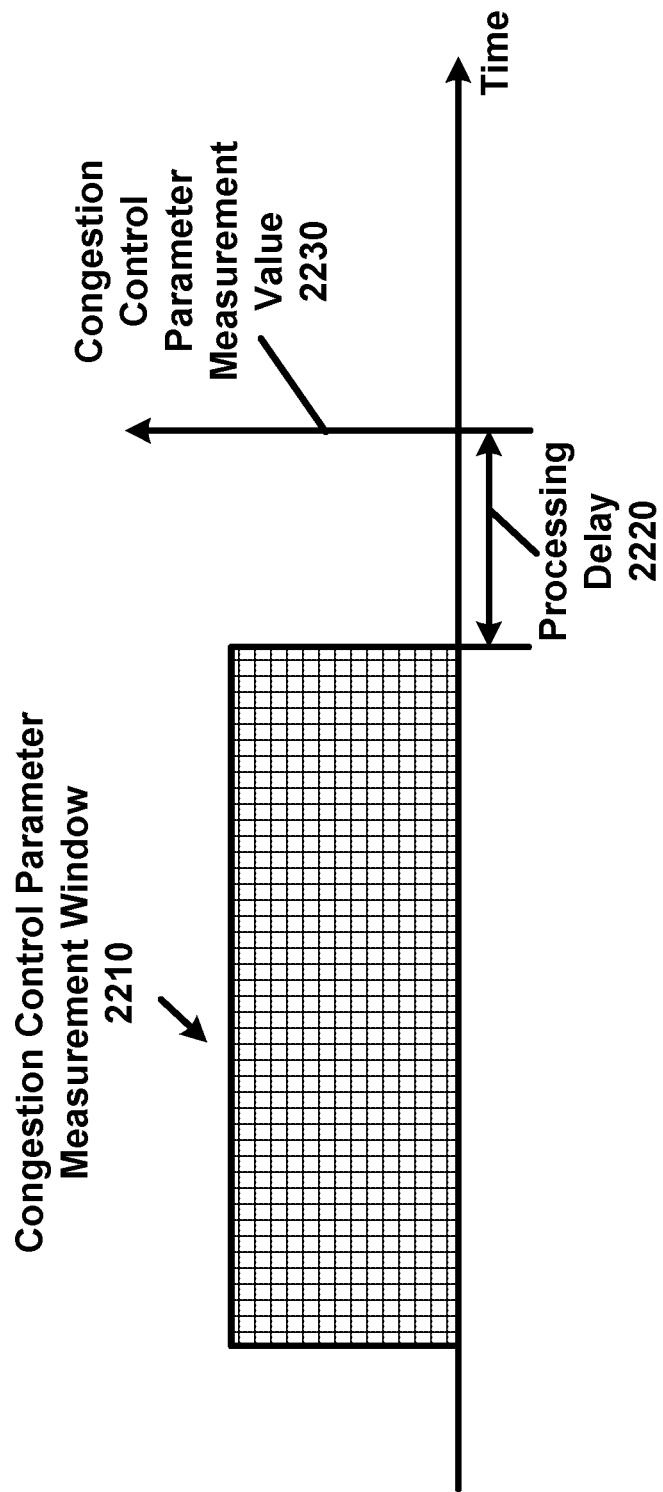
FIG. 22 shows an example for congestion control.

FIG. 22 shows an example of congestion control. A congestion control parameter measurement window 2210 may be followed by a temporal processing delay 2220, before a congestion control parameter measurement value 2230 may be available. Although only a time axis is shown in FIG. 22, the congestion control parameter measurement window 2210 may also have frequency-domain and/or spatial-domain dimensions that define a frequency-domain bandwidth and/or symbol range and/or a spatial-domain geometric range in which a wireless device may measure a congestion control parameter. The congestion control parameter that is measured and for which a value 2230 is generated by the wireless device may comprise a CBR. The congestion control parameter may represent a level of busyness and/or percentage of maximum data throughput utilized by the measured communications channel. The congestion control parameter measurement value 2230 corresponding to a communications channel (e.g., sidelink or BWP) associated with the congestion control parameter measurement window 2210 may be compared with a threshold and/or with corresponding congestion control parameter values 2230 corresponding to other communications channels. The wireless device may determine a communications channel with which to establish communications, for example, based on a result of the comparisons.

In some types of wireless communications, a wireless device may have a fixed processing delay 2220 (e.g., 4 ms or any other duration or period) that determines a quantity of time that passes between performing a measurement of a communications channel within a congestion control parameter measurement window 2210, and a time at which the wireless device generates and/or outputs the congestion control parameter measurement value 2230 (e.g., based on the measurement of the communications channel within the congestion control parameter measurement window 2210). An excessive processing delay 2220 may occur for some numerologies of an SCS in a communications channel, for example, if the processing delay 2220 is fixed to a same value for all the numerologies. A sidelink communications channel having a 120 kHz SCS, for example, may have a processing delay 2220 of 32 slots, for example, if the processing delay 2220 is a fixed value regardless of the SCS numerology. Reducing the processing delay 2220 to a smaller fixed value for all the numerologies may not be feasible, for example, because a shorter fixed processing delay 2220 that may be acceptable at one numerology (e.g., 120 kHz SCS) may be unacceptably short (e.g., having too few slots) at another numerology (e.g., 15 khZ SCS) for the wireless device to effectively communicate via the communications channel at an acceptable level of QoS.

A wireless device may determine a processing delay 2220 that varies according to a communications channel parameter to have a reduced, optimized or near-optimal processing delay 2220 for each numerology of the communications channel parameter. The wireless device may make more efficient use of its communications channel's radio resources by having a variable processing delay 2220 that is based on a numerology of a relevant communications channel parameter, for example, a sidelink SCS value. The processing delay 2220 may be based on processing capabilities and/or speed of the wireless device to facilitate the wireless device in completing measurements and determinations/calculations of the congestion control parameter measurement value 2230 at each numerology of one or more relevant communications channel parameter(s). The wireless device's dynamically varying of the processing delay 2220 based on one or more communications channel parameter(s) (e.g., a numerology for a resource pool or a BWP, or a sidelink SCS for a resource pool or a BWP) and/or the wireless device's capabilities and/or speed (e.g., processing capability, computing capability, etc.) may improve the wireless device's accuracy in determining/calculating the congestion control parameter measurement value 2230, communications efficiency, and/or responsiveness to current operating conditions. As described above, a wireless device may report various capability information (e.g., radio access capability) to a base station. For example, the wireless device may report, to a base station via an RRC signaling, the processing/computing capability for congestion control (e.g., a processing capability type/index/indicator from a limited number/quantity of types for the congestion control processing/computing capability), as described herein. Different wireless devices may have different processing capabilities. For example, a system may use any quantity of wireless device processing capabilities (e.g., 2, 3, 4, etc.), such as a first processing capability for a first operation/implementation (e.g., an advanced wireless device operation/implementation), a second processing capability for a second operation/implementation (e.g., for a normal or non-advanced wireless device operation/implementation), and/or an $n^{th}$ processing capability for an $n^{th}$ implementation (e.g., for any other operation/implementation). The base station may determine a quantity of delay for processing/computing (e.g., for congestion control) that may be required by a wireless device, for example, if a wireless device reports its processing capability to a base station. The base station may determine the processing delay (e.g., for congestion control) for the wireless device. Reducing delays, improving speed and efficiency, and/or managing (e.g., reducing) communications channel congestion may improve communications throughput, performance, reliability, and/or power consumption characteristics of the wireless device.

Figure 23:
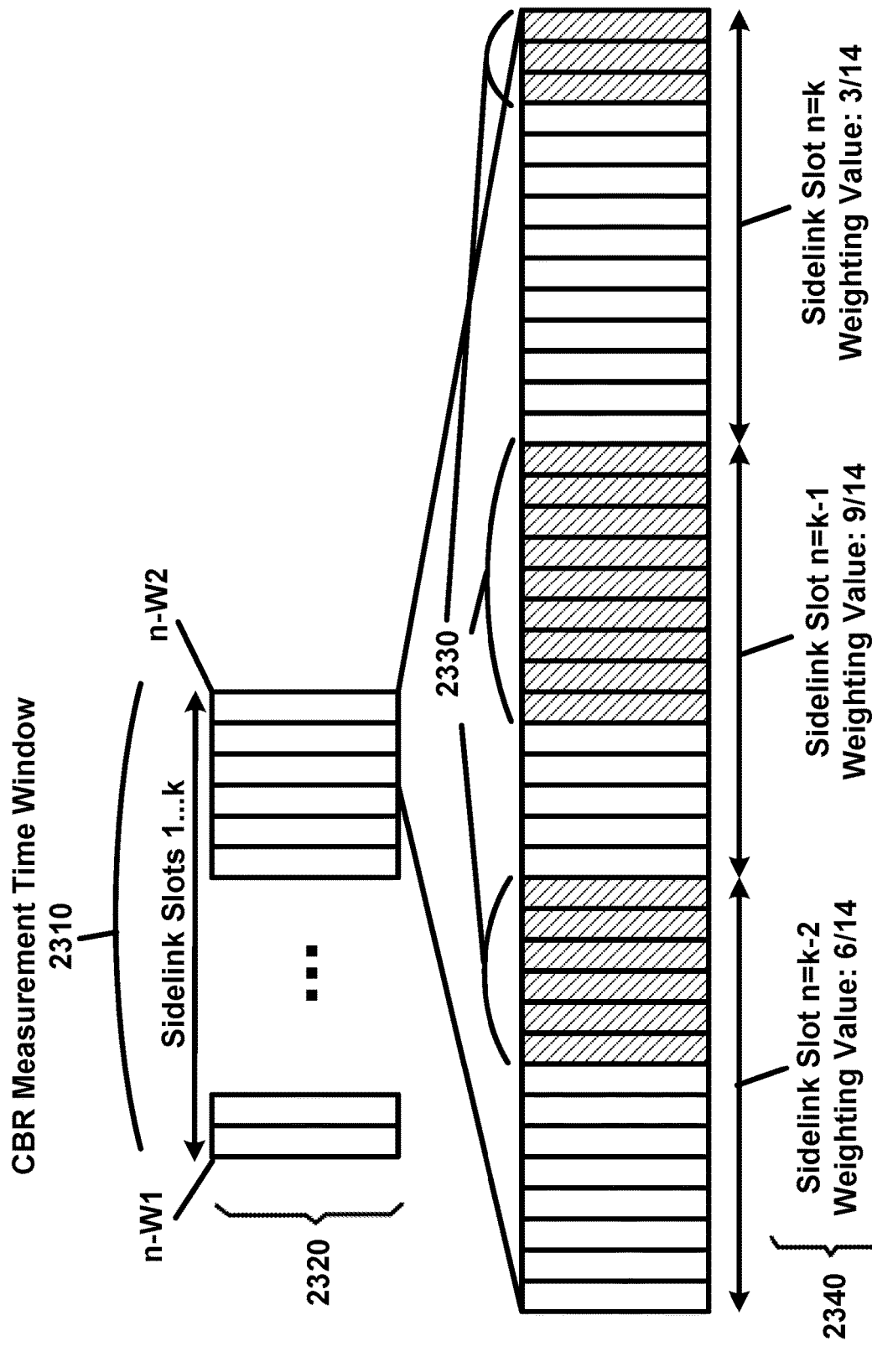
FIG. 23 shows an example of CBR measurement.

FIG. 23 shows an example of CBR measurement. The CBR measurement may be based on a plurality of sidelink slots 2320. The plurality of sidelink slots 2320 may each comprise a variable quantity of sidelink symbols 2330 (e.g., OFDM symbols). CBR measurements of individual ones of the sidelink slots 2320 may not be directly comparable, for example, if the sidelink slots 2320 comprise a variable quantity of sidelink symbols 2330, because each sidelink slot's quantity of utilized radio resources may be different. A wireless device may weight the CBR of each sidelink slot 2320 by a value based on (e.g., proportional to) the sidelink slot's quantity of sidelink symbols 2330 to compensate for the variable quantity of sidelink symbols 2330.

A wireless device may determine a CBR based on a weighted average of a quantity of unit resources (e.g., subchannels) of a set of radio resources (e.g., a radio resource pool, bandwidth parts, or carriers) having respective measurement levels greater than a threshold during a CBR measurement time window 2310. A weighting value 2340 to be applied with respect to a unit resource (e.g., a given/particular unit resource) may be predetermined or determined based on (e.g., proportional to) the unit resource's quantity of symbols. A first CBR measurement time window 2310 may comprise slots ranging from a slot n-W1 to a slot n-W2. W1 or W1-W2 may be predetermined and/or proportional to subcarrier spacing. W2 may be predetermined or determined. A wireless device may vary the W2 value if measuring CBR, for example, based on capabilities of the wireless device. A wireless device may be unable to determine the CBR of the preceding (e.g., immediately preceding) slot due to the processing delay. W2 may be predetermined, for example, by considering/factoring processing capabilities (e.g., the worst processing capability) of a wireless device. W2 may vary depending on the subcarrier spacing, for example, if processing delay varies based on subcarrier spacing.

The wireless device may measure an RSRP-based CBR. The wireless device may use an energy-based and/or RSSI-based CBR measurement method to generate/determine an RSSI-based or energy-based CBR. RSSI-based and/or energy-based CBR may be determined by measuring energy for all received signals, which may comprise, for example, in-band emission, signals from other radio access technology, noise, etc. A wireless device may determine an RSRP-based CBR by measuring the RSRP of one or more reference signals transmitted in the subchannel and determining that the corresponding subchannel is busy if the measured CBR exceeds a predetermined threshold. For example, the one or more reference signal may be a DM-RS transmitted in the subchannel A base station may configure the predetermined threshold for a wireless device, for example, via RRC message(s) and/or SIB message(s).

A wireless device may perform an RSRP-based CBR measurement that generates different values based on on the DM-RS port. The wireless device may receive a quantity of DM-RS ports per resource pool from a base station. The wireless device may measure RSRP-based CBR based on the corresponding DM-RS port, per resource pool. The wireless device may measure RSRP-based CBR based on the quantity of DM-RS ports per resource pool. A wireless device may use a variable quantity of ports to measure the RSRP-based CBR. A base station may send, to the wireless device and via the RRC or SIB, an indication of and/or information about the DM-RS port set which may be measured based on radio resource pool, BWP, and/or carrier. The DM-RS port set determined for each resource pool, BWP, and/or carrier may be pre-configured for operation in association with an outside coverage wireless device. A wireless device may determine RSRP-based CBR by measuring spatial resources separately. A wireless device may deduce information regarding how much CBR is dispersed in each spatial resource, how many wireless devices overlap (e.g., on average) in one subchannel, and so on.

A wireless device may use overlapping resources at a time and frequency domain coordinate. The wireless device may use spatially separated resources that overlap in the time and frequency domains, for example. The wireless device may have an exclusive reservation for using the DM-RS port, such that another wireless device is not permitted to use the DM-RS port. The wireless device may select one (or more) of the remaining DM-RS ports, for example, except for the DM-RS port for which the measured RSRP is equal to or greater than a threshold, if the wireless device determines the DM-RS port for sending (e.g., transmitting) signals. A wireless device and/or base station, based on RSRP-based CBR, may more accurately measure the CBR of another wireless device using the same RAT (radio access technology). A wireless device, based on RSSI-based CBR, may measure CBR due to another RAT.

Figure 24:
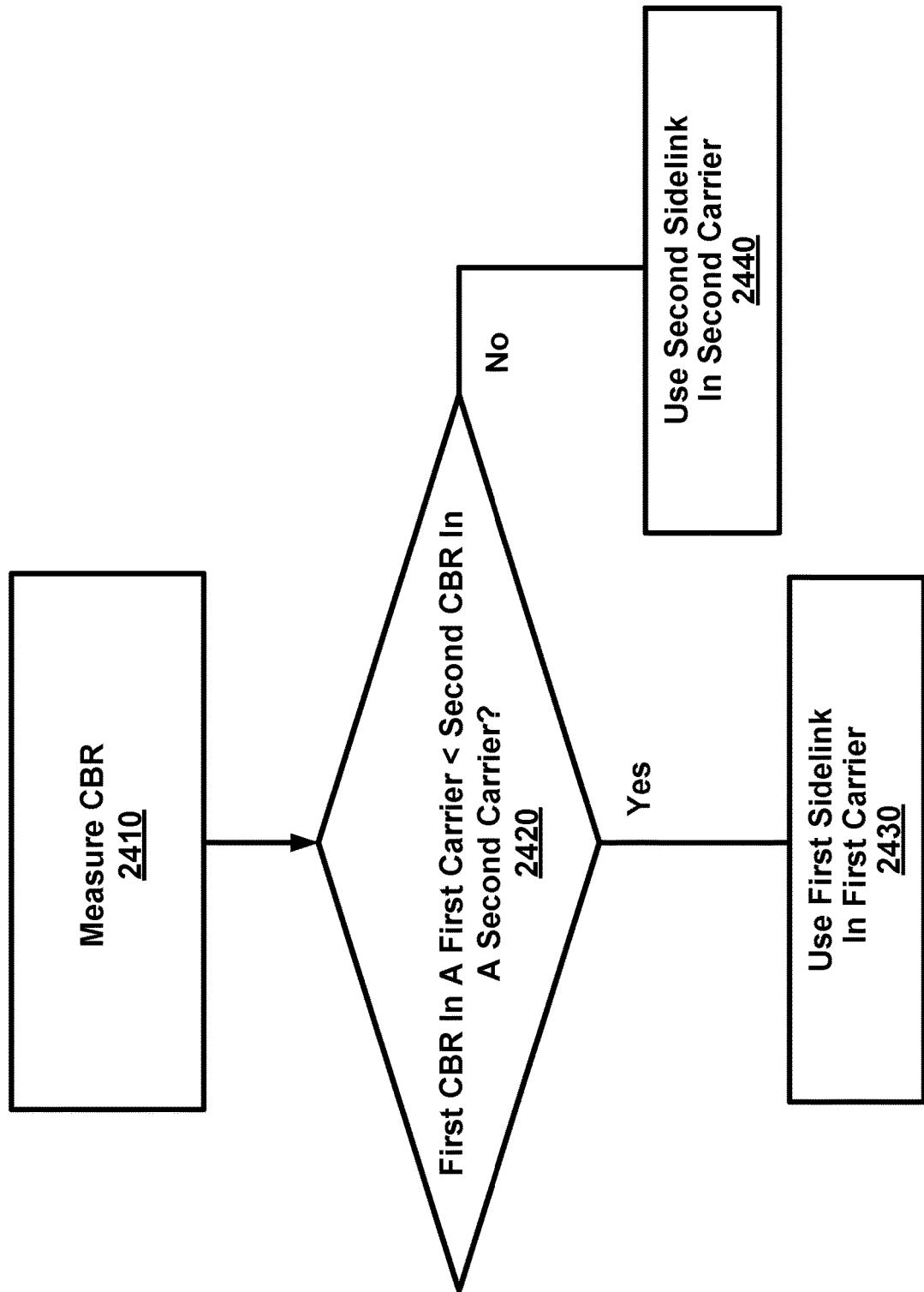
FIG. 24 shows an example of radio access technology selection based on CBR.

FIG. 24 shows an example for a wireless device measuring an RSRP-based CBR. Any of the wireless devices 1610, 1620, 1710, 1720, 1930, and/or any other wireless device, may perform a method comprising steps shown in FIG. 24. At step 2410, CBR may be measured. A wireless device may measure the CBR. The wireless device may determine a degree of busyness in spatial resources and/or time/frequency resources separately (or together simultaneously or near simultaneously). The wireless device may determine the spatial CBR measurement result as a ratio of a quantity of busy resources within a CBR measurement window to a total quantity of time, frequency, and/or spatial resources within the CBR measurement window. Spatial CBR may be represented as follows: time×frequency×space. An exemplary CBR may be determined/calculated according to four (4) (or any other quantity) busy resources within a CBR measurement window divided by a total of three (3) time× three (3) frequency×two (2) spatial resources within the CBR measurement window=4/(3×3×2)=4/18=2/9. The wireless device may determine/calculate the CBR for each individual spatial resource (e.g., DM-RS port) and the average CBR for each DM-RS port. The wireless device may measure the average CBR per spatial resource by separately calculating CBR for each space domain.

A base station may measure a single port when measuring an RSRP-based CBR. The base station may measure one or more DM-RS ports and/or not measure one or more other DM-RS ports. The base station may measure only specific, and less than all, ports and not perform measurements if multi-user (MU)-MIMO operation is prevented (e.g., not allowed). The wireless device may report an RSSI-based CBR and/or an RSRP-based non-CBR to a base station. The wireless device may determine whether a resource is busy or free, for example, based on the RSSI-based CBR measured value compared to a threshold level.

A wireless device may perform measurements of CBR when selecting carrier, bandwidth part, or RAT. The wireless device may perform RSSI-based CBR measurement to facilitate MU-MIMO or determine a MIMO transmission scheme. The wireless device may use RSRP-based CBR if determining the MIMO transmission scheme and/or rank. The wireless device may select/determine a RAT using RSSI-based CBR measurement values.

The wireless device may base one or more determinations on the following evaluating CR. The wireless device may increase the window size for measuring CR proportionately to subcarrier spacing. As the subcarrier spacing size increases, for example, the window size may increase proportionately. The wireless device may evaluate the CR value by weighting the number of used subchannels per slot proportionately to the number of OFDM symbols constituting the slot measurement. The wireless device may evaluate the CR only by the time/frequency subchannels used by the wireless device, thereby causing difficulty in evaluating the interference occurring in the spatial domain. The wireless device may perform multi-rank, for example, if the wireless device sends (e.g., transmits) data, weighting the quantity of used subchannels according to the rank number used. The wireless device may factor/consider rank when performing CR measurement and evaluation. The wireless device may measure the CR of a single rank transmission by subchannels of y, but the wireless device may measure the CR of a multi-rank transmission by y*x, where x may be a value greater than one.

A base station may send, and a wireless device may receive, subcarrier spacing and/or slot format configuration messages. The wireless device may determine a CBR based on a weighted average of a number of unit resources on a set of radio resources having respective measurement levels greater than a threshold during a first time window. The weighting value on a unit resource may be predetermined or proportional to the number of symbols comprising the unit resource. The first time window in slot n may comprise of from n-W1 to n-W2 slots. The wireless device may perform at least one of the following operations based on the CBR of the wireless device, for example: selecting one or more radio resource sets, selecting scheduling mode, selecting radio access technology, or adjusting at least one transmission parameter of one or more transmission parameters or transmission power of the wireless device.

In a step 2420, at least two different methods of measuring and/or calculating CBR of a channel may be compared, for example, to determine which method produces the best value for the CBR. The best value for the CBR may be, for example, the lowest value for the CBR. A CBR may be calculated/determined based on a first access technology (e.g., LTE or any other access technology) in a first carrier, for example. A CBR may be calculated/determined based on a second access technology (e.g., new radio (NR), or any other access technology). A CBR may be calculated/determined using any CBR methodology.

In a step 2430, a sidelink and associated carrier having the best (e.g., lowest) CBR may be established and/or used for sidelink communications. For example, a CBR for a first access technology (e.g., an LTE CBR) may have been determined to have the lowest CBR in step 2420, and therefore, the first access technology (e.g., LTE) sidelink may be used in a first carrier in step 2430. In step 2440, a sidelink and associated carrier having the best (e.g., lowest) CBR may be established and used for sidelink communications. For example, a CBR for a second access technology (e.g., an NR CBR) may have been determined to have the lowest CBR in step 2420, and therefore, the second access technology (e.g., NR) sidelink may be used in a second carrier in step 2440.

W1 or W1-W2 may be predetermined or proportional to subcarrier spacing. W2 may be predetermined or determined. For example, W1 or W1-W2 may be fixed and/or may depend upon subcarrier spacing and/or processing capability of a wireless device. A base station may configure or pre-configure at least one of time or frequency resource size for a unit resource for a resource pool. A base station may configure or pre-configure a set of radio resources as a bandwidth part or resource pool or carrier to measure CBR. A wireless device may configure or pre-configure a set of radio resources as a BWP, resource pool, and/or carrier to measure CBR. A base station may configure or pre-configure a threshold. A base station and/or a wireless device may determine a measurement level of a unit resource by RSSI on the unit resource. RSSI may represent a linear average on a total received power per symbol or per resource element comprising the unit resource. A base station and/or a wireless device may determine a measurement level of a unit resource by DM-RS-based RSRP, where DM-RS is transmitted within the unit resource and RSRP may represent a linear average over power contributions of resource elements that carry the DM-RS. A wireless device may determine/calculate a sum of measured RSRPs for each DM-RS port on a unit resource, if the wireless device indicated (e.g., identifies) that multiple DM-RS ports are used on the unit resource. A base station may send video and a wireless device may receive one or more configuration messages indicating a method of determining the measurement level in a set of radio resources. A wireless device may determine the method of determining measurement level between RSSI-based CBR measurement and RSRP-based CBR measurement in the set of radio resources. The selection candidate of scheduling mode may include at least one of: Mode 1, wireless base station schedules resource(s) to be used by wireless device for transmission(s), or Mode 2, the base station may determine transmission resource(s). The wireless device may send a scheduling request to the base station, if the wireless device selects Mode 1, its scheduling mode based on the CBR. The selection candidate of radio access technology includes at least one of: LTE based V2X, NR based V2X, IEEE 802.11p, satellite communications, and/or any other 3GPP or non-3GPP access technology. A wireless device may determine a channel resource utilization limit for the wireless device as a function of the measurement of CBR. The one or more transmission parameters may comprise at least one of a transmission rate, a number/quantity of hybrid automatic repeat request (HARQ) transmissions, a number/quantity of resources used for transmission, and/or the number/quantity of spatial layers or a modulation and coding scheme (MCS). A wireless device may adjust the one or more transmission parameters and/or the transmit power of the wireless device, for example, to decrease a channel resource utilization by performing at least one of: decreasing the transmission rate; decreasing the number of HARQ transmissions; decreasing the number of resources used for transmission; increasing the MCS; increasing the number of spatial layers, and/or decreasing the transmission power.

Figure 25:
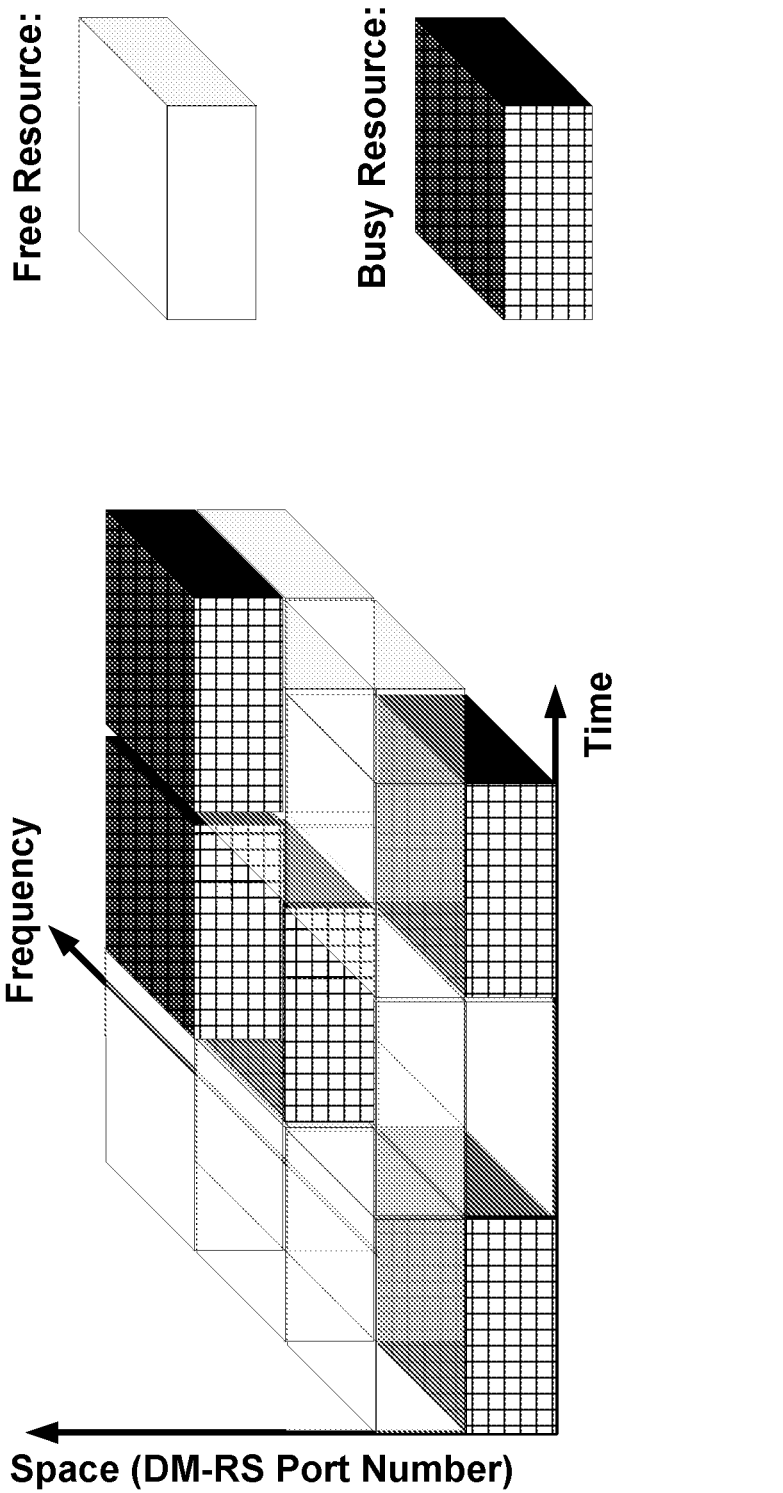
FIG. 25 shows an example distribution of resources.

FIG. 25 shows an example of distributed resources. For example, busy and free resources (e.g., wireless resources) may be distributed on a 3-axis graph of time vs. frequency vs. space (DM-RS port number). Indications of busy and free resources may be provided in a table, graph, or any other form. Indications of busy and free resources may be stored in memory at any device (e.g., wireless device, base station, etc.). A device (e.g., wireless device, base station, etc.) may determine whether a resource is busy or free, for example, based on the RSSI-based CBR measured value compared to a threshold level.

A wireless device may receive, from a base station, an indication of a resource pool. The wireless device may receive, from the base station, an indication of sidelink subcarrier spacing (SCS). The wireless device may determine a congestion control parameter. Determining the congestion control parameter may be based on a processing capability of the wireless device. Determining the congestion control parameter may be based on the sidelink SCS. The wireless device may transmit, via a sidelink and based on the congestion control parameter, at least one message. The wireless device may receive, from the base station, an indication of at least one demodulation reference signal (DMRS) port. The wireless device may determine, based on the indication of the resource pool, a plurality of resources. The wireless device may measure, for each DMRS port of the at least one DMRS port, a reference signal received power (RSRP) associated with at least one resource of the plurality of resources. Determining the congestion control parameter may further be based on the RSRP associated with the at least one resource of the plurality of resources. The wireless device may receive, from the base station, an indication of a measurement window. Determining the congestion control parameter may be performed during the measurement window. The sidelink may comprise at least one of a data channel, a control channel, a broadcast channel, a shared channel, a discovery channel, a subchannel, a bandwidth part, a synchronization signal block, a resource pool, a resource unit, an OFDM symbol, a sidelink slot, a spatial resource, and/or a carrier. The congestion control parameter may comprise a channel busy ratio. Determining the congestion control parameter may comprise determining a portion of unit resources, of the resource pool, associated with a sidelink measurement exceeding a threshold value. Transmitting the at least one message may comprise transmitting, by the wireless device to a second wireless device, the at least one message. The wireless device may receive, from the second wireless device, a response to the at least one message. The wireless device may determine, based on the congestion control parameter, at least one of: a transmission rate, a quantity of HARQ transmissions, a quantity of resources used for transmission, a modulation and coding scheme, a quantity of spatial layers, or a transmission power. The wireless device may receive, from the base station, an indication of a measurement window. Determining the congestion control parameter may further be based on sidelink measurements performed during the measurement window. Determining the congestion control parameter may further be based on a weighted average of a quantity of unit resources that have a sidelink measurement level greater than a threshold, on the resource pool comprising the unit resources. The sidelink measurement levels may be determined during a measurement window. A weighting value corresponding to a unit resource may be proportional to a quantity of symbols associated with the unit resource. Determining the congestion control parameter may comprise performing measurements corresponding to energy levels of a plurality of unit resources, of the resource pool, associated with different temporal slots and different frequency ranges, and determining a portion of the plurality of unit resources associated with measurement results exceeding a threshold value. Determining the congestion control parameter may comprise determining a duration of a measurement window, based on the SCS, during which to perform sidelink measurements.

Systems, devices, and media may be configured with the described method. A wireless device may comprise one or more processors. The wireless device may also comprise memory storing instructions that, when executed by the one or more processors, cause the wireless device to perform the described method, additional operations, and/or include the additional elements. A system may comprise a wireless device configured to perform the described method, and a base station configured to send the indication of the SCS. A computer-readable medium may store instructions that when executed, may cause performance of the described method.

A wireless device may receive, from a base station, an indication of a resource pool. The wireless device may receive, from the base station, an indication of at least one demodulation reference signal (DMRS) port. The wireless device may determine, based on the indication of the resource pool, a plurality of resources. The wireless device may measure, for each DMRS port of the at least one DMRS port, a reference signal received power (RSRP) associated with at least one resource of the plurality of resources. The wireless device may determine, based on the RSRP associated with the at least one resource of the plurality of resources, a congestion control parameter. The wireless device may transmit, via a sidelink and based on the congestion control parameter, at least one message. The wireless device may receive, from the base station, an indication of sidelink subcarrier spacing (SCS). The wireless device may determine the congestion control parameter further based on the sidelink SCS. The wireless device may receive, from the base station, an indication of a measurement window. Determining the congestion control parameter may be performed during the measurement window. The resource pool may comprise at least one of a data channel, a control channel, a broadcast channel, a shared channel, a discovery channel, a subchannel, a bandwidth part, a synchronization signal block, a resource pool, a resource unit, an OFDM symbol, a sidelink slot, a spatial resource, and/or a carrier. The congestion control parameter may comprise a channel busy ratio. Determining the congestion control parameter may comprise determining a portion of unit resources, of the resource pool, associated with a sidelink measurement exceeding a threshold value.

Systems, devices, and media may be configured with the described method. A wireless device may comprise one or more processors. The wireless device may also comprise memory storing instructions that, when executed by the one or more processors, cause the wireless device to perform the described method, additional operations, and/or include the additional elements. A system may comprise a wireless device configured to perform the described method, and a base station configured to send the indication of the SCS. A computer-readable medium may store instructions that when executed, may cause performance of the described method.

A wireless device may receive, from a base station, an indication of sidelink subcarrier spacing (SCS). The wireless device may determine a channel busy ratio (CBR). Determining the CBR may be based on the sidelink SCS. The wireless device may transmit, via a sidelink and based on the CBR, at least one message. The wireless device may receive, from the base station, an indication of a resource pool. The wireless device may determine, based on the indication of the resource pool, a plurality of resources. The wireless device may measure a reference signal received power (RSRP) associated with at least one resource of the plurality of resources. Determining the CBR may further be based on the RSRP associated with the at least one resource of the plurality of resources. The wireless device may receive, from the base station, an indication of a measurement window. Determining the CBR may be performed during the measurement window. Determining the CBR may further be based on a processing capability of the wireless device. Determining the CBR may comprise determining a portion of unit resources, of a resource pool, associated with a sidelink measurement exceeding a threshold value. The wireless device may determine, based on the CBR, at least one of: a transmission rate, a quantity of HARQ transmissions, a quantity of resources used for transmission, a modulation and coding scheme, a quantity of spatial layers, or a transmission power.

Systems, devices, and media may be configured with the described method. A wireless device may comprise one or more processors. The wireless device may also comprise memory storing instructions that, when executed by the one or more processors, cause the wireless device to perform the described method, additional operations, and/or include the additional elements. A system may comprise a wireless device configured to perform the described method, and a base station configured to send the indication of the SCS. A computer-readable medium may store instructions that when executed, may cause performance of the described method.

A wireless device may receive, from a base station, a configuration message comprising a resource pool configuration. The resource pool configuration may indicate a plurality of unit resources within a resource pool. The wireless device may receive, from a base station, a configuration message comprising a quantity of demodulation reference signal (DMRS) ports. The wireless device may measure, based on the resource pool configuration and the quantity of DMRS ports, a reference signal received power (RSRP) for each DMRS port on each of the plurality of unit resources. The wireless device may determine a channel busy ratio (CBR) based on a quantity of the plurality of unit resources whose sidelink RSRP measurements of each DMRS port, measured by the wireless device, exceed a threshold on the resource pool during a time window. The wireless device may determine a channel busy ratio (CBR)

further based on the quantity of DMRS ports. The wireless device may transmit one or more sidelink signals based on the CBR.

Systems, devices, and media may be configured with the described method. A wireless device may comprise one or more processors. The wireless device may also comprise memory storing instructions that, when executed by the one or more processors, cause the wireless device to perform the described method, additional operations, and/or include the additional elements. A system may comprise a wireless device configured to perform the described method, and a base station configured to send the indication of the SCS. A computer-readable medium may store instructions that when executed, may cause performance of the described method.

A wireless device may receive, from a base station, a configuration message comprising a resource pool configuration. The resource pool configuration may indicate a plurality of unit resources. The resource pool configuration may indicate a quantity of symbols of each unit resource. The wireless device may determine a channel busy ratio (CBR) based on a weighted average of a quantity of unit resources having a sidelink measurement level of each unit resource being greater than a threshold, on the resource pool, during a first time window. A weighting value associated with a unit resource may be proportional to the quantity of symbols of the unit resource. The wireless device may transmit one or more sidelink signals based on the CBR.

Systems, devices, and media may be configured with the described method. A wireless device may comprise one or more processors. The wireless device may also comprise memory storing instructions that, when executed by the one or more processors, cause the wireless device to perform the described method, additional operations, and/or include the additional elements. A system may comprise a wireless device configured to perform the described method, and a base station configured to send the indication of the SCS. A computer-readable medium may store instructions that when executed, may cause performance of the described method.

Figure 26:
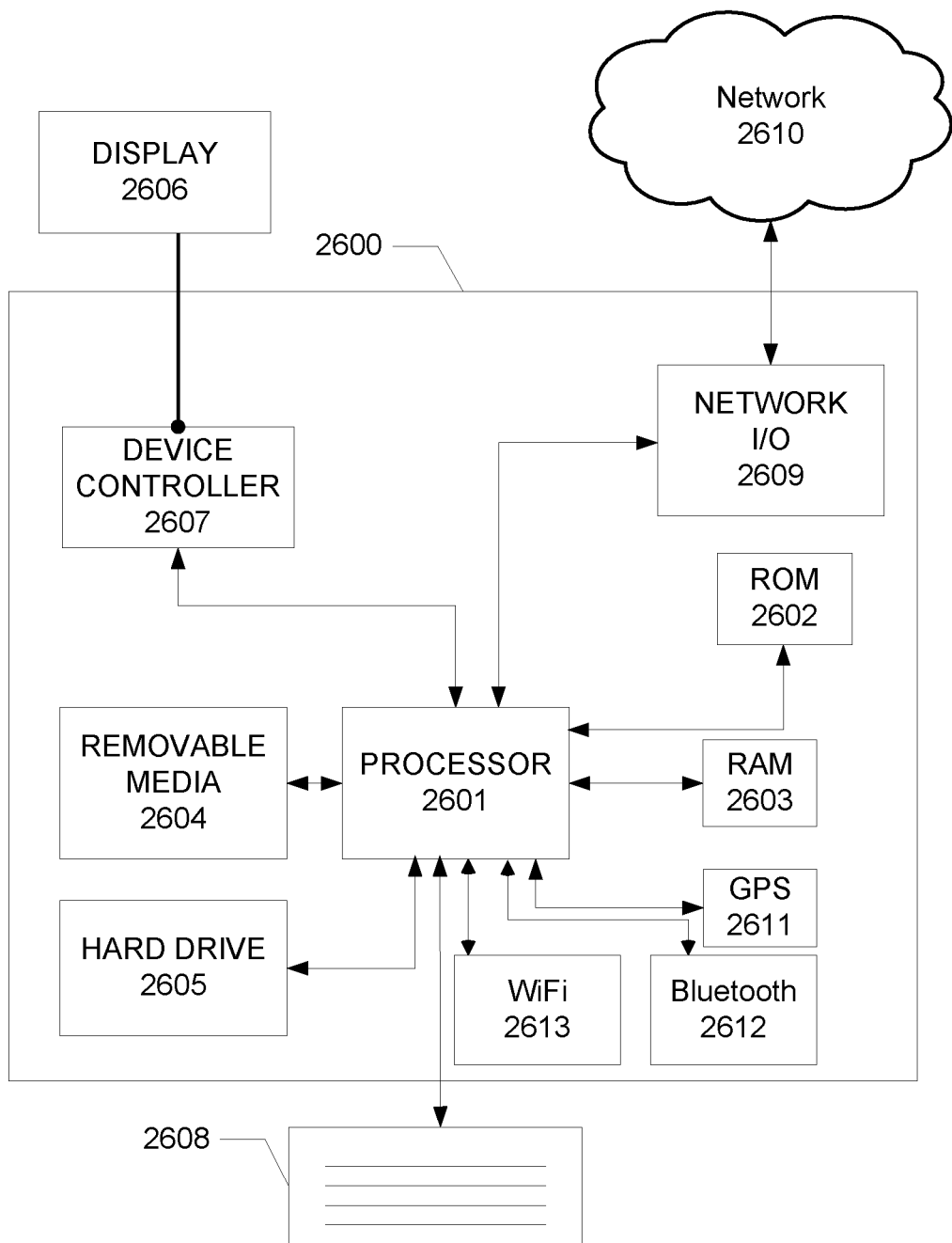
FIG. 26 shows example elements of a computing device that may be used to implement any of the various devices described herein.

FIG. 26 shows example elements of a computing device that may be used to implement any of the various devices described herein, including, e.g., the base station 120A and/or 120B, the wireless device 110 (e.g., 110A and/or 110B), or any other base station, wireless device, or computing device described herein. The computing device 2600 may include one or more processors 2601, which may execute instructions stored in the random-access memory (RAM) 2603, the removable media 2604 (such as a Universal Serial Bus (USB) drive, compact disk (CD) or digital versatile disk (DVD), or floppy disk drive), or any other desired storage medium. Instructions may also be stored in an attached (or internal) hard drive 2605. The computing device 2600 may also include a security processor (not shown), which may execute instructions of one or more computer programs to monitor the processes executing on the processor 2601 and any process that requests access to any hardware and/or software components of the computing device 2600 (e.g., ROM 2602, RAM 2603, the removable media 2604, the hard drive 2605, the device controller 2607, a network interface 2609, a GPS 2611, a Bluetooth interface 2612, a WiFi interface 2613, etc.). The computing device 2600 may include one or more output devices, such as the display 2606 (e.g., a screen, a display device, a monitor, a television, etc.), and may include one or more output device controllers 2607, such as a video processor. There may also be one or more user input devices 2608, such as a remote control, keyboard, mouse, touch screen, microphone, etc. The computing device 2600 may also include one or more network interfaces, such as a network interface 2609, which may be a wired interface, a wireless interface, or a combination of the two. The network interface 2609 may provide an interface for the computing device 2600 to communicate with a network 2610 (e.g., a RAN, or any other network). The network interface 2609 may include a modem (e.g., a cable modem), and the external network 2610 may include communication links, an external network, an in-home network, a provider's wireless, coaxial, fiber, or hybrid fiber/coaxial distribution system (e.g., a DOCSIS network), or any other desired network. Additionally, the computing device 2600 may include a location-detecting device, such as a global positioning system (GPS) microprocessor 2611, which may be configured to receive and process global positioning signals and determine, with possible assistance from an external server and antenna, a geographic position of the computing device 2600.

The example in FIG. 26 may be a hardware configuration, although the components shown may be implemented as software as well. Modifications may be made to add, remove, combine, divide, etc. components of the computing device 2600 as desired. Additionally, the components may be implemented using basic computing devices and components, and the same components (e.g., processor 2601, ROM storage 2602, display 2606, etc.) may be used to implement any of the other computing devices and components described herein. For example, the various components described herein may be implemented using computing devices having components such as a processor executing computer-executable instructions stored on a computer-readable medium, as shown in FIG. 26. Some or all of the entities described herein may be software based, and may co-exist in a common physical platform (e.g., a requesting entity may be a separate software process and program from a dependent entity, both of which may be executed as software on a common computing device).

The disclosed mechanisms herein may be performed if certain criteria are met, for example, in a wireless device, a base station, a radio environment, a network, a combination of the above, and/or the like. Example criteria may be based on, for example, wireless device and/or network node configurations, traffic load, initial system set up, packet sizes, traffic characteristics, a combination of the above, and/or the like. If the one or more criteria are met, various examples may be used. It may be possible to implement examples that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. A base station communicating with a plurality of wireless devices may refer to base station communicating with a subset of the total wireless devices in a coverage area. Wireless devices referred to herein may correspond to a plurality of wireless devices of a particular LTE or 5G release with a given capability and in a given sector of a base station. A plurality of wireless devices may refer to a selected plurality of wireless devices, and/or a subset of total wireless devices in a coverage area. Such devices may operate, function, and/or perform based on or according to drawings and/or descriptions herein, and/or the like. There may be a plurality of base stations or a plurality of wireless devices in a coverage area that may not comply with the disclosed methods, for example, because those wireless devices and/or base stations perform based on older releases of LTE or 5G technology.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

Many of the elements in examples may be implemented as modules. A module may be an isolatable element that performs a defined function and has a defined interface to other elements. The modules may be implemented in hardware, software in combination with hardware, firmware, wetware (i.e., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and complex programmable logic devices (CPLDs). Computers, microcontrollers, and microprocessors may be programmed using languages such as assembly, C, C++ or the like. FPGAs, ASICs, and CPLDs may be programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, wireless local area networks, wireless personal area networks, wireless ad hoc networks, wireless metropolitan area networks, wireless wide area networks, global area networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

The invention claimed is:

1. A method comprising:
receiving, by a wireless device from a base station, an indication of sidelink subcarrier spacing (SCS); and
sending at least one message via a sidelink and according to at least one congestion control parameter, wherein the at least one congestion control parameter is associated with a processing time that is based on:
a processing capability of the wireless device; and
the sidelink SCS.

2. The method of claim 1, wherein the processing time comprises a delay between a first time, when a measurement window for the at least one congestion control parameter ends, and a second time when the at least one congestion control parameter is generated based on a measurement of a communications channel performed in the measurement window.

3. The method of claim 1, wherein the at least one congestion control parameter comprises a channel busy ratio (CBR).

4. The method of claim 1, further comprising:
determining a size of a measurement window, for the at least one congestion control parameter, based on:
the processing capability of the wireless device; and
the sidelink SCS; and
determining, based on a measurement performed during the measurement window, the at least one congestion control parameter.

5. The method of claim 4, wherein the measurement window comprises at least one of a time domain dimension, a frequency domain dimension, or a spatial domain dimension.

6. The method of claim 1, further comprising sending, by the wireless device to the base station, an indication of the processing capability of the wireless device.

7. The method of claim 1, wherein the sidelink comprises at least one of a data channel, a control channel, a broadcast channel, a shared channel, a discovery channel, a subchannel, a bandwidth part, a synchronization signal block, a resource pool, a resource unit, an orthogonal frequency division multiplexing (OFDM) symbol, a sidelink slot, a spatial resource, or a carrier.

8. The method of claim 1, further comprising determining the at least one congestion control parameter, wherein the determining the at least one congestion control parameter is based on a portion of unit resources, of a resource pool, associated with a sidelink measurement, wherein the sidelink measurement exceeds a threshold value.

9. The method of claim 1, wherein the sending the at least one message comprises sending, by the wireless device to a second wireless device, the at least one message, and wherein the method further comprises receiving, by the wireless device from the second wireless device, a response to the at least one message.

10. The method of claim 1, further comprising determining, based on the at least one congestion control parameter, at least one of:
a transmission rate;
a quantity of hybrid automatic repeat request (HARM) transmissions;
a quantity of transmission resources;
a modulation and coding scheme;
a quantity of spatial layers; or
a transmission power.

11. The method of claim 1, further comprising:
receiving, by the wireless device from the base station, an indication of a resource pool, wherein the at least one congestion control parameter is based on a measurement of the resource pool.

12. A wireless device comprising:
one or more processors; and
memory storing instructions that, when executed by the one or more processors, configure the wireless device to:
receive, from a base station, an indication of sidelink subcarrier spacing (SCS); and
send at least one message via a sidelink and according to at least one congestion control parameter, wherein the at least one congestion control parameter is associated with a processing time that is based on:
a processing capability of the wireless device; and
the sidelink SCS.

13. The wireless device of claim 12, wherein the processing time comprises a delay between a first time, when a measurement window for the at least one congestion control parameter ends, and a second time when the at least one congestion control parameter is generated based on the measurement window.

14. The wireless device of claim 12, wherein the at least one congestion control parameter comprises a channel busy ratio (CBR).

15. The wireless device of claim 12, wherein the instructions, when executed by the one or more processors, further configure the wireless device to:
determine a size of a measurement window, for the at least one congestion control parameter, based on:
the processing capability of the wireless device; and
the sidelink SCS; and
determine, based on a measurement performed during the measurement window, the at least one congestion control parameter.

16. The wireless device of claim 15, wherein the measurement window comprises at least one of a time domain dimension, a frequency domain dimension, or a spatial domain dimension.

17. The wireless device of claim 12, wherein the instructions, when executed by the one or more processors, further configure the wireless device to:
send, to the base station, an indication of the processing capability of the wireless device.

18. The wireless device of claim 12, wherein the sidelink comprises at least one of a data channel, a control channel, a broadcast channel, a shared channel, a discovery channel, a subchannel, a bandwidth part, a synchronization signal block, a resource pool, a resource unit, an orthogonal frequency division multiplexing (OFDM) symbol, a sidelink slot, a spatial resource, or a carrier.

19. The wireless device of claim 12, wherein the instructions, when executed by the one or more processors, further configure the wireless device to, based on a portion of unit resources, of a resource pool, associated with a sidelink measurement, determine the at least one congestion control parameter, wherein the sidelink measurement exceeds a threshold value.

20. The wireless device of claim 12, wherein the instructions, when executed by the one or more processors, configure the wireless device to send the at least one message by sending the at least one message to a second wireless device, and wherein the instructions, when executed by the one or more processors, further configure the wireless device to receive, from the second wireless device, a response to the at least one message.

21. The wireless device of claim 12, wherein the instructions, when executed by the one or more processors, further configure the wireless device to determine, based on the at least one congestion control parameter, at least one of:
a transmission rate;
a quantity of hybrid automatic repeat request (HARQ) transmissions;
a quantity of transmission resources;
a modulation and coding scheme;
a quantity of spatial layers; or
a transmission power.

22. The wireless device of claim 12, wherein the instructions, when executed by the one or more processors, further configure the wireless device to:
receive, from the base station, an indication of a resource pool, wherein the at least one congestion control parameter is based on a measurement of the resource pool.

23. A non-transitory computer-readable medium storing instructions that, when executed, configure a wireless device to:
receive, from a base station, an indication of sidelink subcarrier spacing (SCS); and
send at least one message via a sidelink and according to at least one congestion control parameter, wherein the at least one congestion control parameter is associated with a processing time that is based on:
a processing capability of the wireless device; and
the sidelink SCS.

24. The non-transitory computer-readable medium of claim 23, wherein the processing time comprises a delay between a first time, when a measurement window for the at least one congestion control parameter ends, and a second time when the at least one congestion control parameter is generated based on the measurement window.

25. The non-transitory computer-readable medium of claim 23, wherein the at least one congestion control parameter comprises a channel busy ratio (CBR).

26. The non-transitory computer-readable medium of claim 23, wherein the instructions, when executed, further configure the wireless device to:
determine a size of a measurement window, for the at least one congestion control parameter, based on:

the processing capability of the wireless device; and
the sidelink SCS; and determine, based on a measurement performed during the measurement window, the at least one congestion control parameter.

27. The non-transitory computer-readable medium of claim 26, wherein the measurement window comprises at least one of a time domain dimension, a frequency domain dimension, or a spatial domain dimension.

28. The non-transitory computer-readable medium of claim 23, wherein the instructions, when executed, further configure the wireless device to:
send, to the base station, an indication of the processing capability of the wireless device.

29. The non-transitory computer-readable medium of claim 23, wherein the sidelink comprises at least one of a data channel, a control channel, a broadcast channel, a shared channel, a discovery channel, a subchannel, a bandwidth part, a synchronization signal block, a resource pool, a resource unit, an orthogonal frequency division multiplexing (OFDM) symbol, a sidelink slot, a spatial resource, or a carrier.

30. The non-transitory computer-readable medium of claim 23, wherein the instructions, when executed, further configure the wireless device to:
based on a portion of unit resources, of a resource pool, associated with a sidelink measurement, determine the at least one congestion control parameter, wherein the sidelink measurement exceeds a threshold value.

31. The non-transitory computer-readable medium of claim 23, wherein the instructions, when executed, configure the wireless device to send the at least one message by sending the at least one message to a second wireless device, and
wherein the instructions, when executed, further configure the wireless device to receive, from the second wireless device, a response to the at least one message.

32. The non-transitory computer-readable medium of claim 23, wherein the instructions, when executed, further configure the wireless device to determine, based on the at least one congestion control parameter, at least one of:
a transmission rate;
a quantity of hybrid automatic repeat request (HARQ) transmissions;
a quantity of transmission resources;
a modulation and coding scheme;
a quantity of spatial layers; or
a transmission power.

33. The non-transitory computer-readable medium of claim 23, wherein the instructions, when executed, further configure the wireless device to:
receive, from the base station, an indication of a resource pool, wherein the at least one congestion control parameter is based on a measurement of the resource pool.

34. A system comprising:
a wireless device; and
a base station,
wherein the base station is configured to:
send, to the wireless device, an indication of sidelink subcarrier spacing (SCS), and
wherein the wireless device is configured to:
send at least one message via a sidelink and according to at least one congestion control parameter, wherein the at least one congestion control parameter is associated with a processing time that is based on:
a processing capability of the wireless device; and
the sidelink SCS.

35. The system of claim 34, wherein the processing time comprises a delay between a first time, when a measurement window for the at least one congestion control parameter ends, and a second time when the at least one congestion control parameter is generated based on the measurement window.

36. The system of claim 34, wherein the at least one congestion control parameter comprises a channel busy ratio (CBR).

37. The system of claim 34, wherein the wireless device is further configured to:
determine a size of a measurement window, for the at least one congestion control parameter, based on:
the processing capability of the wireless device; and
the sidelink SCS; and
determine, based on a measurement performed during the measurement window, the at least one congestion control parameter.

38. The system of claim 37, wherein the measurement window comprises at least one of a time domain dimension, a frequency domain dimension, or a spatial domain dimension.

39. The system of claim 34, wherein the wireless device is further configured to:
send, to the base station, an indication of the processing capability of the wireless device.

40. The system of claim 34, wherein the sidelink comprises at least one of a data channel, a control channel, a broadcast channel, a shared channel, a discovery channel, a subchannel, a bandwidth part, a synchronization signal block, a resource pool, a resource unit, an orthogonal frequency division multiplexing (OFDM) symbol, a sidelink slot, a spatial resource, or a carrier.

41. The system of claim 34, wherein the wireless device is further configured to, based on a portion of unit resources, of a resource pool, associated with a sidelink measurement, determine the at least one congestion control parameter, wherein the sidelink measurement exceeds a threshold value.

42. The system of claim 34, wherein the wireless device is configured to send the at least one message to a second wireless device, and
wherein the wireless device is further configured to receive, from the second wireless device, a response to the at least one message.

43. The system of claim 34, wherein the wireless device is further configured to determine, based on the at least one congestion control parameter, at least one of:
a transmission rate;
a quantity of hybrid automatic repeat request (HARQ) transmissions;
a quantity of transmission resources;
a modulation and coding scheme;
a quantity of spatial layers; or
a transmission power.

44. The system of claim 34, wherein the base station is further configured to:
send, to the wireless device, an indication of a resource pool, wherein the at least one congestion control parameter is based on a measurement of the resource pool.

* * * * *

UNITED STATES PATENT AND TRADEMARK OFFICE
CERTIFICATE OF CORRECTION

| | |
|---|---|
| PATENT NO. | : 11,632,693 B2 |
| APPLICATION NO. | : 17/858784 |
| DATED | : April 18, 2023 |
| INVENTOR(S) | : Chae et al. |

It is certified that error appears in the above-identified patent and that said Letters Patent is hereby corrected as shown below:

In the Specification

Column 15, Detailed Description, Line 12:
After "channel", insert --.-- therefor Column 28, Detailed Description, Line 16:
Delete "1119)." and insert --1118).-- therefor Column 32, Detailed Description, Line 61:
Delete "1250," and insert --1240,-- therefor Column 37, Detailed Description, Line 1:
After "layer", insert --.-- therefor Column 38, Detailed Description, Line 50:
After "channel", insert --.-- therefor Column 41, Detailed Description, Line 12:
After "channel", insert --.-- therefor Column 43, Detailed Description, Line 32:
After "subchannel", insert --.-- therefor Column 47, Detailed Description, Line 13:
After "channel", insert --.-- therefor Column 48, Detailed Description, Line 8:
After "performance", insert --.-- therefor Signed and Sealed this
Twentieth Day of May, 2025

Coke Morgan Stewart
*Acting Director of the United States Patent and Trademark Office*

CERTIFICATE OF CORRECTION (continued)
U.S. Pat. No. 11,632,693 B2

Column 51, Detailed Description, Line 18:
After "subchannel", insert --.-- therefor Column 51, Detailed Description, Line 22:
Delete "on on" and insert --on-- therefor Column 59, Detailed Description, Line 37:
Delete "Lab VIEWMathScript." and insert --LabVIEWMathScript.-- therefor Column 60, Detailed Description, Lines 18-19:
After "manner", insert --.-- therefor In the Claims Column 62, Claim 20, Line 21:
After "and", insert --¶-- therefor